(12) United States Patent
Yoneda et al.

(10) Patent No.: US 9,569,713 B2
(45) Date of Patent: Feb. 14, 2017

(54) SEMICONDUCTOR DEVICE, WIRELESS SENSOR, AND ELECTRONIC DEVICE

(71) Applicant: Semiconductor Energy Laboratory Co., Ltd., Kanagawa-ken (JP)

(72) Inventors: Seiichi Yoneda, Kanagawa (JP); Yukio Maehashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 14/920,161

(22) Filed: Oct. 22, 2015

(65) Prior Publication Data

US 2016/0117584 A1 Apr. 28, 2016

(30) Foreign Application Priority Data

Oct. 24, 2014 (JP) .................. 2014-217284
Oct. 28, 2014 (JP) .................. 2014-219299

(51) Int. Cl.
*G06K 19/06* (2006.01)
*G06K 19/07* (2006.01)
(Continued)

(52) U.S. Cl.
CPC ....... *G06K 19/0716* (2013.01); *G06K 19/0702* (2013.01); *G06K 19/073* (2013.01); *G06K 19/07707* (2013.01)

(58) Field of Classification Search
CPC ............ G06K 19/0702; G06K 19/0716; G06K 19/073; G06K 19/07707
(Continued)

(56) References Cited

U.S. PATENT DOCUMENTS 5,059,982 A 10/1991 Bacrania et al.
5,731,856 A 3/1998 Kim et al.
(Continued)

FOREIGN PATENT DOCUMENTS

EP 1737044 A 12/2006
EP 2226847 A 9/2010
(Continued)

OTHER PUBLICATIONS

Jeon, S. et al. "180nm Gate Length Amorphous InGaZnO Thin Film Transistor for High Density Image Sensor Applications," IEDM 10: Technical Digest of International Electron Devices Meeting, pp. 504-507, dated Dec. 6, 2010.
(Continued)

*Primary Examiner* — Seung Lee
(74) *Attorney, Agent, or Firm* — Husch Blackwell LLP

(57) ABSTRACT

To provide a semiconductor device that is capable of displaying data even when a radio signal is not supplied. The semiconductor device includes an antenna, a battery, a sensor, a nonvolatile memory, a first circuit, and a second circuit. Power supplied from the antenna is converted into first power via the first circuit. The battery stores the first power and supplies second power. The sensor performs sensing with the second power. The nonvolatile memory stores analog data acquired by the sensor. The second power is used to store the analog data. The second circuit converts the analog data into digital data with the use of the first power. The nonvolatile memory preferably includes an oxide semiconductor transistor.

17 Claims, 35 Drawing Sheets

(51) Int. Cl.
*G06K 19/077* (2006.01)
*G06K 19/073* (2006.01)

(58) Field of Classification Search
USPC ........................................... 235/492
See application file for complete search history.

(56) References Cited

U.S. PATENT DOCUMENTS

| | | | |
|---|---|---|---|
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 6,788,567 B2 | 9/2004 | Fujimori |
| 6,944,045 B2 | 9/2005 | Fujimori |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,659,892 B2 * | 2/2010 | Tanada ................... G06F 3/147 320/127 |
| 7,674,650 B2 | 3/2010 | Akimoto et al. |
| 7,701,376 B2 | 4/2010 | Oshima et al. |
| 7,732,819 B2 | 6/2010 | Akimoto et al. |
| 7,821,441 B2 | 10/2010 | Westwick et al. |
| 7,952,323 B2 * | 5/2011 | Lamothe ............ G06K 19/0702 235/492 |
| 8,289,753 B2 | 10/2012 | Yamazaki et al. |
| 8,446,171 B2 | 5/2013 | Takahashi |
| 8,610,611 B2 | 12/2013 | Venkatraman et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0089975 A1 | 4/2011 | Yamazaki et al. |
| 2011/0101332 A1 | 5/2011 | Yamazaki et al. |
| 2011/0121878 A1 | 5/2011 | Kato et al. |
| 2011/0148463 A1 | 6/2011 | Kato et al. |
| 2011/0176357 A1 | 7/2011 | Koyama et al. |
| 2011/0187410 A1 | 8/2011 | Kato et al. |
| 2012/0112937 A1 | 5/2012 | Yamase et al. |
| 2016/0094236 A1 | 3/2016 | Shionoiri et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 10-078836 | 3/1998 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-029931 | 2/2006 |

(56) References Cited

FOREIGN PATENT DOCUMENTS

| | | |
|---|---|---|
| JP | 2007-006290 | 1/2007 |
| WO | WO-2004/114391 | 12/2004 |

OTHER PUBLICATIONS

Asakuma.N. et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Asaoka.Y et al., "29.1: Polarizer-Free Reflective LCD Combined With Ultra Low-Power Driving Technology", SID Digest '09: SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for Amoled Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters), 2005, vol. 87, pp. 122102-1-122102-3.

Jeong.J et al., "3.1: Distinguished Paper: 12.1-Inch WXGA Amoled Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission Amoled Display on Plastic Film and its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N. et al., "Spinel,YBFE2O4, and YB2FE3O7 Types of Structures for Compounds in the InO and Sc2O3-13 A2O3—BO Systems [A; Fe, Ga, or Al; B: Mg, Mn, Fe, Ni, Cu, or Zn] at Temperatures Over 1000° C", Journal of Solid State Chemistry, 1985, vol. 60, pp. 382-384.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits, 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of Am-Oled ", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering". SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

(56) References Cited

OTHER PUBLICATIONS

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size Amoled Displays", IDW '08 : Proceedings of The 6th International Display Workshops, Dec. 3, 2008, pp. 581-584.

Nakamura.M et al., "The phase relations in the In2O3—Ga2ZnO4—ZnO system at 1350° C", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem Oleds", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA Amoled Display Using In—Ga—Zn—Oxide TFTS With a Novel Passivation Layer", SID Digest '09 : SID International Symposium Digest of Technical Papers, May 31, 2009, pp. 284-287.

Ohara.H et al., "Amorphous In—Ga—Zn—Oxide TFTs with Suppressed Variation for 4.0 inch QVGA Amoled Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosphical Magazine, 2001, vol. 81, No. 5, pp. 501-515.

Orita.M et al., "Mechanism of Electrical Conductivity of Transparent InGaZn04", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Park.J et al., "Amorphous Indium—Gallium—Zinc Oxide TFTS and Their Application for Large Size Amoled"AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium—Gallium—Zinc Oxide Semiconductor Upon Exposure to Water", Appl. Phys. Lett. (Applied Physics Letters) , 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.S et al., "Challenge to Future Displays: Transparent Am-Oled Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Sakata.J et al., "Development of 4.0-In. Amoled Display With Driver Circuit Using Amorphous In—Ga—Zn—Oxide TFTS", IDW '09 : Proceedings of the 16th International Display Workshops, 2009, pp. 689-692.

Son.K et al., "42.4L: Late-News Paper: 4 Inch QVGA Amoled Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IgZo Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters) , Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Kamiya, T. et al., "Carrier Transport Properties and Electronic Structures of Amorphous Oxide Semiconductors: The Present Status," Solid State Physics, Sep. 1, 2009, vol. 44, No. 9, pp. 621-633, Agne Gijutsu Center.

* cited by examiner

300

370

373

680

680

SEMICONDUCTOR DEVICE, WIRELESS SENSOR, AND ELECTRONIC DEVICE

BACKGROUND OF THE INVENTION

1. Field of the Invention

Embodiments of the present invention relate to a semiconductor device, a wireless sensor, and an electronic device.

Note that one embodiment of the present invention is not limited to the above technical field. The present invention relates to an object, a method, or a manufacturing method. The present invention relates to a process, a machine, manufacture, or a composition of matter. One embodiment of the present invention relates to a semiconductor device, a display device, a light-emitting device, a power storage device, a storage device, a driving method thereof, or a manufacturing method thereof.

In this specification and the like, a semiconductor device generally means a device that can function by utilizing semiconductor characteristics. A display device, an electro-optical device, a semiconductor circuit, and an electronic device include a semiconductor device in some cases.

2. Description of the Related Art

In recent years, there has been suggested a technique in which a radio frequency (RF) tag including a sensor is attached to (or embedded in) an object and data sensed by a sensor is read by wireless communication. For example, Patent Document 1 discloses a technique in which an electronic circuit or the like including a sensor is embedded in concrete of a building and damage to the building is determined using wireless communication.

Provided at low cost and permanently operate, passive tags without batteries have been widely spread as RF tags. To operate passive tags, readers that generate an electromagnetic wave to supply power are always required.

REFERENCE

Patent Document

[Patent Document 1] Japanese Published Patent Application No. 2006-29931

SUMMARY OF THE INVENTION

In the case where there are significantly large number of parts to be measured as in damage assessment for a construction such as a bridge or a tunnel, measurement using passive tags is inconvenient because readers that supply radio signals always need to be transferred to the sites.

In the case where the frequency of measurement is high as in monitoring biological data such as a heart rate and a pulse, measurement using a passive tag is inconvenient because a reader that supplies a radio signal always needs to be positioned near the tag.

When a display device is provided in a tag in order to display data acquired by sensing, the display device cannot be driven only with power obtained with a radio signal in many cases.

An object of one embodiment of the present invention is to provide a semiconductor device that is capable of performing sensing even when a radio signal is not supplied. Another object of one embodiment of the present invention is to provide a semiconductor device that is capable of displaying data even when a radio signal is not supplied. Another object of one embodiment of the present invention is to provide a semiconductor device with low power consumption. Another object of one embodiment of the present invention is to provide a novel semiconductor device.

Note that the description of a plurality of objects does not preclude the existence of each object. Note that one embodiment of the present invention does not necessarily achieve all the objects listed above. Other objects will be apparent from and can be derived from the description of the specification, the drawings, the claims, and the like, and such objects could be objects of one embodiment of the present invention.

One embodiment of the present invention is a semiconductor device including an antenna, a battery, a sensor, a nonvolatile memory, a first circuit, and a second circuit. Power supplied from the antenna is converted into first power via the first circuit. The battery has a function of storing the first power and supplying second power. The nonvolatile memory has a function of storing analog data with the use of the second power. The analog data is acquired by the sensor. The second circuit has a function of converting the analog data into digital data with the use of the first power.

In the above embodiment, the sensor has a function of acquiring the analog data with the use of the second power.

In the above embodiment, the nonvolatile memory includes a transistor whose channel includes an oxide semiconductor.

One embodiment of the present invention is a semiconductor device including an antenna, a battery, a sensor, a nonvolatile memory, and first to fourth circuits. Power supplied from the antenna is converted into first power via the first circuit. The battery has a function of storing the first power and supplying second power. The second circuit has a function of generating a first clock signal. The third circuit has a function of generating a second clock signal. The first clock signal has a higher frequency than the second clock signal. The nonvolatile memory has a function of storing analog data with the use of the second power and the second clock signal. The analog data is acquired by the sensor. The fourth circuit has a function of converting the analog data into digital data with the use of the first power and the first clock signal.

In the above embodiment, the sensor has a function of acquiring the analog data with the use of the second power.

In the above embodiment, the nonvolatile memory includes a transistor whose channel includes an oxide semiconductor.

One embodiment of the present invention is a semiconductor device including an antenna, a battery, a sensor, a first nonvolatile memory, a second nonvolatile memory, a first circuit, and a second circuit. Power supplied from the antenna is converted into first power via the first circuit. The battery has a function of storing first power and supplying second power. The first nonvolatile memory has a function of storing analog data with the use of the second power. The analog data is acquired by the sensor. The second nonvolatile memory has a function of storing a time at which the analog data is acquired by the sensor. The second power is used to store the time. The second circuit has a function of converting the analog data into digital data with the use of the first power.

In the above embodiment, the sensor has a function of acquiring the analog data with the use of the second power.

In the above embodiment, the nonvolatile memory includes a transistor whose channel includes an oxide semiconductor.

One embodiment of the present invention is a semiconductor device including an antenna, a battery, a sensor, a first nonvolatile memory, a second nonvolatile memory, and first to fourth circuits. Power supplied from the antenna is converted into first power via the first circuit. The battery has a function of storing the first power and supplying second power. The second circuit has a function of generating a first clock signal. The third circuit has a function of generating a second clock signal. The first clock signal has a higher frequency than the second clock signal. The first nonvolatile memory has a function of storing analog data with the use of the second power and the second clock signal. The analog data is acquired by the sensor. The second nonvolatile memory has a function of storing a time at which the analog data is acquired by the sensor. The second power is used to store the time. The fourth circuit has a function of converting the analog data into digital data with the use of the first power and the first clock signal.

In the above embodiment, the sensor has a function of acquiring the analog data with the use of the second power.

In the above embodiment, the nonvolatile memory includes a transistor whose channel includes an oxide semiconductor.

A semiconductor device of one embodiment of the present invention includes an antenna, a battery, a power supply circuit, an analog circuit, a logic circuit, a nonvolatile memory, a power control circuit, and a display portion. The power control circuit has a function of controlling charge and discharge of the battery in accordance with the intensity of a radio signal received by the antenna. The nonvolatile memory has a function of storing an image signal for displaying an image on the display portion.

In the above embodiment, the battery may be a lithium-ion secondary battery containing an ionic liquid electrolyte.

In the above embodiment, the nonvolatile memory preferably includes a transistor whose channel region includes an oxide semiconductor.

In the above embodiment, a light-emitting diode may be used for the display portion.

One embodiment of the present invention is a display device including the semiconductor device described in the above embodiment, a solar cell, and a flexible support.

In this specification and the like, terms for describing arrangement, such as "over" and "under", are used for convenience to indicate a positional relation between components with reference to drawings. The positional relation between components is changed as appropriate in accordance with the direction in which each component is described. Therefore, terms for describing arrangement are not limited to the terms used in the description in the specification, and can be appropriately reworded depending on situations.

In this specification and the like, components are classified on the basis of the functions, and shown as blocks independent of one another in block diagrams. However, in an actual circuit or the like, it may be difficult to separate components on the basis of the functions, so that one circuit may be associated with a plurality of functions and several circuits may be associated with one function. Therefore, the segmentation of a block in the block diagrams is not limited by any of the components described in the specification, and can be differently determined as appropriate depending on situations.

In the drawings, the size, the layer thickness, or the region has arbitrary magnitude for convenience for the description. Therefore, the scale is not necessarily limited to that illustrated in the drawings. Note that the drawings are schematically illustrated for clarity, and shapes or values are not limited to those illustrated in the drawings. For example, the following can be included: variation in signal, voltage, or current due to noise or difference in timing.

In this specification and the like, in description of connections of a transistor, description of "one of a source and a drain" (or a first electrode or a first terminal), and "the other of the source and the drain" (or a second electrode or a second terminal) are used. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In addition, in this specification and the like, the term such as an "electrode" or a "wiring" does not limit the function of a component. For example, an "electrode" is used as part of a "wiring" in some cases, and vice versa. Further, the term "electrode" or "wiring" can also mean a combination of a plurality of "electrodes" or "wirings" formed in an integrated manner.

In this specification and the like, the terms "voltage" and "potential" are interchangeable in appropriate cases. The term "voltage" refers to a potential difference between a given potential and a reference potential. When the reference potential is a ground potential, the term "voltage" can be replaced with the term "potential". The ground potential does not necessarily mean 0 V. Note that a potential is relative, and a potential supplied to wirings or the like may be changed depending on a reference potential.

In this specification and the like, the terms "film", "layer", and the like can be interchanged with each other depending on the case or circumstances. For example, the term "conductive layer" can be changed into the term "conductive film" in some cases. Also, the term "insulating film" can be changed into the term "insulating layer" in some cases.

In this specification and the like, a switch is an element that is brought into a conduction state or a non-conduction state (is turned on or off) to determine whether to have a current flow therethrough or not. Alternatively, the switch is an element having a function of selecting and changing a current path.

For example, an electrical switch, a mechanical switch, or the like can be used as a switch. That is, any element can be used as a switch as long as it can control a current, without limitation to a certain element.

A transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), or a logic circuit in which such elements are combined can be used as an electrical switch.

When a transistor is used as a switch, an "on state" of the transistor refers to a state in which a source and a drain of the transistor are electrically short-circuited. Furthermore, an "off state" of the transistor refers to a state in which the source and drain of the transistor are electrically disconnected. Note that if the transistor operates just as a switch, there is no particular limitation on the polarity (conductivity type) of the transistor.

An example of a mechanical switch is a switch formed using a MEMS (micro electro mechanical system) technology, such as a digital micromirror device (DMD). Such a switch includes an electrode which can be moved mechanically, and operates by controlling conduction and non-conduction in accordance with movement of the electrode.

For example, in this specification and the like, an explicit description "X and Y are connected" means that X and Y are electrically connected, X and Y are functionally connected, and X and Y are directly connected. Accordingly, without limitation to a predetermined connection relation, for example, a connection relation shown in drawings or text, another connection relation is included in the drawings or the text.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, that is, the case where X and are connected without the element that allows the electrical connection between X and Y provided therebetween.

For example, in the case where X and Y are electrically connected, one or more elements that enable electrical connection between X and Y (e.g., a switch, a transistor, a capacitor, an inductor, a resistor, a diode, a display element, a light-emitting element, and a load) can be connected between X and Y. A switch is controlled to be on or off. That is, a switch is conducting or not conducting (is turned on or off) to determine whether a current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit and a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected. Note that the case where X and Y are functionally connected includes the case where X and Y are directly connected and X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to a part of Z1 and another part of Z1 is directly connected to X while a drain (or a second terminal or the like) of the transistor is directly connected to a part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path". Other examples of the expressions also include "a source (or a first terminal or the like) of a transistor is electrically connected to X through at least Z1 on a first connection path, the first connection path does not include a second connection path, the second connection path includes a connection path through the transistor, a drain (or a second terminal or the like) of the transistor is electrically connected to Y through at least Z2 on a third connection path, and the third connection path does not include the second connection path", and "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are only examples and one embodiment of the present invention is not limited to the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

For example, in this specification and the like, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on a current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. Other than the above, a display medium whose contrast, luminance, reflectance, transmittance, or the like is changed by an electric or magnetic effect may be included. Examples of a display device using an EL element include an EL display. Display devices using electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, Electronic Liquid Powder (registered trademark), or electrophoretic elements include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. Such provision of graphene or graphite enables a nitride semiconductor such as an n-type GaN semiconductor layer including crystals to be easily formed thereover. Furthermore, a p-type GaN semiconductor layer including crystals, or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

One embodiment of the present invention enables manufacture of a semiconductor device capable of performing sensing even when a radio signal is not supplied. One embodiment of the present invention enables manufacture of a semiconductor device capable of displaying data even when a radio signal is not supplied. An object of one embodiment of the present invention is to provide a novel semiconductor device.

Note that the description of these effects does not disturb the existence of other effects. One embodiment of the present invention does not necessarily have all the effects listed above. Other effects will be apparent from and can be derived from the description of the specification, the drawings, the claims, and the like.

DETAILED DESCRIPTION OF THE INVENTION

Figure 1:
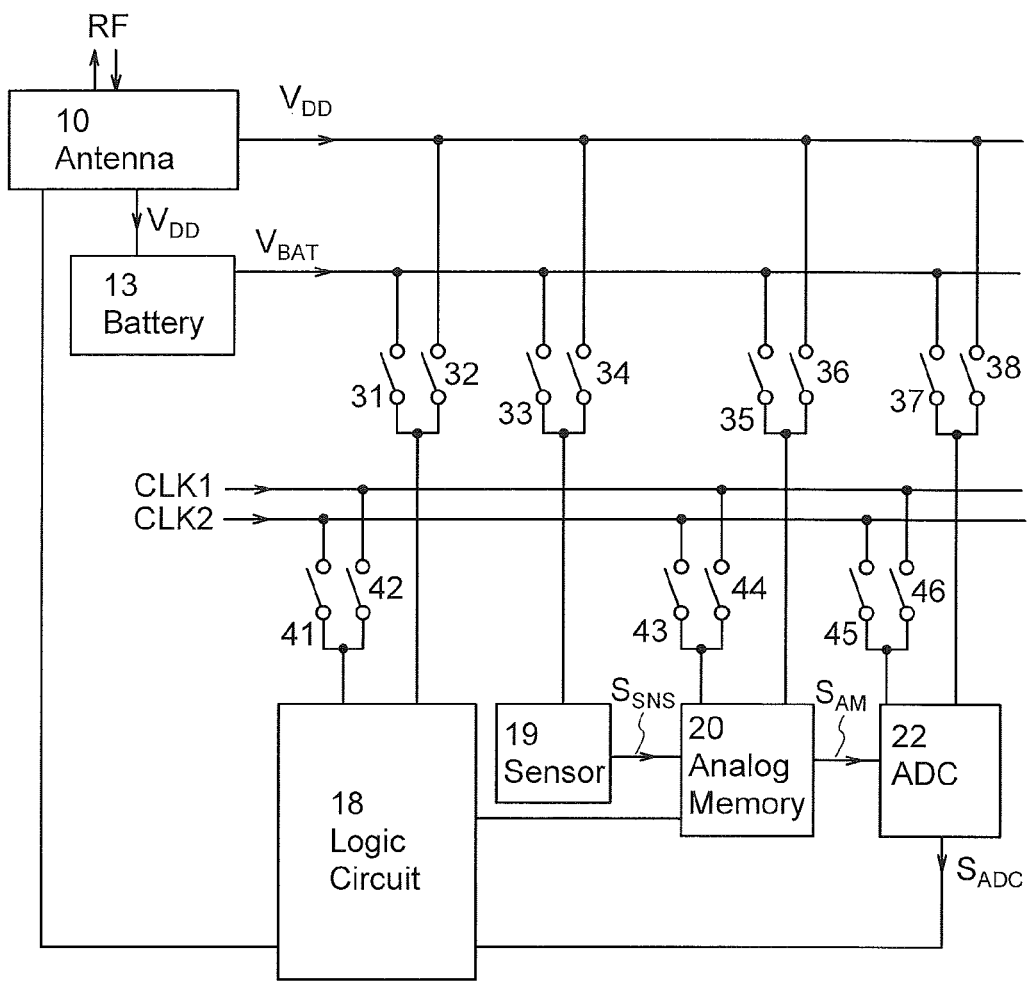
FIG. 1 is a block diagram illustrating a configuration example of a semiconductor device.

Embodiments and an example will be described below with reference to the drawings. However, the embodiments and example can be implemented with various modes. It will be readily appreciated by those skilled in the art that modes and details can be changed in various ways without departing from the spirit and scope of the present invention. Therefore, the present invention should not be interpreted as being limited to the description of the embodiments and example below.

In this specification and the like, ordinal numbers such as first, second, and third are used in order to avoid confusion among components. Thus, the terms do not limit the number or order of components. In this specification and the like, a "first" component in one embodiment can be referred to as a "second" component in other embodiments or claims. Furthermore, in this specification and the like, a "first" component in one embodiment can be referred to without the ordinal number in other embodiments or claims.

In the drawings, the same components, components having similar functions, components formed of the same material, or components formed at the same time are denoted by the same reference numerals in some cases, and description thereof is not repeated in some cases.

Furthermore, in the present specification, any of the embodiments and the example below can be combined as appropriate. In the case where some structural examples are given in one embodiment or example, any of the structural examples can be combined as appropriate.

Embodiment 1

Configurations of semiconductor devices of embodiments of the present invention will be described with reference to FIG. 1 to FIG. 5.

<Structural Example of Semiconductor Device 1>

A semiconductor device 1 illustrated in FIG. 1 includes an antenna 10, a battery 13, a logic circuit 18, a sensor 19, an analog memory 20, and an analog-to-digital converter (ADC) 22.

The antenna 10 has a function of converting a radio signal into an electric signal or converting an electric signal into a radio signal and transmitting/receiving the signal to/from an external device such as a reader. A plurality of antennas 10 may be provided depending on the frequency band of the radio signal. Note that the radio signal is a modulated carrier wave. Modulation methods include analog modulation and digital modulation, for example, and any of amplitude modulation, phase modulation, frequency modulation, and spread spectrum may be used.

The frequency band of the radio signal is appropriately selected according to the laws and the like. For example, a long wave band of a 135 kHz band, a short wave band of a 13.56 MHz band, an UHF band of a 900 MHz band, a microwave band of a 2.45 GHz band, or the like can be used. Depending on the frequency band of the radio signal, the structure of an antenna 10 can be determined. Note that the above radio signal is hereinafter referred to as a radio signal RF.

The antenna 10 has a function of receiving the radio signal RF and supplying power to circuits in the semiconductor device 1. Power supplied from the antenna 10 has a voltage $V_{DD}$.

The battery 13 has a function of being charged with the voltage $V_{DD}$ and discharged with a voltage $V_{BAT}$. The voltage $V_{BAT}$ is supplied to the circuits included in the semiconductor device 1. The battery 13 may be a secondary battery or an electric double layer capacitor, which can be repeatedly charged and discharged. The above structure allows the semiconductor device 1 to store power of the radio signal RF and to repeatedly operate. Note that the voltage $V_{BAT}$ is preferably lower than the voltage $V_{DD}$.

The sensor 19 has a function of outputting sensed data as a signal $S_{SNS}$. The signal $S_{SNS}$ is analog data. As the sensor 19, any of a variety of sensors can be used as needed. For example, the sensor 19 may be a strain sensor, a temperature sensor, an optical sensor, a gas sensor, a flame sensor, a smoke sensor, a humidity sensor, a pressure sensor, a flow sensor, a vibration sensor, a touch sensor, a voice sensor, a magnetic sensor, a radiation sensor, a smell sensor, a pollen sensor, an acceleration sensor, an inclination sensor, a gyro sensor, a direction sensor, or a power sensor.

The analog memory 20 has a function of storing the analog data sensed by the sensor 19 and outputting it as a signal $S_{AM}$. For example, a nonvolatile memory is preferably used as the analog memory 20. Furthermore, a nonvolatile memory using an oxide semiconductor transistor including an oxide semiconductor in a channel region is preferably used as the analog memory 20. Note that the details of the nonvolatile memory using the oxide semiconductor transistor will be described in Embodiment 2.

The ADC 22 has a function of converting the analog data stored in the analog memory 20 into digital data and outputting it as a signal $S_{ADC}$.

The logic circuit 18 has a function of controlling the circuits included in the semiconductor device 1. For example, the logic circuit 18 has a function of generating a control signal for reading the data from the analog memory 20. The logic circuit 18 also has a function of executing a command contained in the radio signal RF. In addition, the logic circuit 18 has a function of receiving the signal $S_{ADC}$ from the ADC 22 and outputting it to the antenna 10.

To the logic circuit 18, the voltage $V_{DD}$ and the voltage $V_{BAT}$ are supplied through a switch 32 and a switch 31, respectively. To the logic circuit 18, a clock signal CLK1 and a clock signal CLK2 are input through a switch 42 and a switch 41, respectively.

To the sensor 19, the voltage $V_{DD}$ and the voltage $V_{BAT}$ are supplied through a switch 34 and a switch 33, respectively.

To the analog memory 20, the voltage $V_{DD}$ and the voltage $V_{BAT}$ are supplied through a switch 36 and a switch 35, respectively. Furthermore, to the analog memory 20, the clock signal CLK1 and the clock signal CLK2 are input through the switch 44 and the switch 43, respectively.

To the ADC 22, the voltage $V_{DD}$ and the voltage $V_{BAT}$ are supplied through a switch 38 and a switch 37, respectively. Furthermore, to the ADC 22, the clock signal CLK1 and the clock signal CLK2 are input through a switch 46 and a switch 45, respectively.

The voltage $V_{DD}$ is preferably higher than the voltage $V_{BAT}$. Furthermore, the clock signal CLK1 preferably has a higher frequency than the clock signal CLK2.

The semiconductor device 1 is capable of driving the sensor 19 to perform sensing with the use of power (with the voltage $V_{BAT}$) stored in the battery 13 even when the radio signal RF is not supplied. Furthermore, the semiconductor device 1 is capable of driving the logic circuit 18 and the analog memory 20 to store in the analog memory 20 the data (the signal $S_{SNS}$) acquired by the sensor 19. Power stored in the battery 13 is used to store the data.

In that case, the semiconductor device 1 drives the logic circuit 18 and the analog memory 20 with the use of the clock signal CLK2 having a low frequency. Thus, power that is consumed by the logic circuit 18 and the analog memory 20 can be reduced in the semiconductor device 1, so that the semiconductor device 1 can save power of the battery 13. Consequently, the semiconductor device 1 can operate for a long time.

The use of a nonvolatile memory as the analog memory 20 allows the data acquired by the sensor 19 to keep being held even when power is not supplied to the analog memory 20.

When the radio signal RF is supplied to the antenna 10 from an external device such as a reader, the semiconductor device 1 can read data acquired by performing sensing. The semiconductor device 1 drives the logic circuit 18, the analog memory 20, and the ADC 22 with the use of the voltage $V_{DD}$ and the clock signal CLK1. The ADC 22 needs to be operated at higher speed than other circuits, and can be driven with the voltage $V_{DD}$, which is a high voltage, and the clock signal CLK1 with a high frequency. The signal $S_{ADC}$ generated by the ADC 22 is superimposed on a carrier wave and transmitted as the radio signal RF to the external device.

When the radio signal RF is supplied to the antenna 10, the battery 13 starts to be charged. The semiconductor device 1 can acquire sensing data and charge the battery at the same time, leading to saving in time and trouble for charge. The semiconductor device 1 is capable of easily charging the battery.

A more detailed configuration example of the semiconductor device 1 will be described with reference to FIG. 2.

Figure 2:
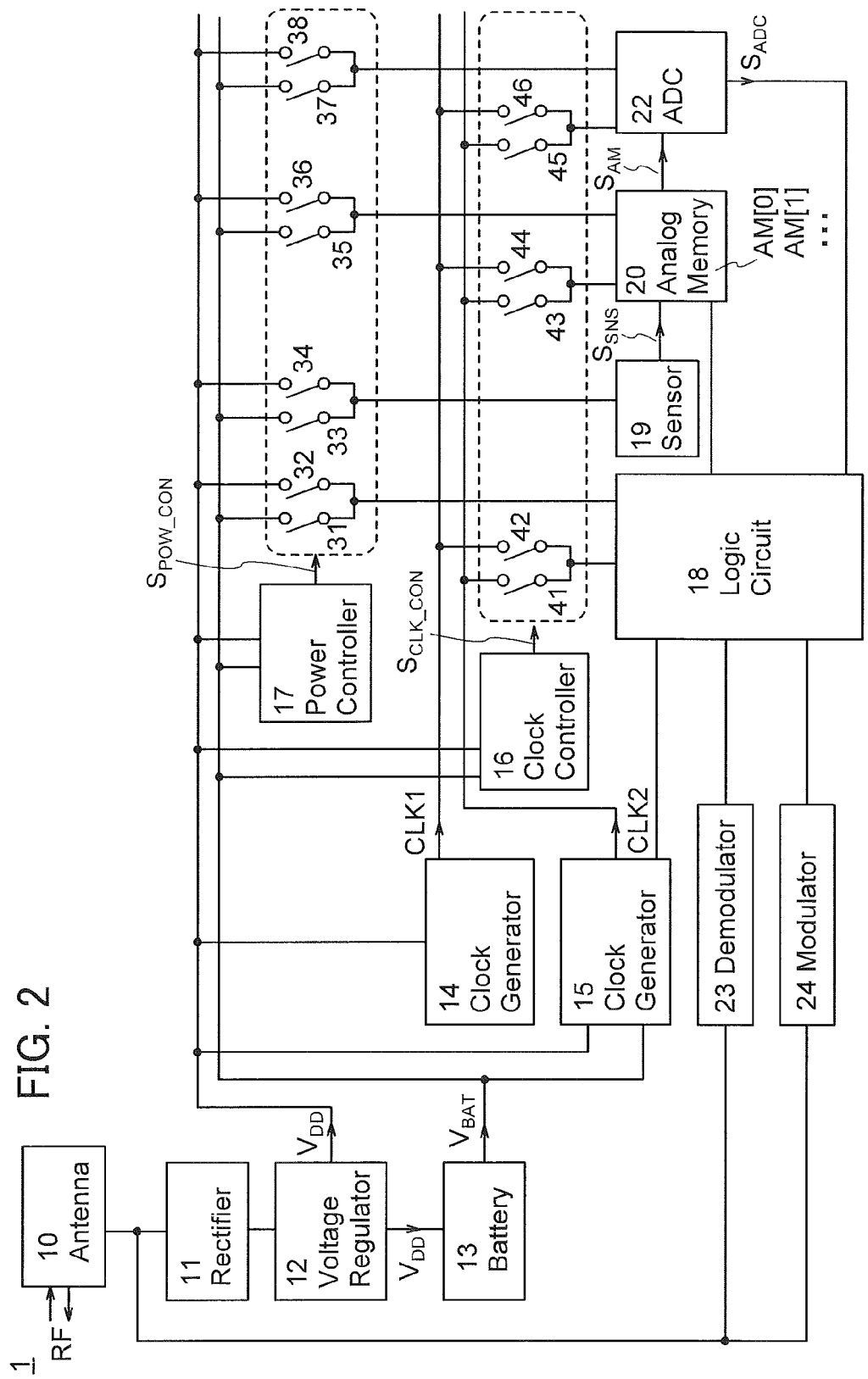
FIG. 2 is a block diagram illustrating a configuration example of a semiconductor device.

The semiconductor device 1 illustrated in FIG. 2 is different from the semiconductor device 1 illustrated in FIG. 1 in that a rectifier circuit 11, a constant voltage circuit 12, an oscillator circuit 14, an oscillator circuit 15, a clock control circuit 16, a power supply control circuit 17, a demodulation circuit 23, and a modulation circuit 24 are additionally provided.

The rectifier circuit 11 has a function of rectifying and smoothing an electric signal from the antenna 10. The rectified and smoothed signal is output to the constant voltage circuit 12.

Note that the rectifier circuit 11 may include a protection circuit (a limiter circuit). The protection circuit has a function of preventing damage to the circuits in the semiconductor device 1 when an electric signal from the antenna 10 has an extremely high voltage.

The constant voltage circuit 12 has a function of generating a voltage based on the voltage output from the rectifier circuit 11. The voltage $V_{DD}$ generated by the constant voltage circuit 12 is supplied to the circuits included in the semiconductor device 1. Note that one or more voltages may be generated by the constant voltage circuit 12.

Although not illustrated, a constant voltage circuit may be provided also in the battery 13 in order to stabilize the voltage $V_{BAT}$.

The oscillator circuit 14 has a function of generating the clock signal CLK1. The oscillator circuit 14 is driven at the voltage $V_{DD}$. As the oscillator circuit 14, either a quartz oscillator or a ring oscillator that generates the clock signal CLK1 may be used.

The oscillator circuit 15 has a function of generating the clock signal CLK2. The oscillator circuit 15 is driven at the voltage $V_{DD}$ or the voltage $V_{BAT}$. As the oscillator circuit 15, either a quartz oscillator or a ring oscillator that generates the clock signal CLK2 may be used.

Furthermore, the oscillator circuit 15 has a function of generating data that indicates a time.

The clock control circuit 16 has a function of controlling the clock signal that is input to the logic circuit 18, the analog memory 20, and the ADC 22. Specifically, the clock control circuit 16 has a function of generating a signal $S_{CLK\_CON}$ and controlling the on/off of the switches 41 to 46.

The power supply control circuit 17 has a function of controlling power that is supplied to the logic circuit 18, the sensor 19, the analog memory 20, and the ADC 22. Specifically, the power supply control circuit 17 has a function of generating a signal $S_{POW\_CON}$ and controlling the on/off of the switches 31 to 38.

The analog memory 20 includes a plurality of addresses AM[k−1] (k is a natural number of 1 or more) in which analog data is stored.

The demodulation circuit 23 has a function of demodulating an electric signal from the antenna 10. A demodulated signal is output to the logic circuit 18.

The modulation circuit 24 has a function of modulating an electric signal on the basis of a signal generated by the logic circuit 18. A modulated electric signal is superimposed on a carrier wave and transmitted as the radio signal RF through the antenna 10.

<Operation Example of Semiconductor Device 1>

Next, an operation example of the semiconductor device 1 will be described with reference to FIG. 3.

Figure 3:
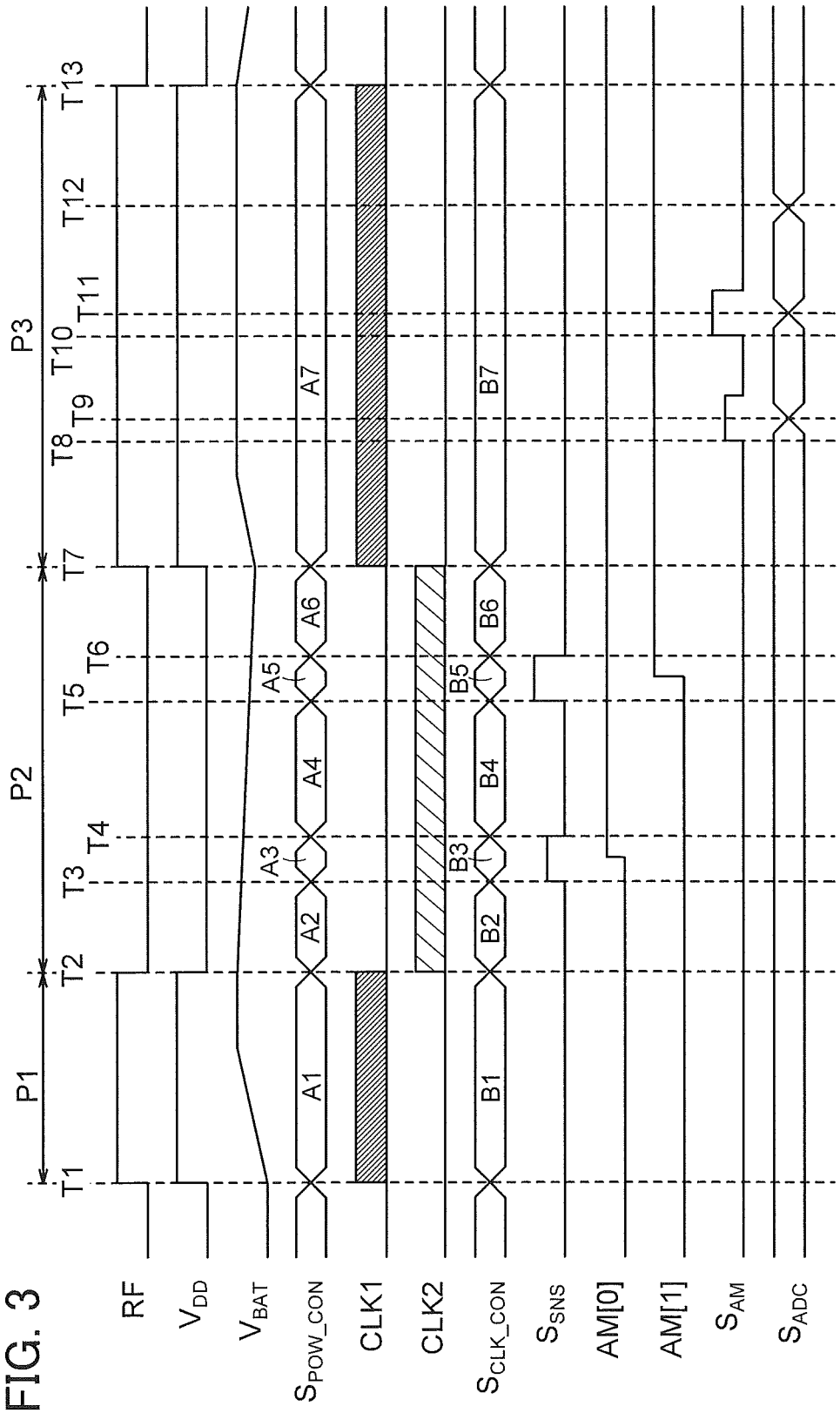
FIG. 3 is a timing chart showing an operation example of a semiconductor device.

FIG. 3 is a timing chart showing an operation example of the semiconductor device 1. FIG. 3 shows, from top down, the intensity of the radio signal RF, the voltage $V_{DD}$, the voltage $V_{BAT}$, the potential of the signal $S_{POW\_CON}$, the potential of the clock signal CLK1, the potential of the clock signal CLK2, the potential of the signal $S_{CLK\_CON}$, the potential of the signal $S_{SNS}$, the potential of the address AM[0], the potential of the address AM[1], the potential of the signal $S_{AM}$, and the potential of the signal $S_{ADC}$. Although the clock signals CLK1 and CLK2 are actually pulsed signals, they are shown as continuous signals in FIG. 3.

Although FIG. 3 shows only operation examples of the addresses AM[0] and AM[1], the operation of other addresses included in the analog memory 20 can be similarly explained.

Times T1 to T13 in FIG. 3 are used to describe operation timing.

A period from the time T1 to the time T2 is a period P1. A period from the time T2 to the time T7 is a period P2. A period from the time T7 to the time T13 is a period P3.

In the period P1, the semiconductor device 1 is supplied with the radio signal RF and charges the battery 13.

In the period P1, the circuits in the semiconductor device 1 are driven at the voltage $V_{DD}$ generated by the constant voltage circuit 12. Furthermore, in the period P1, the circuits in the semiconductor device 1 are supplied with the clock signal CLK1 generated by the oscillator circuit 14.

In the period P2, the semiconductor device 1 performs sensing by the sensor 19 and stores acquired data in the analog memory 20.

Furthermore, in the period P2, the circuits in the semiconductor device 1 are driven at the voltage $V_{BAT}$ generated by the battery 13. In addition, in the period P2, the circuits in the semiconductor device 1 are supplied with the clock signal CLK2 generated by the oscillator circuit 15. Since the clock signal CLK2 has a lower frequency than the clock signal CLK1, the semiconductor device 1 is capable of operating with low power, saving power of the battery 13. Consequently, the semiconductor device 1 is capable of operating even when the period P2, in which the radio signal RF is not supplied, is long.

In the period P3, the semiconductor device 1 is supplied with the radio signal RF again. At this time, the semiconductor device 1 converts data stored in the analog memory 20 into digital data by the ADC 22 and transmits the digital data superimposed on a carrier wave as the radio signal RF. In addition, in the period P3, the semiconductor device 1 charges the battery 13 as in the period P1.

Furthermore, in the period P3, the circuits in the semiconductor device 1 are driven at the voltage $V_{DD}$ generated in the constant voltage circuit 12. In addition, in the period P3, the circuits in the semiconductor device 1 are supplied with the clock signal CLK1 generated by the oscillator circuit 14. Since the clock signal CLK1 has a higher frequency than the clock signal CLK2, the semiconductor device 1 is capable of driving a circuit required to operate at high speed, such as the ADC 22.

In a period from the time T1 to the time T13, the signal $S_{POW\_CON}$ is divided into signals A1 to A7. The signals control the on/off of the switches 31 to 38, and control voltages to be supplied to the logic circuit 18, the sensor 19, the analog memory 20, and the ADC 22 as shown in Table 1.

TABLE 1

|  | A1 | A2 | A3 | A4 | A5 | A6 | A7 |
|---|---|---|---|---|---|---|---|
| 18 Logic Circuit | $V_{DD}$ | OFF | $V_{BAT}$ | OFF | $V_{BAT}$ | OFF | $V_{DD}$ |
| 19 Sensor | OFF | OFF | $V_{BAT}$ | OFF | $V_{BAT}$ | OFF | OFF |

TABLE 1-continued

|  | A1 | A2 | A3 | A4 | A5 | A6 | A7 |
|---|---|---|---|---|---|---|---|
| 20 Analog Memory | $V_{DD}$ | OFF | $V_{BAT}$ | OFF | $V_{BAT}$ | OFF | $V_{DD}$ |
| 22 ADC | $V_{DD}$ | OFF | OFF | OFF | OFF | OFF | $V_{DD}$ |

In the period from the time T1 to the time T13, the signal $S_{CLK\_CON}$ is divided into signals B1 to B7. The signals control the on/off of the switches 41 to 46, and control the clock signal to be supplied to the logic circuit 18, the analog memory 20, and the ADC 22 as shown in Table 2.

TABLE 2

|  | B1 | B2 | B3 | B4 | B5 | B6 | B7 |
|---|---|---|---|---|---|---|---|
| 18 Logic Circuit | CLK1 | OFF | CLK2 | OFF | CLK2 | OFF | CLK1 |
| 20 Analog Memory | CLK1 | OFF | CLK2 | OFF | CLK2 | OFF | CLK1 |
| 22 ADC | CLK1 | OFF | OFF | OFF | OFF | OFF | CLK1 |

The operation of the semiconductor device 1 will be described below in order from the time T1.

First, at the time T1, the radio signal RF is supplied to the antenna 10, the constant voltage circuit 12 supplies the voltage $V_{DD}$, and the battery 13 starts to be charged. The voltage $V_{BAT}$ increases as charging time advances and becomes constant when charge is completed.

As the signal $S_{POW\_CON}$, the signal A1 is supplied, so that the logic circuit 18, the analog memory 20, and the ADC 22 are driven at the voltage $V_{DD}$, and the sensor 19 is turned off (brought into a resting state) (Table 1).

As the signal $S_{CLK\_CON}$, the signal B1 is supplied, so that the clock signal CLK1 is input to the logic circuit 18, the analog memory 20, and the ADC 22 (Table 2).

Then, at the time T2, the supply of the radio signal RF is stopped, the constant voltage circuit 12 stops the supply of the voltage $V_{DD}$, and the battery 13 starts to release the voltage $V_{BAT}$. The stop of the supply of the voltage $V_{DD}$ stops the operation of the oscillator circuit 14, so that the supply of the clock signal CLK1 is stopped. The voltage $V_{BAT}$ is supplied from the battery 13, and the oscillator circuit 15 generates the clock signal CLK2.

As the signal $S_{POW\_CON}$, the signal A2 is supplied, so that the logic circuit 18, the sensor 19, the analog memory 20, and the ADC 22 are turned off (Table 1).

As the signal $S_{CLK\_CON}$, the signal B2 is supplied, so that the input of the clock signal to the logic circuit 18, the analog memory 20, and the ADC 22 is stopped (the logic circuit 18, the analog memory 20, and the ADC 22 are turned off) (Table 2).

Then, at the time T3, as the signal $S_{POW\_CON}$, the signal A3 is supplied, so that the voltage $V_{BAT}$ is supplied to the logic circuit 18, the sensor 19, and the analog memory 20, and the ADC 22 is turned off (Table 1).

As the signal $S_{CLK\_CON}$, the signal B3 is supplied, so that the clock signal CLK2 is input to the logic circuit 18 and the analog memory 20, and the input of the clock signal to the ADC 22 is stopped (Table 2).

At this time, the sensor 19 starts sensing, and the acquired signal $S_{SNS}$ is stored in the address AM[0] of the analog memory 20.

Then, at the time T4, the sensor 19 terminates sensing.

As the signal $S_{POW\_CON}$, the signal A4 is supplied, so that the logic circuit 18, the sensor 19, the analog memory 20, and the ADC 22 are turned off (Table 1).

As the signal $S_{CLK\_CON}$, the signal B4 is supplied, so that the input of the clock signal to the logic circuit 18, the analog memory 20, and the ADC 22 is stopped (Table 2).

Since the analog memory 20 is a nonvolatile memory, data stored in the address AM[0] keeps being held even when power supply is stopped.

Then, at the time T5, as the signal $S_{POW\_CON}$, the signal A5 is supplied, so that the voltage $V_{BAT}$ is supplied to the logic circuit 18, the sensor 19, and the analog memory 20, and the ADC 22 is turned off (Table 1).

As the signal $S_{CLK\_CON}$, the signal B5 is supplied, so that the clock signal CLK2 is input to the logic circuit 18 and the analog memory 20, and the input of the clock signal to the ADC 22 is stopped (Table 2).

At this time, the sensor 19 starts sensing, and the acquired signal $S_{SNS}$ is stored in the address AM[1] of the analog memory 20.

Then, at the time T6, the sensor 19 terminates sensing.

As the signal $S_{POW\_CON}$, the signal A6 is supplied, so that the logic circuit 18, the sensor 19, the analog memory 20, and ADC 22 are turned off (Table 1).

As the signal $S_{CLK\_CON}$, the signal B6 is supplied, so that the input of the clock signal to the logic circuit 18, the analog memory 20, and the ADC 22 is stopped (Table 2).

Since the analog memory 20 is a nonvolatile memory, data stored in the address AM[1] keeps being held even when power supply is stopped.

Next, at the time T7, the radio signal RF is supplied again, the constant voltage circuit 12 supplies the voltage $V_{DD}$, and the battery 13 starts to be charged. The radio signal RF contains a command to read data stored in the analog memory 20.

As the signal $S_{POW\_CON}$, the signal A7 is supplied, so that the logic circuit 18, the analog memory 20, and the ADC 22 are driven at the voltage $V_{DD}$, and the sensor 19 is turned off (Table 1).

As the signal $S_{CLK\_CON}$, the signal B7 is supplied, so that the clock signal CLK1 is input to the logic circuit 18, the analog memory 20, and the ADC 22 (Table 2).

Then, at the time T8, the analog memory 20 outputs the data held in the address AM[0] as the signal $S_{AM}$.

At the time T9, the ADC 22 converts the signal $S_{AM}$ into digital data and outputs it as the signal $S_{ADC}$.

At the time T10, the analog memory 20 outputs the data held in the address AM[1] as the signal $S_{AM}$.

At the time T11, the ADC 22 converts the signal $S_{AM}$ into digital data and outputs it as the signal $S_{ADC}$.

The signal $S_{ADC}$ output in a period from the time T9 to the time T12 is finally superimposed on a carrier wave and sent as the radio signal RF from the antenna 10.

At the time T13, the supply of the radio signal RF is stopped, and the constant voltage circuit 12 stops the supply of the voltage $V_{DD}$. After that, the semiconductor device 1 repeats the operation from the time T2.

By the above operation, the semiconductor device 1 is capable of performing sensing even when the radio signal RF is not supplied. Data acquired by sensing is temporarily stored in the nonvolatile memory, whereby all pieces of data can be read together when the radio signal RF is supplied.

Furthermore, the analog memory 20 is capable of storing analog data acquired by the sensor 19 without converting it into digital data; thus, power required for data conversion can be reduced. Therefore, the semiconductor device 1 can save power of the battery 13 in the period P2.

Power gating by the power supply control circuit 17 and clock gating by the clock control circuit 16 enable the semiconductor device 1 to be driven with low power.

Thus, the semiconductor device 1 is capable of performing sensing for a long time.

Note that in the operation example shown in FIG. 3, the sensor 19 is off in the period P1 and the period P3; however, the sensor 19 may be supplied with the voltage $V_{DD}$ also in the periods P1 and P3 in which the radio signal RF is supplied, to perform sensing.

Figure 6:
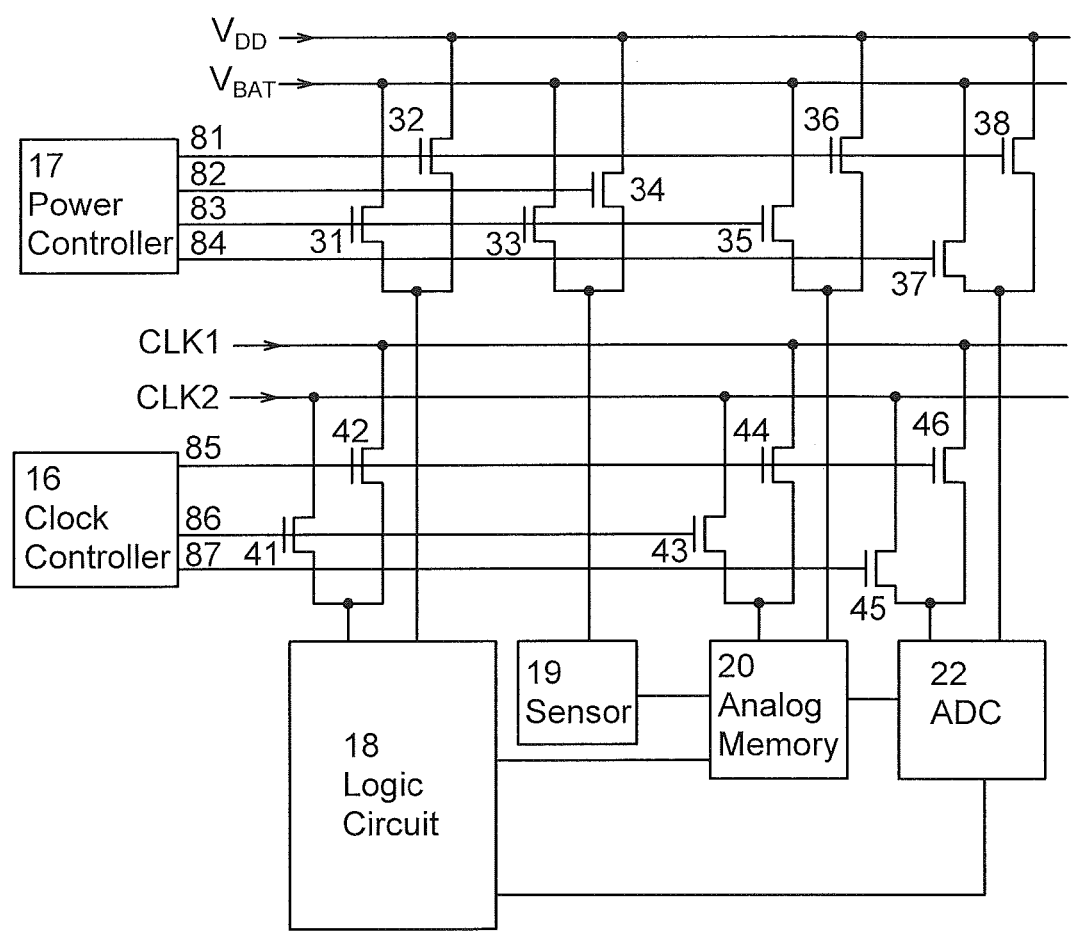
FIG. 6 is a circuit diagram illustrating a configuration example of a semiconductor device.

FIG. 6 is an example of a circuit diagram in which the switches 31 to 38 and the switches 41 to 46 are transistors. FIG. 6 is a circuit diagram in which all the switches are n-channel transistors; however, they may be p-channel transistors.

In FIG. 6, gates of the transistors as the switches 32, 36, and 38 are connected to a wiring 81, a gate of the transistor as the switch 34 is connected to a wiring 82, gates of the transistors as the switches 31, 33, and 35 are connected to a wiring 83, and a gate of the transistor as the switch 37 is connected to a wiring 84. The switches have the above structure, whereby the semiconductor device 1 can operate as shown in Table 1.

In FIG. 6, gates of the transistors as the switches 42, 44, and 46 are connected to a wiring 85, gates of the transistors as the switches 41 and 43 are connected to a wiring 86, and a gate of the transistor as the switch 45 is connected to a wiring 87. The switches have the above structure, whereby the semiconductor device 1 can operate as shown in Table 2.

Figure 7:
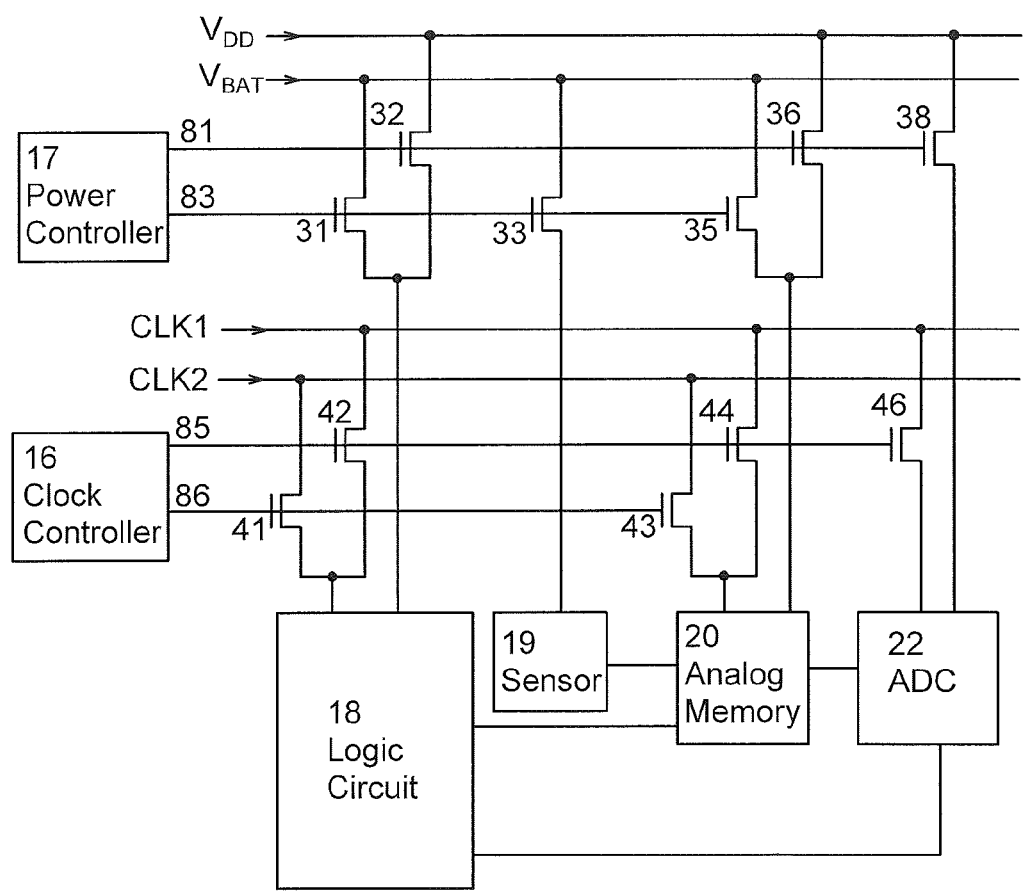
FIG. 7 is a circuit diagram illustrating a configuration example of a semiconductor device.

Note that the switch 34 and the wiring 82 may be omitted as illustrated in FIG. 7 so that the voltage $V_{DD}$ is not input to the sensor 19. Furthermore, the switch 37 and the wiring 84 may be omitted so that the voltage $V_{BAT}$ is not input to the ADC 22. Furthermore, the switch 45 and the wiring 87 may be omitted so that the clock signal CLK2 is not input to the ADC 22.

<Structural Example of Semiconductor Device 2>

Next, another structural example of a semiconductor device of one embodiment of the present invention will be described with reference to FIG. 4.

Figure 4:
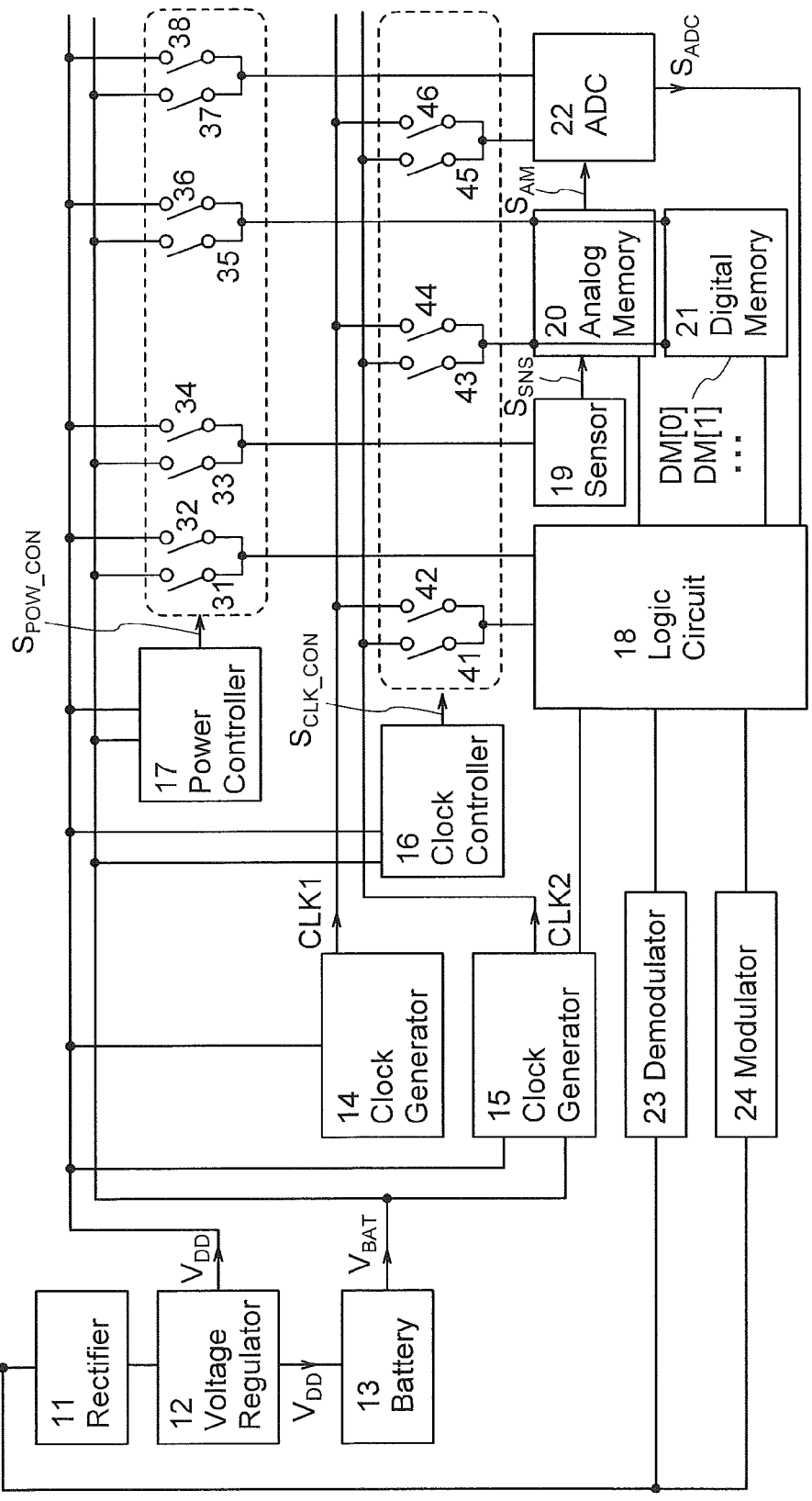
FIG. 4 is a block diagram illustrating a configuration example of a semiconductor device.

A semiconductor device 2 illustrated in FIG. 4 is different from the semiconductor device 1 illustrated in FIG. 2 in that a digital memory 21 is provided.

The digital memory 21 includes a plurality of addresses DM[k−1] (k is a natural number of 1 or more) in which digital data is stored.

The digital memory 21 has a function of storing a time at which the sensor 19 has performed sensing as digital data (time data). The logic circuit 18 has a function of adding time data stored in the digital memory 21 to the signal $S_{ADC}$ and outputting the signal $S_{ADC}$ containing the time data. Finally, the radio signal RF sent from the antenna 10 contains both the data acquired by the sensor 19 and the time at which sensing has been performed.

For example, as the digital memory 21, a nonvolatile memory is preferably used. As the nonvolatile memory, a flash memory, a ferroelectric random access memory (FeRAM), a magnetoresistive random access memory (MRAM), a phase change random access memory (PRAM), a resistance random access memory (ReRAM), or the like can be used, for example. Furthermore, as the digital memory 21, a nonvolatile memory using an oxide semiconductor is preferably used. Note that the details of the nonvolatile memory using an oxide semiconductor will be described in Embodiment 2.

Note that for the details of other components included in the semiconductor device 2, the description of the semiconductor device 1 can be referred to.

<Operation Example of Semiconductor Device 2>

An operation example of a semiconductor device 2 will be described with reference to a timing chart in FIG. 5.

Figure 5:
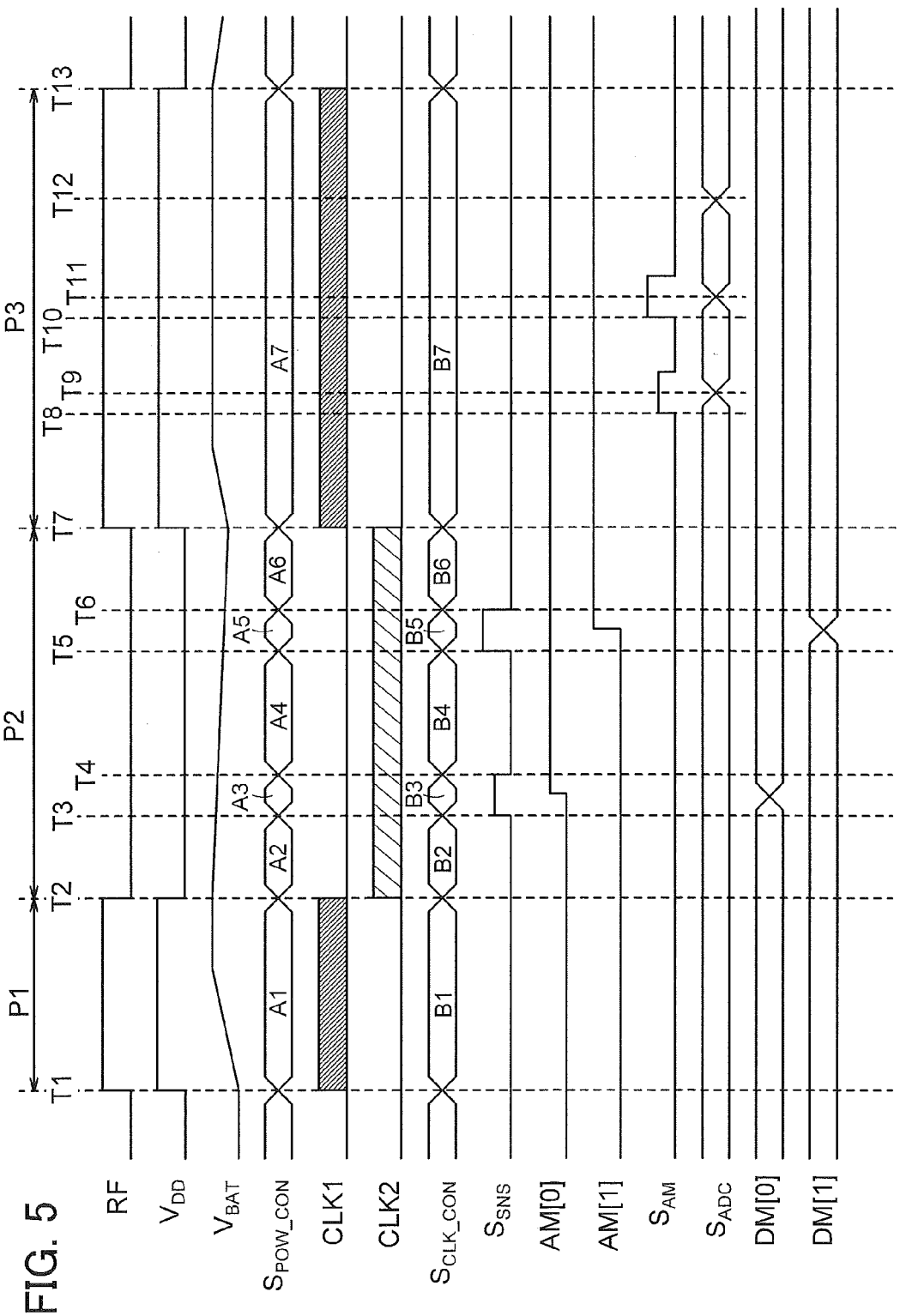
FIG. 5 is a timing chart showing an operation example of a semiconductor device.

The timing chart in FIG. 5 is different from the timing chart for the semiconductor device 1 in FIG. 3 in that the potentials of the addresses DM[0] and DM[1] of the digital memory 21 are shown.

Although only the potentials of the addresses DM[0] and DM[1] are shown in FIG. 5, the potentials of other addresses included in the digital memory 21 can be similarly described.

At the same time that the signal $S_{SNS}$ is written to the address AM[0], time data is written to the address DM[0], and at the same time that the signal $S_{SNS}$ is written to the address AM[1], time data is written to the address DM[1].

The data written to the digital memory 21 is superimposed on a carrier wave and transmitted as the radio signal RF in the period P3.

For the details of other parts in the timing chart in FIG. 5, the description of the timing chart in FIG. 3 can be referred to.

Although the sensor 19 is off in the period P1 and the period P3 in the operation example in FIG. 5, the sensor 19 may be supplied with the voltage $V_{DD}$ also in the period P1 and the period P3 in which the radio signal RF is supplied, to perform sensing.

The switches 31 to 38 and the switches 41 to 46 included in the semiconductor device 2 can be replaced with transistors as in FIG. 6 and FIG. 7.

The use of the semiconductor device 2 allows a measurer to acquire a time at which the sensor 19 has performed sensing, facilitating management or analysis of measurement data.

For example, in the case where there are significantly large number of parts to be measured as in damage assessment for a construction such as a bridge or a tunnel, measurement is performed using the above semiconductor device. In such a case, a measurer and a reader are needed only when all pieces of data are read together. Thus, manpower can be saved, and data can be acquired efficiently.

For example, in the case where the frequency of measurement is high as in monitoring biological data such as a heart rate and a pulse, measurement is performed using the above semiconductor device. In such a case, a reader is needed only when all pieces of data are read together. Therefore, a load on a measurer can be reduced.

Although the example where a secondary battery capable of being repeatedly charged and discharged is used as the battery 13 that is used for the semiconductor devices 1 and 2 is given, this embodiment is not limited to this example. For example, a primary battery that is only discharged may be used as the battery 13. In that case, the battery 13 is charged with the voltage $V_{DD}$; however, power gating by the power supply control circuit 17 and clock gating by the clock control circuit 16, which are described in this embodiment, enable the semiconductor devices 1 and 2 to be driven for a long time.

Embodiment 2

In this embodiment, a nonvolatile memory using an oxide semiconductor transistor (hereinafter referred to as an OS transistor) that can be used as the analog memory 20 or the digital memory 21 described in Embodiment 1 will be described.

Figure 8:
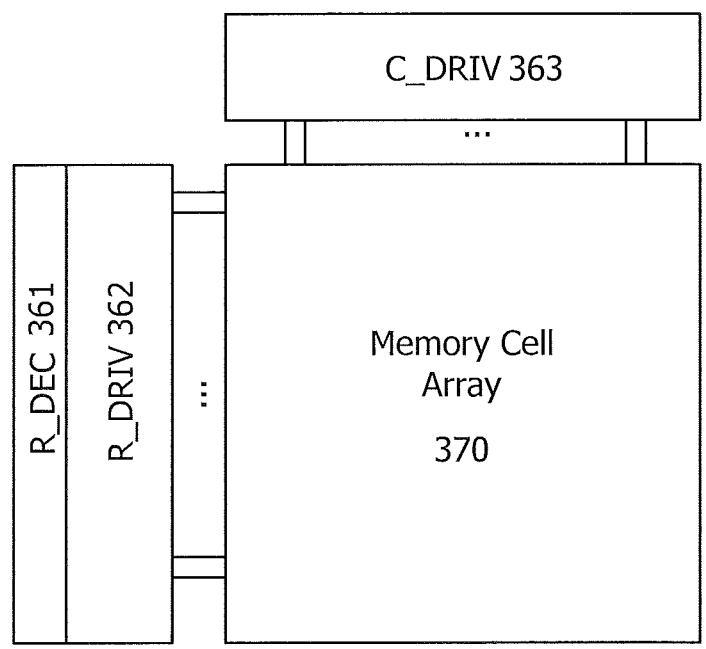
FIG. 8 is a block diagram illustrating a configuration example of a storage device.

FIG. 8 is a block diagram illustrating a structural example of a memory circuit 300. The memory circuit 300 includes a row decoder circuit 361, a row driver circuit 362, a column driver circuit 363, and a memory cell array 370.

Figure 9:
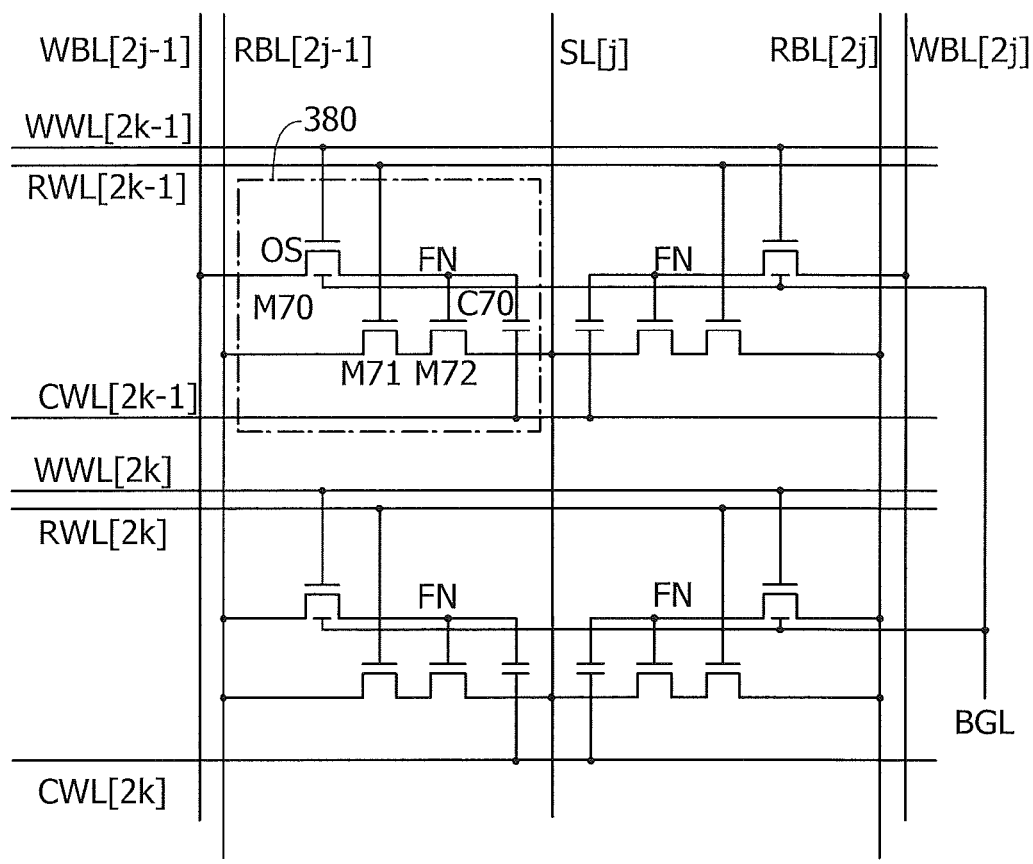
FIG. 9 is a circuit diagram illustrating a configuration example of a storage device.

The memory cell array 370 is a circuit in which a plurality of memory cells is arranged in an array. FIG. 9 is a circuit diagram illustrating a structural example of the memory cell array 370. FIG. 9 typically illustrates four memory cells 380 in [2j−1, 2k−1] to [2j, 2k] (j and k are integers of 1 or more).

The memory cells 380 each include transistors M70 to M72 and a capacitor C70. Here, the transistor M70 is an n-channel OS transistor. In addition, the transistors M71 and M72 are n-channel Si transistors. A node FN is a data storage portion of the memory cell array 370 that holds charge as data; in this example, the node FN corresponds to a gate of the transistor M72.

Figure 10:
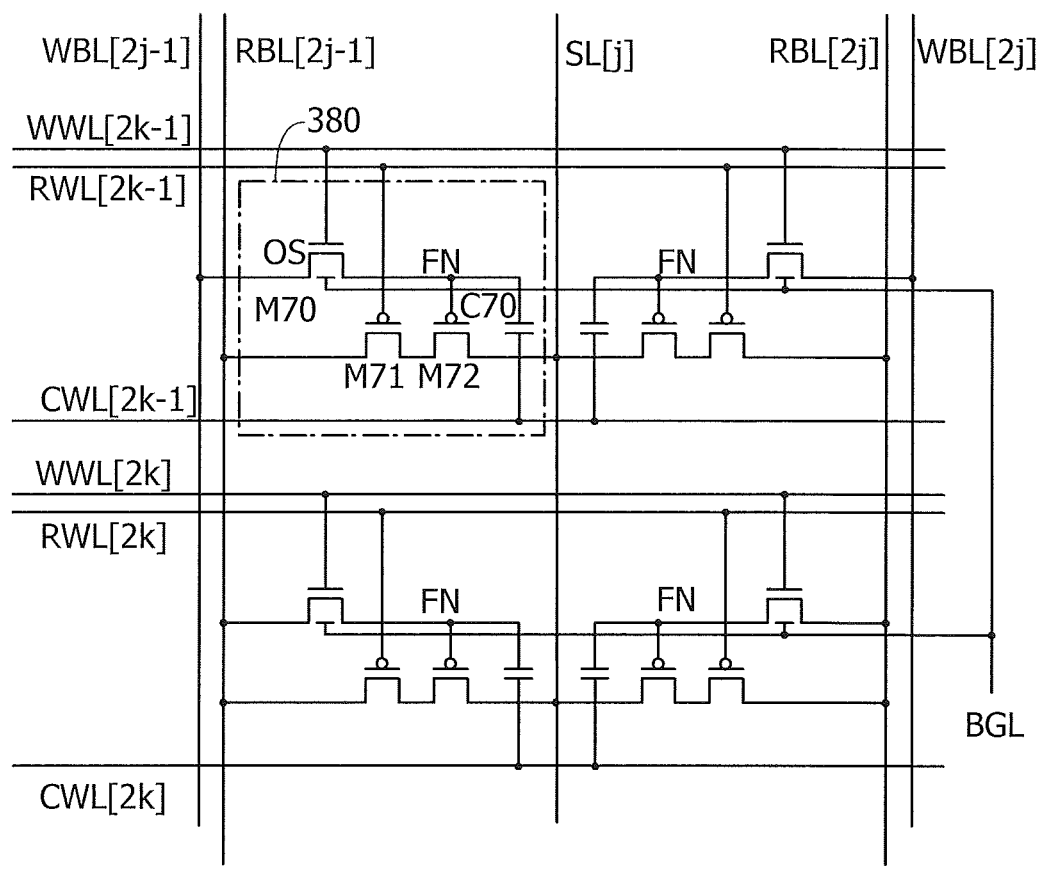
FIG. 10 is a circuit diagram illustrating a configuration example of a storage device.
Figure 11:
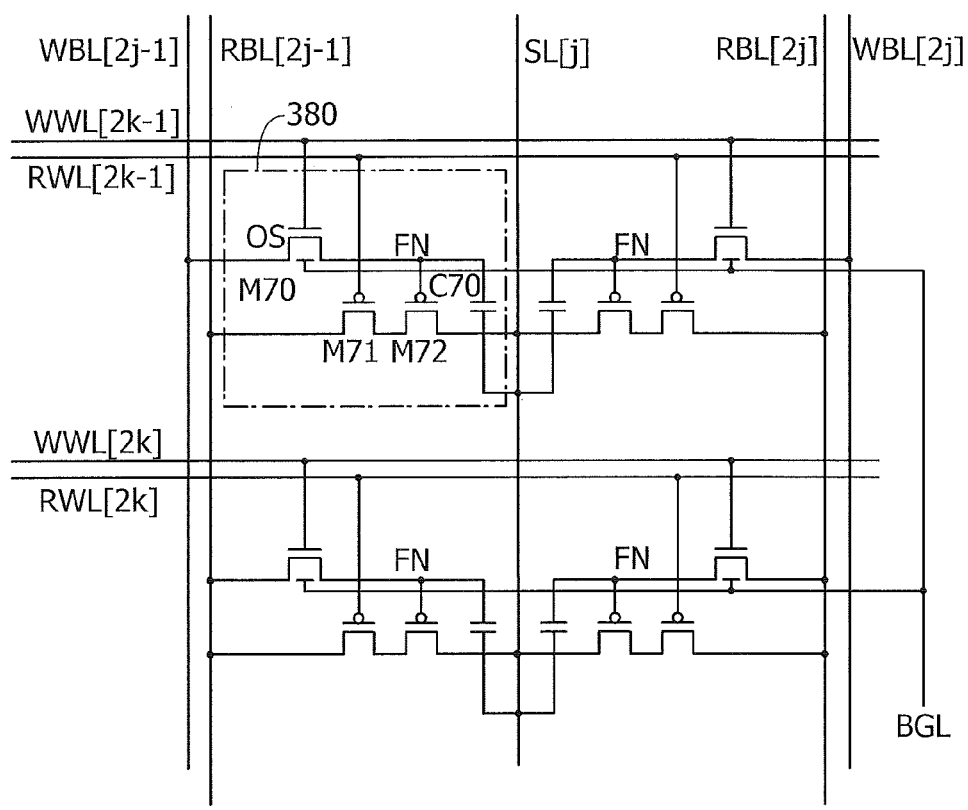
FIG. 11 is a circuit diagram illustrating a configuration example of a storage device.

The transistors M71 and M72 may be p-channel transistors. The example is shown in a memory cell array 371 in FIG. 10. When the transistors M71 and M72 are p-channel transistors, the wiring CWL connected to the capacitor C70 can be omitted and the wiring SL can be connected to the capacitor C70. FIG. 11 shows a circuit diagram of that case. A memory circuit 373 in FIG. 11 can reduce a circuit area because the wiring CWL can be omitted.

FIG. 9 is described again. The memory cell array 370 is provided with wirings (WWL, RWL, CWL, SL, WBL, RBL) in accordance with the arrangement of the memory cells 380. The memory cells 380 are connected to these wirings in corresponding rows and columns. Moreover, a wiring BGL is provided as a common wiring in the memory cell array 370. A back gate of the transistor M70 in each memory cell 380 is connected to the wiring BGL.

The wirings WWL and RWL function as a writing word line and a reading word line, respectively, and are both connected to the row driver circuit 362. The wiring CWL has a function of supplying a voltage to be applied to the capacitor C70.

The wiring SL functions as a source line and provided in every other column. The wiring WBL functions as a writing bit line and is a wiring to which memory data to be written to the memory cells 380 is supplied from the column driver circuit 363. The wiring RBL functions as a reading bit line and is a wiring through which memory data read out from the memory cells 380 is output. The wirings SL, WBL, and RBL are connected to the column driver circuit 363.

The capacitor C70 functions as a capacitor for holding charge of the node FN. One terminal of the capacitor C70 is connected to the node FN, and the other terminal of the capacitor C70 is connected to the wiring CWL. The wiring CWL is connected to the row driver circuit 362. Note that in the case where charge of the node FN can be held by a capacitor between wirings of the memory cell 380, the capacitor C70 and the wiring CWL need not be provided.

By turning on the transistor M70, a voltage corresponding to the data value is applied to the node FN. In addition, by turning off the transistor M70, the node FN is brought into an electrically floating state and the memory cell 380 is brought into a data retention state. Since the transistor M70 is an OS transistor, the leakage current flowing between a source and a drain of the transistor M70 in an off state is extremely low. Therefore, the memory cell 380 can retain data for a period of years (e.g., approximately 10 years) without refresh operation; thus, the memory cell 380 can be used as a nonvolatile memory cell. Moreover, since Vth of the transistor M70 is shifted in the positive direction by applying VBG to a back gate, a voltage lower than Vth can be more reliably applied to the gate of the transistor M70 in the data retention state; accordingly, the memory cell 380 with little data retention errors can be obtained.

Thus, the use of the memory circuit 300 for the analog memory 20 and the digital memory 21 allows the semiconductor devices 1 and 2 to hold data even in the state where the semiconductor devices 1 and 2 do not receive the signal RF. The operation of the memory cell array 370 (the memory circuit 300) will be described below in more detail with reference to FIG. 12.

Note that in a memory circuit that utilizes an extremely low off-state current of an OS transistor, a predetermined voltage might keep being supplied to the transistor in a period for holding data. For example, a voltage at which the transistor is completely turned off might keep being supplied to a gate of the transistor. Alternatively, a voltage at which the threshold voltage of the transistor is shifted to make the transistor in a normally-off state might keep being supplied to a back gate of the transistor. In those cases, the voltage is supplied to the memory circuit in the period for retaining data. However, because almost no current flows, little power is consumed. Because of little power consumption, the memory circuit can be regarded as being substantially nonvolatile even if a predetermined voltage is supplied to the memory circuit.

Figure 12:
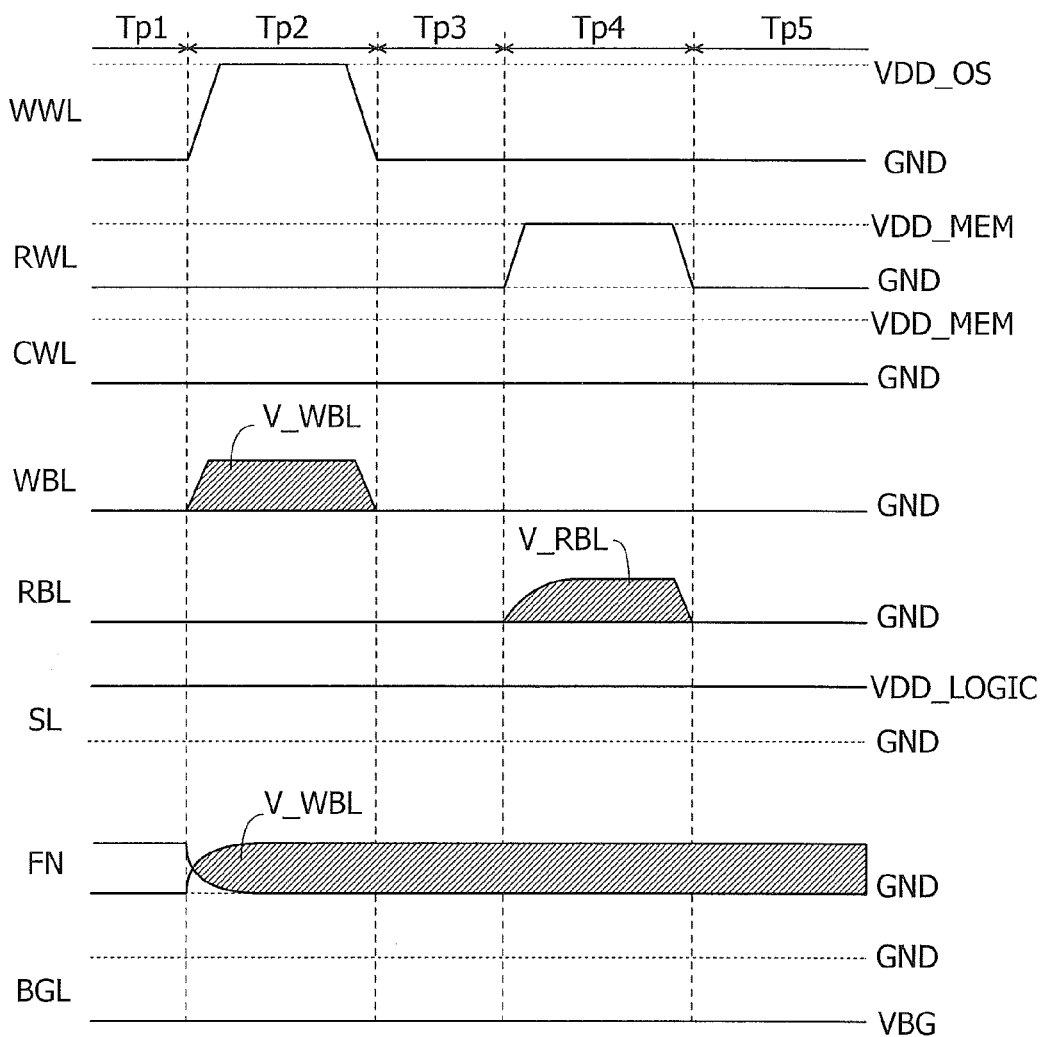
FIG. 12 is a timing chart showing an operation example of a storage device.

FIG. 12 is a timing chart showing an operation example of the memory cell array 370 (memory circuit 300). Specifically, FIG. 12 shows waveforms of signals that are input to the memory cell array 370 and the voltages (high level ("H")/low level ("L")) of wirings and nodes included in the memory cell array 370. In this example, a constant voltage is applied to the wirings CWL, SL, and BGL. Note that the voltages shown in FIG. 12 satisfy the following relation.

VDD_OS>VDD_MEM>VDD_LOGIC>GND>VBG

In a period Tp1, the memory circuit 300 is in a stand-by state (Stdby). The stand-by state means a state in which data is held in the memory circuit 300. The wirings WWL, WBL, and RBL are at "L" and the wiring RWL, is at "H".

A period Tp2 is a writing operation period. The wiring WWL in a row to which data is written becomes at "H", turning on the transistor M70, whereby the node FN and the wiring WBL are in electrical contact. The wiring WBL is supplied with V_WBL; accordingly, the node FN is also supplied with V_WBL. By setting the wiring WWL at "L" to turn off the transistor M70, the data writing operation is terminated and the memory cell 380 is brought into a stand-by state.

A period Tp3 is a stand-by period. As described above, since Vth of the transistor M70 is shifted in the positive direction by applying a negative voltage VBG to a back gate, the leakage current of the transistor M70 is extremely low. Therefore, the voltage that is recognized as V_WBL can be held in the node FN for a period of years (e.g., approximately 10 years).

A period Tp4 is a reading operation period. First, the wiring RBL is brought into an electrically flowing state, and then the wiring RWL in a row from which data is read becomes at "H", turning on the transistor M71 in the row. When V_WBL is higher than Vth of the transistor M72, the transistor M72 is also turned on. A current flows between the wiring SL and the wiring RBL through the transistors M71 and M72, and the potential of the wiring RBL increases. After a while, the potential difference between the gate (node FN) of the transistor M72 and the wiring RBL reaches Vth of the transistor M72, so that the transistor M72 is turned off. The rise of the potential of the wiring RBL stops, and the potential of the wiring RBL is stabilized to be a certain value. The potential (V_RBL) of the wiring RBL at this time is read out, whereby data written to the memory cell 380 can be read out.

In a period Tp5, the memory circuit 300 is in a stand-by state, in which the voltage levels of the node FN and the wirings are the same as those in the period Tp1.

By the above operation, the memory cell array 370 can write and read data.

Figure 13:
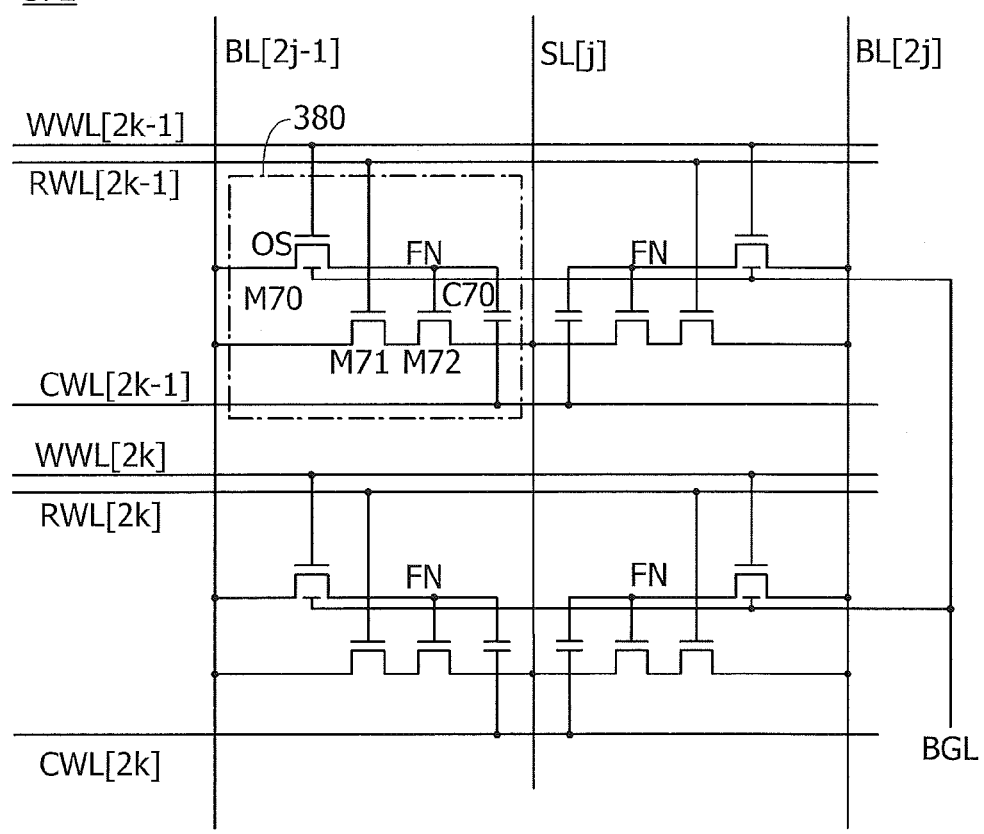
FIG. 13 is a circuit diagram illustrating a configuration example of a storage device.

FIG. 13 illustrates another structural example of the memory cell array. A memory cell array 372 illustrated in FIG. 13 is a modification example of the memory cell array 370. The memory cell array 372 is different from the memory cell array 370 in having a wiring BL serving as both the wiring WBL and the wiring RBL. That is, in the example of FIG. 9, two kinds of bit lines which are for writing and for reading are provided, while in the example of FIG. 13, one kind of bit line is provided.

Figure 14:
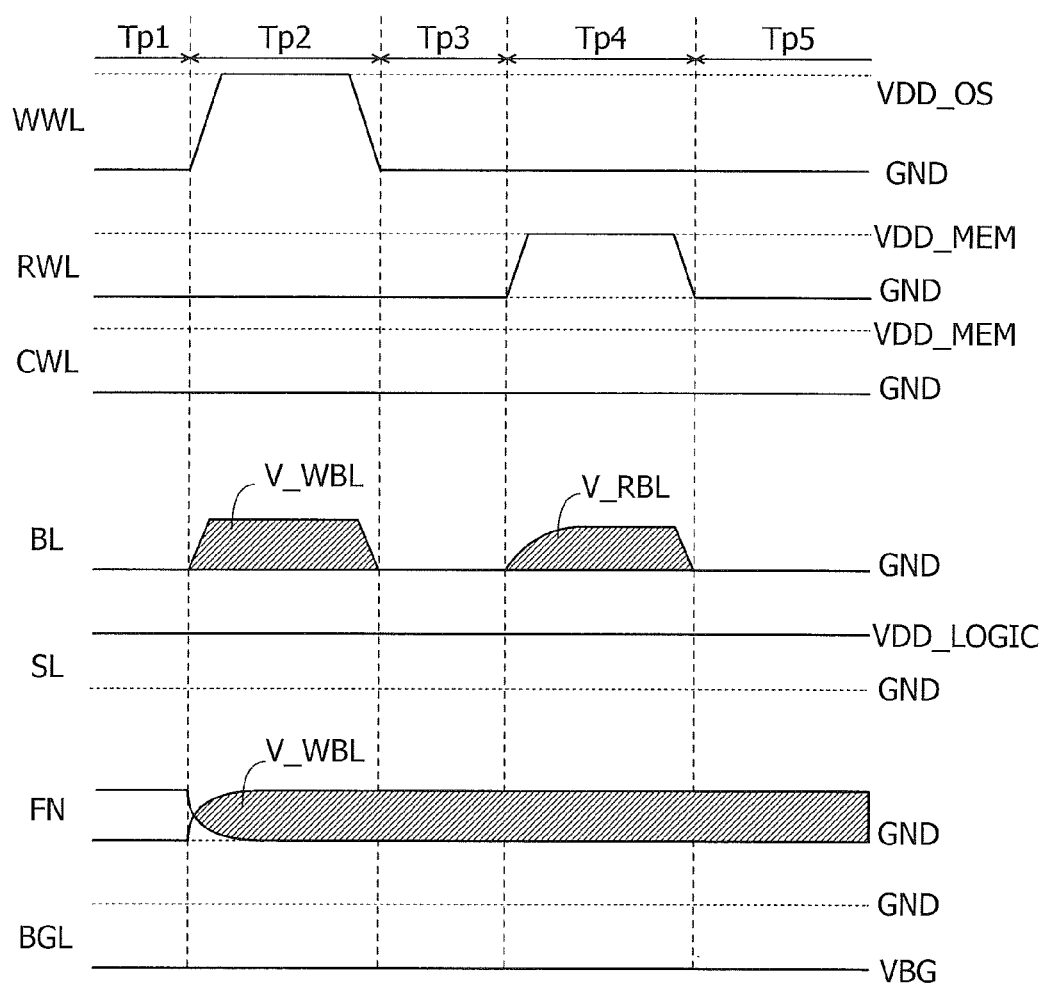
FIG. 14 is a timing chart showing an operation example of a storage device.

FIG. 14 is a timing chart showing an operation example of the memory cell array 372. As shown in FIG. 14, the memory cell array 372 can be driven in a manner similar to that of the memory cell array 370. The wiring BL has both functions of the wirings WBL and RBL.

In the case where the memory circuit 300 is used as an analog memory, V_WBL and V_RBL are treated as analog data in the above description. In the case where the memory circuit 300 is used as a digital memory, V_WBL and V_RBL are treated as digital data of "H" or "L".

Embodiment 3

In this embodiment, a structural example of the OS transistor described in Embodiment 2 will be described.
<Structural Example 1 of Transistor>

Figure 15A:
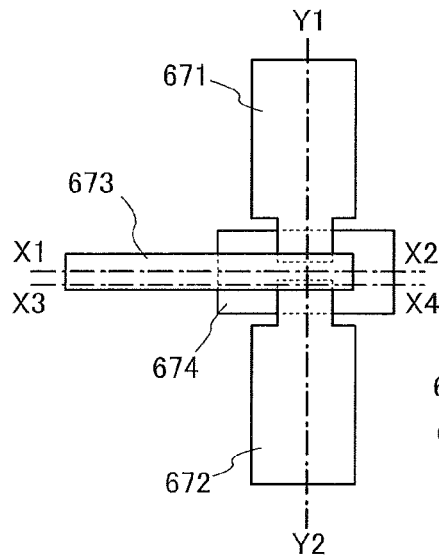
FIGS. 15A to 15D are a top view and cross-sectional views illustrating a structural example of a transistor.
Figure 15B:
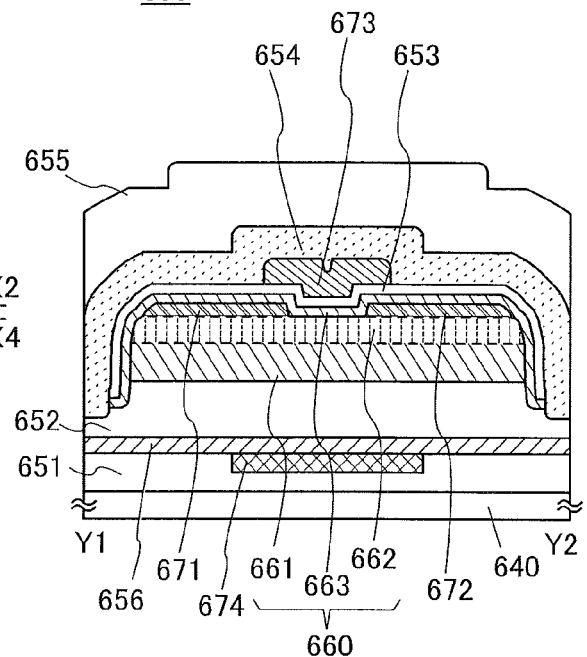
Figure 15C:
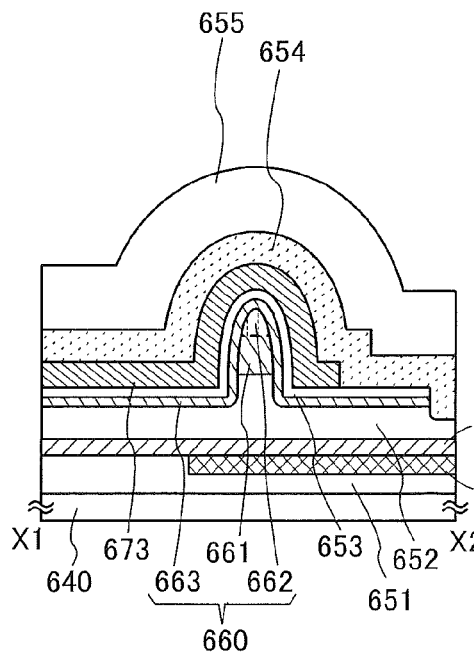
Figure 15D:
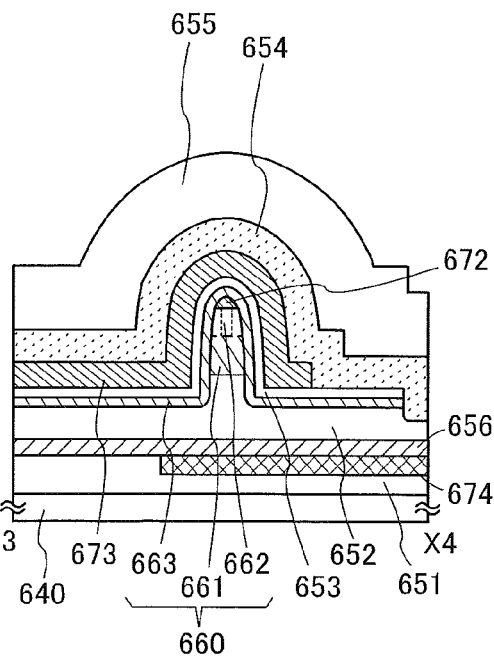

FIGS. 15A to 15D are a top view and cross-sectional views of a transistor 600. FIG. 15A is the top view. FIG. 15B illustrates a cross section along dashed-dotted line Y1-Y2 in FIG. 15A. FIG. 15C illustrates a cross section along dashed-dotted line X1-X2 in FIG. 15A. FIG. 15D illustrates a cross section along dashed-dotted line X3-X4 in FIG. 15A. In FIGS. 15A to 15D, some components are scaled up or down or omitted for easy understanding. In some cases, the direction of the dashed-dotted line Y1-Y2 is referred to as a channel length direction and the direction of the dashed-dotted line X1-X2 is referred to as a channel width direction.

Note that the channel length refers to, for example, a distance between a source (source region or source electrode) and a drain (drain region or drain electrode) in a region where a semiconductor (or a portion where a current flows in a semiconductor when a transistor is on) and a gate electrode overlap with each other or a region where a channel is formed in a top view of the transistor. In one transistor, channel lengths in all regions are not necessarily the same. In other words, the channel length of one transistor is not limited to one value in some cases. Therefore, in this specification, the channel length is any one of values, the maximum value, the minimum value, or the average value in a region where a channel is formed.

The channel width refers to, for example, the length of a portion where a source and a drain face each other in a region where a semiconductor (or a portion where a current flows in a semiconductor when a transistor is on) and a gate electrode overlap with each other, or a region where a channel is formed. In one transistor, channel widths in all regions are not necessarily the same. In other words, the channel width of one transistor is not limited to one value in some cases. Therefore, in this specification, the channel width is any one of values, the maximum value, the minimum value, or the average value in a region where a channel is formed.

Note that depending on transistor structures, a channel width in a region where a channel is actually formed (hereinafter referred to as an effective channel width) is different from a channel width shown in a top view of a transistor (hereinafter referred to as an apparent channel width) in some cases. For example, in a transistor having a three-dimensional structure, an effective channel width is greater than an apparent channel width shown in a top view of the transistor, and its influence cannot be ignored in some cases. For example, in a miniaturized transistor having a three-dimensional structure, the proportion of a channel region formed in a side surface of a semiconductor is high in some cases. In that case, an effective channel width obtained when a channel is actually formed is greater than an apparent channel width shown in the top view.

In a transistor having a three-dimensional structure, an effective channel width is difficult to measure in some cases. For example, estimation of an effective channel width from a design value requires an assumption that the shape of a semiconductor is known. Therefore, in the case where the shape of a semiconductor is not known accurately, it is difficult to measure an effective channel width accurately.

Therefore, in this specification, in a top view of a transistor, an apparent channel width that is a length of a portion where a source and a drain face each other in a region where a semiconductor and a gate electrode overlap with each other is referred to as a surrounded channel width (SCW) in some cases. Furthermore, in this specification, in the case where the term "channel width" is simply used, it may denote a surrounded channel width and an apparent channel width. Alternatively, in this specification, in the case where the term "channel width" is simply used, it may denote an effective channel width in some cases. Note that the values of a channel length, a channel width, an effective channel width, an apparent channel width, a surrounded channel width, and the like can be determined by obtaining and analyzing a cross-sectional TEM image and the like.

Note that in the case where field-effect mobility, a current value per channel width, and the like of a transistor are obtained by calculation, a surrounded channel width may be used for the calculation. In that case, the values may be different from those calculated using an effective channel width in some cases.

The transistor 600 includes a substrate 640; an insulating film 651 over the substrate 640; a conductive film 674 over the insulating film 651; an insulating film 656 over the insulating film 651 and the conductive film 674; an insulating film 652 over the insulating film 656; a semiconductor 661 and a semiconductor 662 stacked over the insulating film 652 in this order; a conductive film 671 and a conductive film 672 in contact with the top surface of the semiconductor 662; a semiconductor 663 in contact with the semiconductor 661, the semiconductor 662, the conductive film 671, and the conductive film 672; an insulating film 653 and a conductive film 673 over the semiconductor 663; an insulating film 654 over the conductive film 673 and the insulating film 653; and an insulating film 655 over the insulating film 654. Note that the semiconductor 661, the semiconductor 662, and the semiconductor 663 are collectively referred to as a semiconductor 660.

The conductive film 671 functions as a source electrode of the transistor 600. The conductive film 672 functions as a drain electrode of the transistor 600.

The conductive film 673 functions as a first gate electrode of the transistor 600.

The insulating film 653 functions as a first gate insulating film of the transistor 600.

The conductive film 674 has a function as a second gate electrode of the transistor 600.

The insulating films 656 and 652 have a function as a second gate insulating film of the transistor 600.

Potentials applied to the conductive films 673 and 674 may be the same or different from each other. Note that the conductive film 674 is unnecessary in some cases.

As illustrated in FIG. 15C, a side surface of the semiconductor 662 is surrounded by the conductive film 673. With such a structure, the semiconductor 662 can be electrically surrounded by an electric field of the conductive film 673 (a transistor structure in which a semiconductor is electrically surrounded by an electric field of a conductive film (gate electrode) is referred to as a surrounded channel (s-channel) structure). Therefore, a channel is formed in the entire semiconductor 662 (bulk) in some cases. In the s-channel structure, a large amount of current can flow between a source and a drain of a transistor, so that high current in an on state (on-state current) can be achieved. The s-channel structure enables a transistor to operate at high frequency.

The s-channel structure, because of its high on-state current, is suitable for a semiconductor device such as large-scale integration (LSI) which requires a miniaturized transistor. A semiconductor device including the miniaturized transistor can have a high integration degree and high density. The transistor preferably has, for example, a region where a channel length is greater than or equal to 10 nm and less than 1 μm, more preferably greater than or equal to 10 nm and less than 100 nm, still more preferably greater than or equal to 10 nm and less than 70 nm, yet still more preferably greater than or equal to 10 nm and less than 60 nm, and yet still more preferably greater than or equal to 10 nm and less than 30 nm. In addition, the transistor preferably has, for example, a region where a channel width is greater than or equal to 10 nm and less than 1 μm, more preferably greater than or equal to 10 nm and less than 100 nm, still more preferably greater than or equal to 10 nm and less than 70 nm, yet still more preferably greater than or equal to 10 nm and less than 60 nm, and yet still more preferably greater than or equal to 10 nm and less than 30 nm.

Since a high on-state current can be obtained, the s-channel structure is suitable for a transistor that needs to operate at high frequency. A semiconductor device including the transistor can operate at high frequency.

The insulating film 651 has a function of electrically isolating the substrate 640 and the conductive film 674 from each other.

The insulating film 652 preferably includes an oxide. In particular, the insulating film 652 preferably includes an oxide material from which part of oxygen is released by heating. The insulating film 652 preferably includes an oxide containing oxygen in excess of that in the stoichiometric composition. Part of oxygen is released by heating from the oxide film containing oxygen in excess of that in the stoichiometric composition. Oxygen released from the insulating film 652 is supplied to the semiconductor 660 that is an oxide semiconductor, so that oxygen vacancies in the oxide semiconductor can be reduced. Consequently, changes in the electrical characteristics of the transistor can be reduced and the reliability of the transistor can be improved.

The oxide film containing oxygen in excess of that in the stoichiometric composition is an oxide film of which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in thermal desorption spectroscopy (TDS) analysis, for example. Note that the temperature of the film surface in the TDS analysis is preferably higher than or equal to 100° C. and lower than or equal to 700° C., or higher than or equal to 100° C. and lower than or equal to 500° C.

The insulating film 656 has a function of preventing oxygen contained in the insulating film 652 from decreasing by bonding to metal contained in the conductive film 674.

The insulating film 654 has a function of blocking oxygen, hydrogen, water, alkali metal, alkaline earth metal, and the like. Providing the insulating an 654 can prevent outward diffusion of oxygen from the semiconductor 660 and entry of hydrogen, water, or the like into the semiconductor 660 from the outside.

Next, semiconductors which can be used as the semiconductors 661 to 663 or the like will be described below.

In the transistor 600, it is preferable that the current flowing between a source and drain in an off state (off-state current) be low. Here, the term "low off-state current" means that a normalized off-state current per micrometer of channel width at room temperature with a source-drain voltage of 10 V is lower than or equal to $10 \times 10^{-21}$ A. An example of a transistor with such a low off-state current is a transistor including an oxide semiconductor as a semiconductor.

The semiconductor 662 is, for example, an oxide semiconductor containing indium (In). The semiconductor 662 has a high carrier mobility (electron mobility) when containing, for example, indium. The semiconductor 662 preferably contains an element M. The element M is preferably aluminum (Al), gallium (Ga), tin (Sn), or the like. Other elements which can be used as the element M include silicon (Si), boron (B), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), and tungsten (W). Note that two or more of the above elements may be used in combination as the element M. The element M is an element having high bonding energy with oxygen, for example. The element M is an element whose bonding energy with oxygen is higher than that of indium. The element M is an element that can increase the energy gap of the oxide semiconductor, for example. Furthermore, the semiconductor 662 preferably contains zinc (Zn). When the oxide semiconductor contains zinc, the oxide semiconductor is easily crystallized in some cases.

Note that the semiconductor 662 is not limited to the oxide semiconductor containing indium. The semiconductor 662 may be, for example, an oxide semiconductor which does not contain indium and contains zinc, an oxide semiconductor which does not contain indium and contains gallium, or an oxide semiconductor which does not contain indium and contains tin, e.g., a zinc tin oxide or a gallium tin oxide.

For the semiconductor 662, an oxide with a wide energy gap may be used. For example, the energy gap of the semiconductor 662 is greater than or equal to 2.5 eV and less than or equal to 4.2 eV, preferably greater than or equal to 2.8 eV and less than or equal to 3.8 eV, more preferably greater than or equal to 3 eV and less than or equal to 3.5 eV.

The semiconductor 662 is preferably a CAAC-OS film which will be described later.

For example, the semiconductor 661 and the semiconductor 663 include one or more, or two or more elements other than oxygen included in the semiconductor 662. Since the semiconductor 661 and the semiconductor 663 each include one or more, or two or more elements other than oxygen included in the semiconductor 662, an interface state is less likely to be formed at the interface between the semiconductor 661 and the semiconductor 662 and the interface between the semiconductor 662 and the semiconductor 663.

In the case of using an In-M-Zn oxide as the semiconductor 661 and the summation of In and M is assumed to be 100 atomic %, the proportions of In and M are preferably set to be less than 50 atomic % and greater than 50 atomic %, respectively, more preferably less than 25 atomic % and greater than 75 atomic %, respectively. In the case where the semiconductor 661 is formed by a sputtering method, a sputtering target with the above composition, for example, a sputtering target containing In, M, and Zn at an atomic ratio of 1:3:2, is preferably used.

In the case where an In-M-Zn oxide is used for the semiconductor 662 and the summation of In and M is assumed to be 100 atomic %, the proportions of In and M are preferably set to be greater than 25 atomic % and less than 75 atomic %, respectively, and more preferably greater than 34 atomic % and less than 66 atomic %, respectively. In the case where the semiconductor 662 is formed by a sputtering method, a sputtering target with the above composition, for example, a sputtering target containing In, M, and Zn at an atomic ratio of 1:1:1, 1:1:1.2, 2:1:3, 3:1:2, or 4:2:4.1, is preferably used. In particular, when a sputtering target containing In, Ga, and Zn at an atomic ratio of 4:2:4.1 is used, the semiconductor 662 may contain In, Ga, and Zn at an atomic ratio of around 4:2:3.

In the case of using an In-M-Zn oxide as the semiconductor 663, when the summation of In and M is assumed to be 100 atomic %, the proportions of In and M are preferably set to be less than 50 atomic % and greater than 50 atomic %, respectively, more preferably less than 25 atomic % and greater than 75 atomic %, respectively. Note that the semiconductor 663 and the semiconductor 661 may be formed using the same type of oxide. Note that the semiconductor 661 and/or the semiconductor 663 do/does not necessarily contain indium in some cases. For example, the semiconductor 661 and/or the semiconductor 663 may be gallium oxide.

Figure 16A:
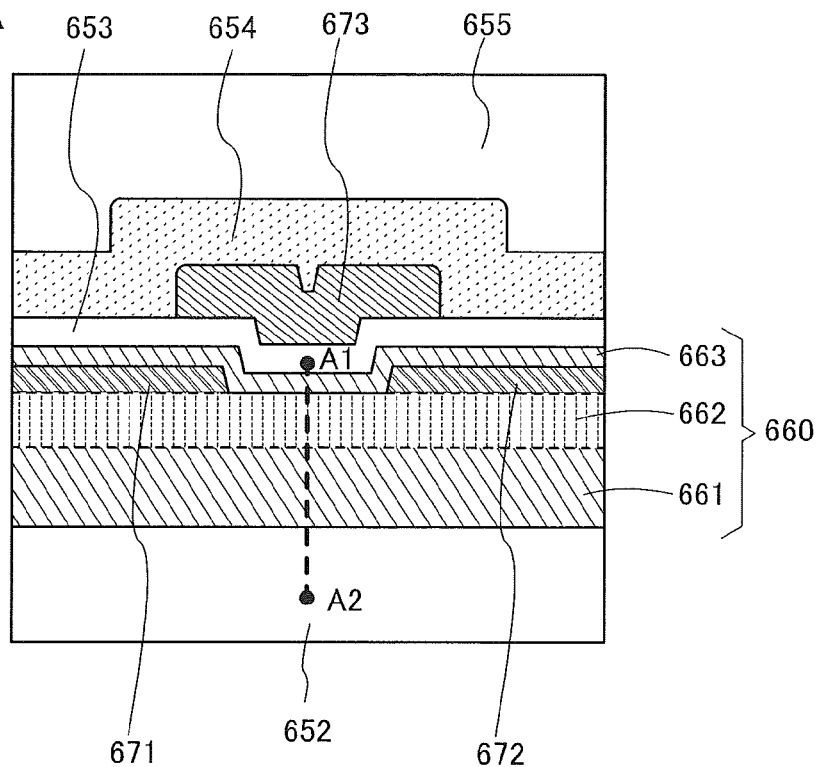
FIGS. 16A and 16B are a cross-sectional view and an energy band diagram showing a structural example of a transistor.
Figure 16B:
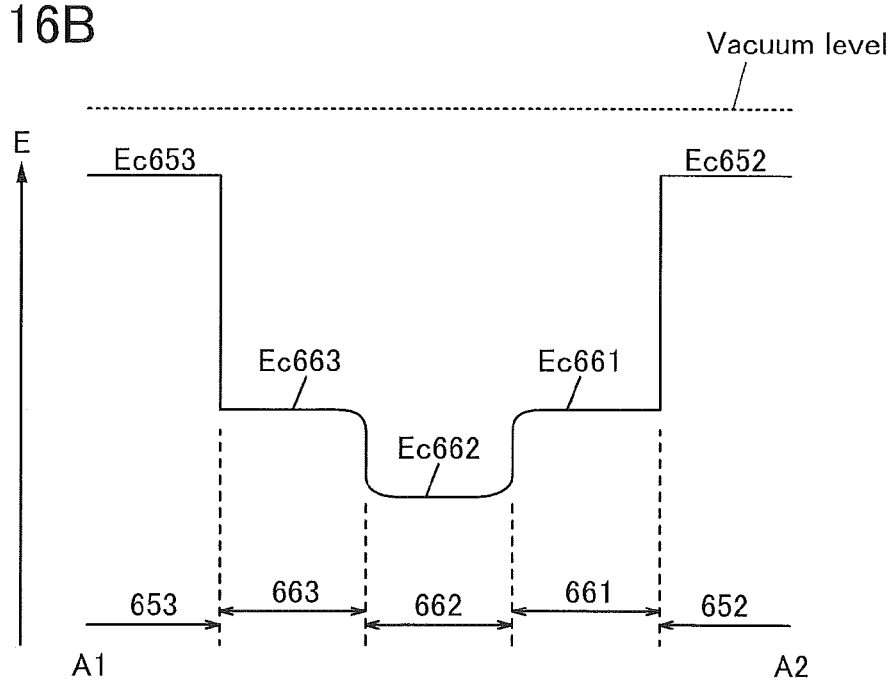

Next, a function and an effect of the semiconductor 660 in which the semiconductor 661, the semiconductor 662, and the semiconductor 663 are stacked will be described using an energy band diagram in FIG. 16B. FIG. 16A is an enlarged view of the channel portion of the transistor 600 illustrated in FIG. 15B. FIG. 16B shows an energy band structure of a portion along the chain line A1-A2 in FIG. 16A. FIG. 16B illustrates the energy band structure of a channel formation region of the transistor 600.

In FIG. 16B, Ec652, Ec661, Ec662, Ec663, and Ec653 indicate the energy of the conduction band minimum of the insulating film 652, the semiconductor 661, the semiconductor 662, the semiconductor 663, and the insulating film 653, respectively.

Here, a difference in energy between the vacuum level and the conduction band minimum (the difference is also referred to as electron affinity) corresponds to a value obtained by subtracting an energy gap from a difference in energy between the vacuum level and the valence band maximum (the difference is also referred to as ionization potential). The energy gap can be measured using a spectroscopic ellipsometer. The energy difference between the vacuum level and the valence band maximum can be measured using an ultraviolet photoelectron spectroscopy (UPS) device.

Since the insulating film 652 and the insulating film 653 are insulators, Ec652 and Ec653 are closer to the vacuum level than Ec661, Ec662, and Ec663 (i.e., the insulating film 652 and the insulating film 653 have a smaller electron affinity than the semiconductor 661, the semiconductor 662, and the semiconductor 663).

As the semiconductor 662, an oxide having an electron affinity higher than those of the semiconductors 661 and 663 is used. For example, as the semiconductor 662, an oxide having an electron affinity higher than those of the semiconductors 661 and 663 by 0.07 eV or higher and 1.3 eV or lower, preferably 0.1 eV or higher and 0.7 eV or lower, more preferably 0.15 eV or higher and 0.4 eV or lower is used. Note that the electron affinity refers to an energy difference between the vacuum level and the conduction band minimum.

An indium gallium oxide has a small electron affinity and a high oxygen-blocking property. Therefore, the semiconductor 663 preferably includes an indium gallium oxide. The gallium atomic ratio [Ga/(In+Ga)] is, for example, higher than or equal to 70%, preferably higher than or equal to 80%, more preferably higher than or equal to 90%.

At this time, when a gate voltage is applied, a channel is formed in the semiconductor 662 having the highest electron affinity among the semiconductors 661 to 663.

Here, in some cases, there is a mixed region of the semiconductor 661 and the semiconductor 662 between the semiconductor 661 and the semiconductor 662. Furthermore, in some cases, there is a mixed region of the semiconductor 662 and the semiconductor 663 between the semiconductor 662 and the semiconductor 663. The mixed region has a low interface state density. For that reason, the stack of the semiconductor 661, the semiconductor 662, and the semiconductor 663 has a band structure where energy at each interface and in the vicinity of the interface is changed continuously (continuous junction).

At this time, electrons move mainly in the semiconductor 662, not in the semiconductor 661 and the semiconductor 663. As described above, when the interface state density at the interface between the semiconductor 661 and the semiconductor 662 and the interface state density at the interface between the semiconductor 662 and the semiconductor 663 are decreased, electron movement in the semiconductor 662 is less likely to be inhibited and the on-state current of the transistor can be increased.

As factors of inhibiting electron movement are decreased, the on-state current of the transistor can be increased. For example, in the case where there is no factor of inhibiting electron movement, electrons are assumed to be efficiently moved. Electron movement is inhibited, for example, in the case where physical unevenness in a channel formation region is large.

To increase the on-state current of the transistor, for example, root mean square (RMS) roughness with a measurement area of 1 µm×1 µm of the top surface or the bottom surface of the semiconductor 662 (a formation surface; here, the semiconductor 661) is less than 1 nm, preferably less than 0.6 nm, more preferably less than 0.5 nm, still more preferably less than 0.4 nm. The average surface roughness (also referred to as Ra) with the measurement area of 1 µm×1 µm is less than 1 nm, preferably less than 0.6 nm, more preferably less than 0.5 nm, still more preferably less than 0.4 nm. The maximum difference (P–V) with the measurement area of 1 µm×1 µm is less than 10 nm, preferably less than 9 nm, more preferably less than 8 nm, still more preferably less than 7 nm. RMS roughness, Ra, and P–V can be measured using, for example, a scanning probe microscope SPA-500 manufactured by SII Nano Technology Inc.

The electron movement is also inhibited, for example, in the case where the density of defect states is high in a region where a channel is formed.

For example, in the case where the semiconductor 662 contains oxygen vacancies (also denoted by $V_O$), donor levels are formed by entry of hydrogen into sites of oxygen vacancies in some cases. A state in which hydrogen enters sites of oxygen vacancies is denoted by $V_OH$ in the following description in some cases. $V_OH$ is a factor of decreasing the on-state current of the transistor because $V_OH$ scatters electrons. Note that sites of oxygen vacancies become more stable by entry of oxygen than by entry of hydrogen. Thus, by decreasing oxygen vacancies in the semiconductor 662, the on-state current of the transistor can be increased in some cases.

For example, the hydrogen concentration at a certain depth in the semiconductor 662 or in a certain region of the semiconductor 662, which is measured by secondary ion mass spectrometry (SIMS), is higher than or equal to $1\times10^{16}$ atoms/cm$^3$ and lower than or equal to $2\times10^{20}$ atoms/cm$^3$, preferably higher than or equal to $1\times10^{16}$ atoms/cm$^3$ and lower than or equal to $5\times10^{19}$ atoms/cm$^3$, more preferably higher than or equal to $1\times10^{16}$ atoms/cm$^3$ and lower than or equal to $1\times10^{19}$ atoms/cm$^3$, still more preferably higher than or equal to $1\times10^{16}$ atoms/cm$^3$ and lower than or equal to $5\times10^{18}$ atoms/cm$^3$.

To decrease oxygen vacancies in the semiconductor 662, for example, there is a method in which excess oxygen in the insulating film 652 is moved to the semiconductor 662 through the semiconductor 661. In this case, the semiconductor 661 is preferably a layer having an oxygen-transmitting property (a layer through which oxygen passes or is transmitted).

In the case where the transistor has an s-channel structure, a channel is formed in the whole of the semiconductor 662. Therefore, as the semiconductor 662 has a larger thickness, a channel region becomes larger. In other words, the thicker the semiconductor 662 is, the larger the on-state current of the transistor is.

Moreover, the thickness of the semiconductor 663 is preferably as small as possible to increase the on-state current of the transistor. For example, the semiconductor 663 has a region with a thickness of less than 10 nm, preferably less than or equal to 5 nm, more preferably less than or equal to 3 nm. Meanwhile, the semiconductor 663 has a function of blocking entry of elements other than oxygen (such as hydrogen and silicon) included in the adjacent insulator into the semiconductor 662 where a channel is formed. For this reason, it is preferable that the semiconductor 663 have a certain thickness. For example, the semiconductor 663 may have a region with a thickness of greater than or equal to 0.3 nm, preferably greater than or equal to 1 nm, more preferably greater than or equal to 2 nm. The semiconductor 663 preferably has an oxygen blocking property to suppress outward diffusion of oxygen released from the insulating film 652 and the like.

To improve reliability, preferably, the thickness of the semiconductor 661 is large and the thickness of the semiconductor 663 is small. For example, the semiconductor 661 has a region with a thickness of greater than or equal to 10 nm, preferably greater than or equal to 20 nm, more preferably greater than or equal to 40 nm, still more preferably greater than or equal to 60 nm. When the thickness of the semiconductor 661 is made large, the distance from an interface between the adjacent insulator and the semiconductor 661 to the semiconductor 662 in which a channel is formed can be large. However, to prevent the productivity of the semiconductor device from being decreased, the semiconductor 661 has a region with a thickness of, for example, less than or equal to 200 nm, preferably less than or equal to 120 nm, more preferably less than or equal to 80 nm.

For example, a region with a silicon concentration measured by SIMS analysis of higher than or equal to $1\times10^{16}$ atoms/cm$^3$ and lower than $1\times10^{19}$ atoms/cm$^3$, preferably higher than or equal to $1\times10^{16}$ atoms/cm$^3$ and lower than $5\times10^{18}$ atoms/cm$^3$, more preferably higher than or equal to $1\times10^{16}$ atoms/cm$^3$ and lower than $2\times10^{18}$ atoms/cm$^3$ is provided between the semiconductor 662 and the semiconductor 661. A region with a silicon concentration measured by SIMS of higher than or equal to $1\times10^{16}$ atoms/cm$^3$ and lower than $1\times10^{19}$ atoms/cm$^3$, preferably higher than or equal to $1\times10^{16}$ atoms/cm$^3$ and lower than $5\times10^{18}$ atoms/cm$^3$, more preferably higher than or equal to $1\times10^{16}$ atoms/cm$^3$ and lower than $2\times10^{18}$ atoms/cm$^3$ is provided between the semiconductor 662 and the semiconductor 663.

It is preferable to reduce the concentration of hydrogen in the semiconductor 661 and the semiconductor 663 in order to reduce the concentration of hydrogen in the semiconductor 662. The semiconductor 661 and the semiconductor 663 each have a region in which the concentration of hydrogen measured by SIMS is higher than or equal to $1\times10^{16}$ atoms/cm$^3$ and lower than or equal to $2\times10^{20}$ atoms/cm$^3$, preferably higher than or equal to $1\times10^{16}$ atoms/cm$^3$ and lower than or equal to $5\times10^{19}$ atoms/cm$^3$, more preferably higher than or equal to $1\times10^{16}$ atoms/cm$^3$ and lower than or equal to $1\times10^{19}$ atoms/cm$^3$, still more preferably higher than or equal to $1\times10^{16}$ atoms/cm$^3$ and lower than or equal to $5\times10^{18}$ atoms/cm$^3$. It is preferable to reduce the concentration of nitrogen in the semiconductor 661 and the semiconductor 663 in order to reduce the concentration of nitrogen in the semiconductor 662. The semiconductor 661 and the semiconductor 663 each have a region in which the concentration of nitrogen measured by SIMS is higher than or equal to $1\times10^{16}$ atoms/cm$^3$ and lower than $5\times10^{19}$ atoms/cm$^3$, preferably higher than or equal to $1\times10^{16}$ atoms/cm$^3$ and lower than or equal to $5\times10^{18}$ atoms/cm$^3$, more preferably higher than or equal to $1\times10^{16}$ atoms/cm$^3$ and lower than or equal to $1\times10^{18}$ atoms/cm$^3$, still more preferably higher than or equal to $1\times10^{16}$ atoms/cm$^3$ and lower than or equal to $5\times10^{17}$ atoms/cm$^3$.

The above three-layer structure is an example. For example, a two-layer structure without the semiconductor 661 or the semiconductor 663 may be employed. A four-layer structure in which any one of the semiconductors described as examples of the semiconductor 661, the semiconductor 662, and the semiconductor 663 is provided under or over the semiconductor 661 or under or over the semiconductor 663 may be employed. An n-layer structure (n is an integer of 5 or more) in which any one of the semiconductors described as examples of the semiconductor 661, the semiconductor 662, and the semiconductor 663 is provided at two or more of the following positions: over the semiconductor 661, under the semiconductor 661, over the semiconductor 663, and under the semiconductor 663.

<<Method for Manufacturing Transistor>>

A method for manufacturing the transistor 600 illustrated in FIGS. 15A to 15D will be described below with reference to FIGS. 17A to 17E and FIGS. 18A to 18D. Note that cross-sectional views of the transistor in the channel length direction (cross-sectional views along dashed-dotted line Y1-Y2 in FIG. 15A) are shown on the left side of FIGS. 17A to 17E and FIGS. 18A to 18D, and cross-sectional views of the transistor in the channel width direction (cross-sectional views along dashed-dotted line X1-X2 in FIG. 15A) are shown on the right side of FIGS. 17A to 17E and FIGS. 18A to 18D.

Figure 17A:
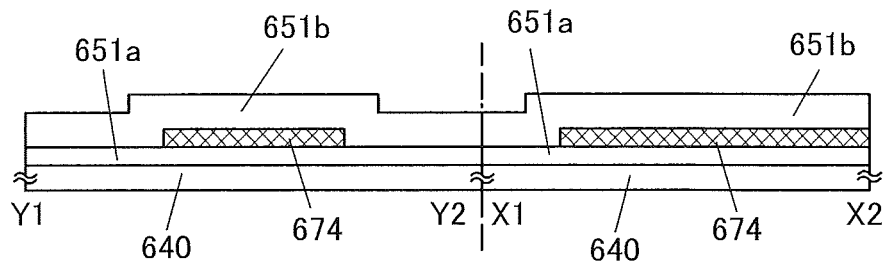
FIGS. 17A to 17E are cross-sectional views illustrating a method for forming a transistor.

First, an insulating film 651a is foiled over the substrate 640. Then, the conductive film 674 is formed, followed by an insulating film 651b (FIG. 17A).

As the substrate 640, for example, an insulator substrate, a semiconductor substrate, or a conductor substrate may be used. As the insulator substrate, for example, a glass substrate, a quartz substrate, a sapphire substrate, a stabilized zirconia substrate (e.g., an yttria-stabilized zirconia substrate), or a resin substrate is used. As the semiconductor substrate, for example, a single material semiconductor substrate made of silicon, germanium, or the like, a compound semiconductor substrate made of silicon carbide, silicon germanium, gallium arsenide, indium phosphide, zinc oxide, or gallium oxide, or the like is used. The above semiconductor substrate in which an insulator region is provided, e.g., a silicon on insulator (SOI) substrate may also be used. As the conductor substrate, a graphite substrate, a metal substrate, an alloy substrate, a conductive resin substrate, or the like is used. A substrate including a metal nitride, a substrate including a metal oxide, or the like is used. An insulator substrate provided with a conductor or a semiconductor, a semiconductor substrate provided with a conductor or an insulator, a conductor substrate provided with a semiconductor or an insulator, or the like may also be used. Alternatively, any of these substrates over which an element is provided may be used. As the element provided over the substrate, a capacitor, a resistor, a switching element, a light-emitting element, a memory element, or the like is used.

Alternatively, a flexible substrate may be used as the substrate 640. As a method for providing a transistor over a flexible substrate, there is a method in which the transistor is formed over a non-flexible substrate and then the transistor is separated and transferred to the substrate 640 which is a flexible substrate. In that case, a separation layer is preferably provided between the non-flexible substrate and the transistor. As the substrate 640, a sheet, a film, or a foil containing a fiber may be used. The substrate 640 may have elasticity. The substrate 640 may have a property of returning to its original shape when bending or pulling is stopped. Alternatively, the substrate 640 may have a property of not returning to its original shape. The thickness of the substrate 640 is, for example, greater than or equal to 5 μm and less than or equal to 700 μm, preferably greater than or equal to 10 μm and less than or equal to 500 μm, more preferably greater than or equal to 15 μm and less than or equal to 300 μm. When the substrate 640 has a small thickness, the weight of the semiconductor device can be reduced. When the substrate 640 has a small thickness, even in the case of using glass or the like, the substrate 640 may have elasticity or a property of returning to its original shape when bending or pulling is stopped. Therefore, an impact applied to the semiconductor device over the substrate 640, which is caused by dropping or the like, can be reduced. That is, a durable semiconductor device can be provided.

For the substrate 640 which is a flexible substrate, for example, metal, an alloy, resin, glass, or fiber thereof can be used. The flexible substrate 640 preferably has a lower coefficient of linear expansion because deformation due to an environment is suppressed. The flexible substrate 640 is formed using, for example, a material whose coefficient of linear expansion is lower than or equal to $1\times10^{-3}$/K, lower than or equal to $5\times10^{-5}$/K, or lower than or equal to $1\times10^{-5}$/K. Examples of the resin include polyester, polyolefin, polyamide (e.g., nylon or aramid), polyimide, polycarbonate, acrylic, and polytetrafluoroethylene (PTFE). In particular, aramid is preferably used for the flexible substrate 640 because of its low coefficient of linear expansion.

As a material for the insulating films 651a and 651b, a material containing silicon oxide, silicon nitride, silicon oxynitride, or silicon nitride oxide is preferably used. Alternatively, a metal oxide such as aluminum oxide, aluminum oxynitride, gallium oxide, gallium oxynitride, yttrium oxide, yttrium oxynitride, hafnium oxide, or hafnium oxynitride can be used. Note that in this specification, "oxynitride" refers to a material that contains oxygen at a higher proportion than nitrogen, and a "nitride oxide" refers to a material that contains nitrogen at a higher proportion than oxygen.

The insulating films 651a and 651b may be formed using silicon oxide with high step coverage which is formed by reacting tetraethyl orthosilicate (TEOS), silane, or the like with oxygen, nitrous oxide, or the like.

The insulating films 651a and 651b may be formed by a sputtering method, a chemical vapor deposition (CVD) method (including a thermal CVD method, a metal organic CVD (MOCVD) method, a plasma enhanced CVD (PECVD) method, and the like), a molecular beam epitaxy (MBE) method, an atomic layer deposition (ALD) method, a pulsed laser deposition (PLD) method, or the like. In particular, it is preferable that the insulating films be formed by a CVD method, more preferably a plasma CVD method because coverage can be further improved. It is preferable to use a thermal CVD method, an MOCVD method, or an ALD method in order to reduce plasma damage.

In the case of using a semiconductor substrate as the substrate 640, the insulating film 651a may be formed using a thermal oxide film.

The conductive film 674 preferably has a single-layer structure or a layered structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), cobalt (Co), ruthenium (Ru), platinum (Pt), iridium (Ir), and strontium (Sr), an alloy of such a low-resistance material, or a compound containing such a material as its main component. It is particularly preferable to use a high-melting-point material which has both heat resistance and conductivity, such as tungsten or molybdenum. In addition, the conductive film is preferably formed using a low-resistance conductive material such as aluminum or copper. The conductive film is more preferably formed using a Cu—Mn alloy, in which case manganese oxide formed at the interface with an insulator containing oxygen has a function of preventing Cu diffusion.

The conductive film 674 can be formed by a sputtering method, a CVD method (including a thermal CVD method, an MOCVD method, a PECVD method, and the like), an MBE method, an ALD method, a PLD method, or the like.

Figure 17B:
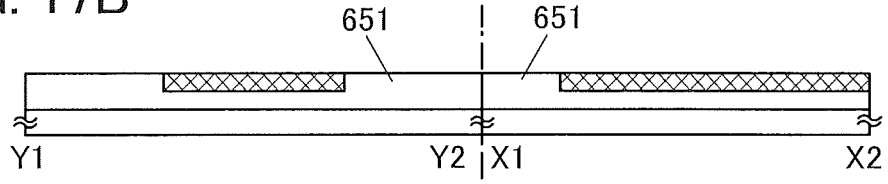

Next, a surface of the insulating film 651b is subjected to planarization by a chemical mechanical polishing (CMP) method (see FIG. 17B).

As the insulating film 651b, a planarization film may be used. At this time, a CMP method or the like is not necessarily used for planarization. The planarization film can be formed by, for example, an atmospheric pressure CVD method, a coating method, or the like. An example of a film which can be formed by an atmospheric pressure CVD method is a film of borophosphosilicate glass (BPSG).

Furthermore, an example of a film which can be formed by a coating method is a film of hydrogen silsesquioxane (HSQ).

Hereinafter, the insulating films 651a and 651b are collectively referred to as the insulating film 651.

Figure 17C:
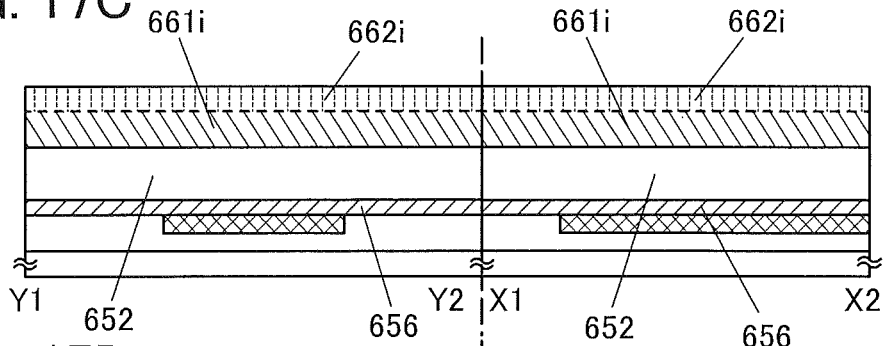
Figure 17D:
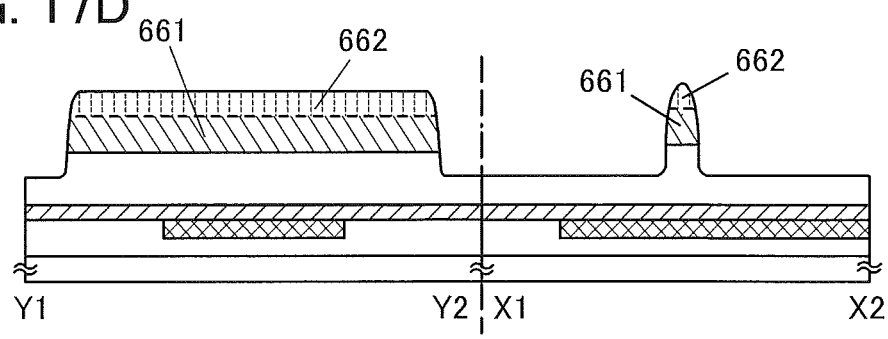
Figure 17E:
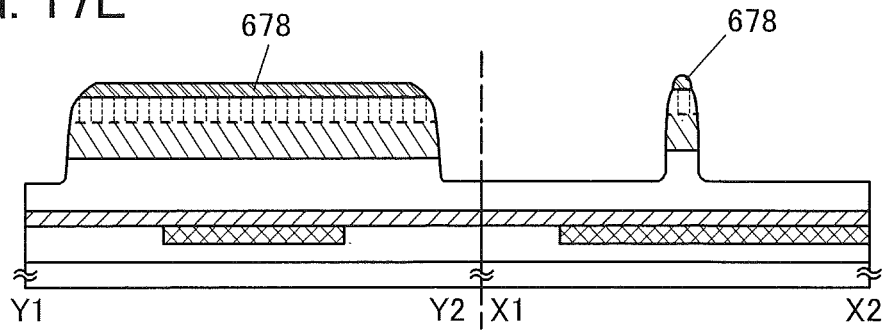

Next, the insulating film 656, the insulating film 652, a semiconductor 661i, and a semiconductor 662i are formed (see FIG. 17C).

The insulating films 656 and 652 may be formed by a sputtering method, a CVD method (including a thermal CVD method, an MOCVD method, a PECVD method, and the like), an MBE method, an ALD method, a PLD method, or the like.

The insulating film 656 preferably has a blocking effect against oxygen, hydrogen, water, alkali metal, alkaline earth metal, and the like: The insulating film 656 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like, may be provided. As the above oxide insulating film, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

The insulating film 652 preferably contains an oxide that can supply oxygen to the semiconductor 660. For example, for the insulating film 652, a material containing silicon oxide or silicon oxynitride is preferably used. Alternatively, a metal oxide such as aluminum oxide, aluminum oxynitride, gallium oxide, gallium oxynitride, yttrium oxide, yttrium oxynitride, hafnium oxide, or hafnium oxynitride can be used.

To make the insulating film 652 contain excess oxygen, the insulating film 652 may be formed in an oxygen atmosphere, for example. Alternatively, a region containing excess oxygen may be formed by introducing oxygen into the insulating film 652 that has been formed. Both the methods may be combined.

For example, oxygen (at least including any of oxygen radicals, oxygen atoms, and oxygen ions) may be introduced into the insulating film 652 that has been formed, so that a region containing excess oxygen is formed. Oxygen can be introduced by, for example, an ion implantation method, an ion doping method, a plasma immersion ion implantation method, plasma treatment, or the like.

A gas containing oxygen can be used, for oxygen introducing treatment. As the gas containing oxygen, oxygen, nitrous oxide, nitrogen dioxide, carbon dioxide, carbon monoxide, or the like can be used. Furthermore, a rare gas may be included in the gas containing oxygen for the oxygen introducing treatment. Moreover, hydrogen or the like may be included. For example, a mixed gas of carbon dioxide, hydrogen, and argon may be used.

After the insulating film 652 is formed, the insulating film 652 may be subjected to planarization treatment using a CMP method or the like to improve the planarity of the top surface thereof.

The semiconductors 661i and 662i are preferably formed successively without being exposed to the air. The semiconductors 661i and 662i are formed by a sputtering method, a CVD method (including a thermal CVD method, an MOCVD method, a PECVD method, and the like), an MBE method, a PLD method, an ALD method, or the like.

The description of the semiconductors 661 and 662 in FIGS. 15A to 15D and FIGS. 16A and 16B can be referred to for a material that can be used for the semiconductors 661$i$ and 662$i$.

Note that in the case where In—Ga—Zn oxide layers formed by an MOCVD method are used as the semiconductors 661$i$ and 662$i$, trimethylindium, trimethylgallium, dimethylzinc, and the like may be used as source gases. The source gases are not limited to the above combination, and triethylindium or the like may be used instead of trimethylindium. Alternatively, triethylgallium or the like may be used instead of trimethylgallium. Still alternatively, diethylzinc or the like may be used instead of dimethylzinc.

Here, after the semiconductor 661$i$ is formed, oxygen may be introduced into the semiconductor 661$i$. For example, oxygen (including at least any of oxygen radicals, oxygen atoms, and oxygen ions) is introduced into the semiconductor 661$i$ which has been formed, whereby a region containing excess oxygen is formed. Oxygen can be introduced by an ion implantation method, an ion doping method, a plasma immersion ion implantation method, plasma treatment, or the like.

A gas containing oxygen can be used for oxygen introducing treatment. As the gas containing oxygen, oxygen, nitrous oxide, nitrogen dioxide, carbon dioxide, carbon monoxide, or the like can be used. Furthermore, a rare gas may be included in the gas containing oxygen for the oxygen introducing treatment. Moreover, hydrogen or the like may be included. For example, a mixed gas of carbon dioxide, hydrogen, and argon may be used.

After the semiconductors 661$i$ and 662$i$ are formed, heat treatment is preferably performed. The heat treatment may be performed at a temperature higher than or equal to 250° C. and lower than or equal to 650° C., preferably higher than or equal to 300° C. and lower than or equal to 500° C., in an inert gas atmosphere, an atmosphere containing an oxidizing gas at 10 ppm or more, or a reduced pressure state. Alternatively, the heat treatment may be performed in such a manner that heat treatment is performed in an inert gas atmosphere, and then another heat treatment is performed in an atmosphere containing an oxidizing gas at 10 ppm or more, in order to compensate for released oxygen. The heat treatment may be performed directly after the formation of semiconductor films or may be performed after the semiconductor films are processed into the island-shaped semiconductors 661 and 662. Through the heat treatment, oxygen can be supplied to the semiconductors from the insulating film 652 and the oxide film; thus, oxygen vacancies in the semiconductors can be reduced.

Then, a resist mask is formed, and an unnecessary portion is removed by etching. Then, the resist mask is removed. In this manner, a stack including the island-shaped semiconductors 661 and 662 can be formed (see FIG. 17D). Note that, in some cases, part of the insulating film 652 is etched in the etching of the semiconductor films to reduce the thickness of a portion of the insulating film 652 which is not covered with the semiconductors 661 and 662. For this reason, the insulating film 652 is preferably formed to have a large thickness so as not to be removed by the etching.

Note that there is a possibility that the resist is totally removed depending on the etching conditions of the semiconductor films; therefore, what is called a hard mask formed of a material with high resistance to etching, such as an inorganic film or a metal film, may be used. Here, for example, a conductive film is used as a hard mask 678, and the semiconductor film is processed using the hard mask 678 to form the semiconductors 661 and 662 (see FIG. 17E).

The hard mask 678 preferably has a single-layer structure or a layered structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), cobalt (Co), ruthenium (Ru), platinum (Pt), iridium (Ir), and strontium (Sr), an alloy of such a low-resistance material, or a compound containing such a material as its main component. It is particularly preferable to use a high-melting-point material which has both heat resistance and conductivity, such as tungsten or molybdenum. In addition, the conductive films are preferably formed using a low-resistance conductive material such as aluminum or copper. The conductive films are more preferably formed using a Cu—Mn alloy, in which case manganese oxide formed at the interface with an insulator containing oxygen has a function of preventing Cu diffusion.

The hard mask 678 is preferably formed using a conductive oxide including noble metal, such as iridium oxide, ruthenium oxide, or strontium ruthenate. Such a conductive oxide hardly takes oxygen from an oxide semiconductor even when it is in contact with the oxide semiconductor and hardly generates oxygen vacancies in the oxide semiconductor.

The hard mask 678 can be formed by a sputtering method, a CVD method (including a thermal CVD method, an MOCVD method, a PECVD method, and the like), an MBE method, an ALD method, a PLD method, or the like.

Figure 18A:
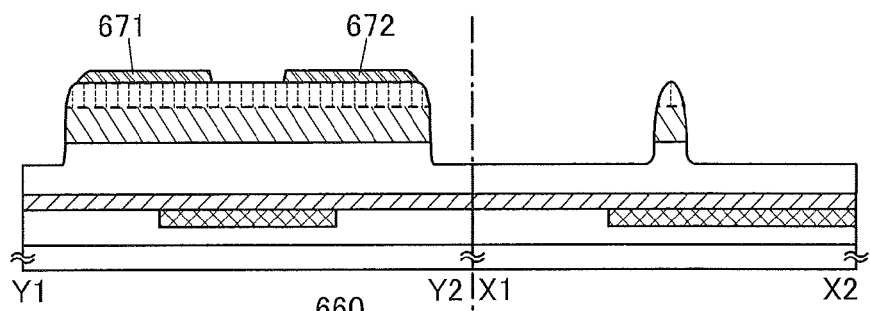
FIGS. 18A to 18D are cross-sectional views illustrating a method for forming a transistor.
Figure 18B:
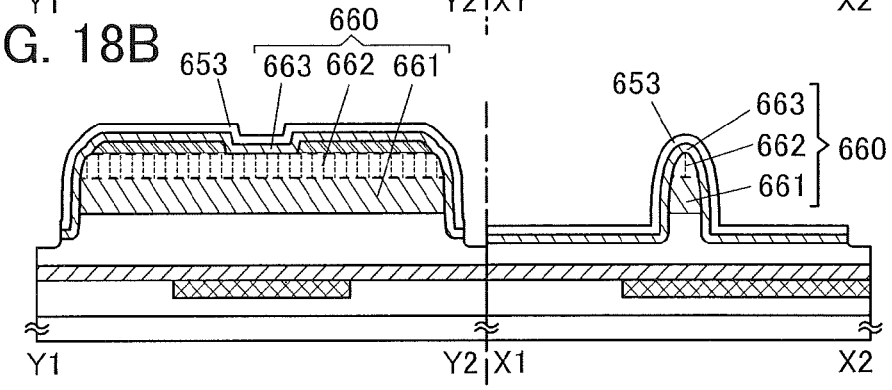

Next, a resist mask is formed, and the hard mask 678 is processed into the conductive films 671 and 672 by etching (see FIG. 18A). Note that in some cases, upper portions of the semiconductor 662 and the insulating film 652 are partly etched in etching of the hard mask 678, so that a portion not overlapping with the conductive film 671 or 672 is thinned. For this reason, the semiconductor 662 is preferably formed to have a large thickness in advance in consideration of the etching depth.

Then, the semiconductor 663 and the insulating film 653 are formed. After that, a resist mask is formed, the semiconductor 663 and the insulating film 653 are processed by etching, and the resist mask is removed (see FIG. 18B).

Figure 18C:
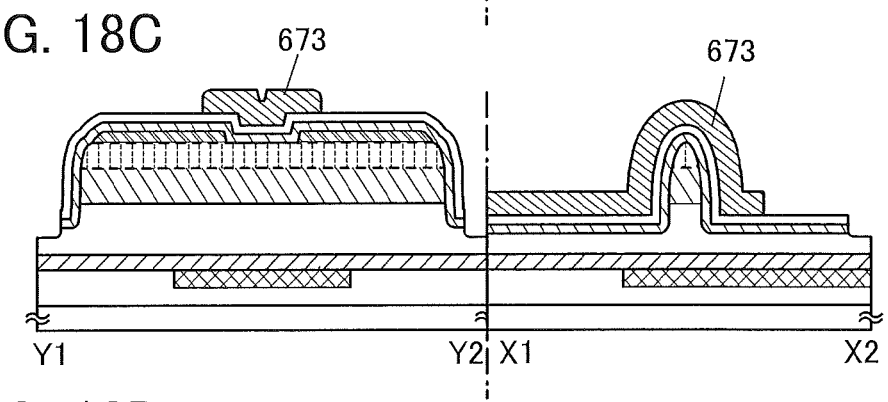
Figure 18D:
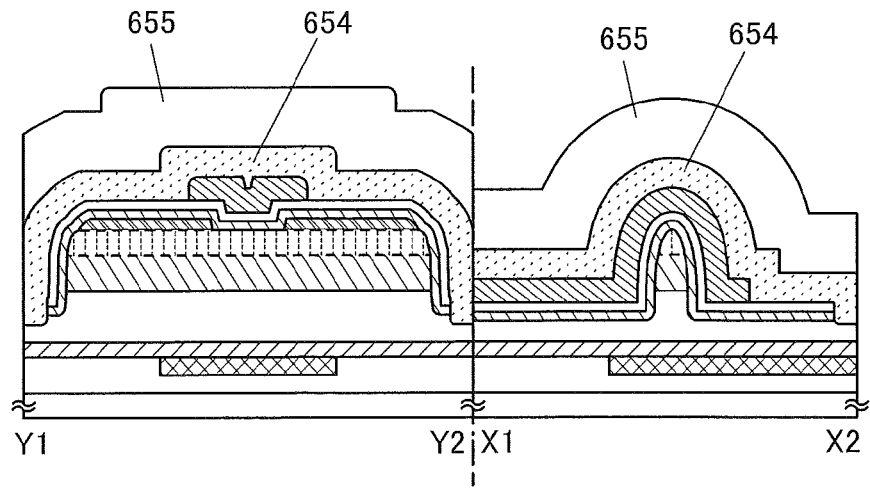

Next, the conductive film 673 is deposited, a resist mask is formed, the conductive film 673 is processed by etching, and the resist mask is removed, whereby a gate electrode is formed (see FIG. 18C).

The semiconductor 663, the insulating film 653, and the conductive film 673 can be formed by a sputtering method, a CVD method (including a thermal CVD method, an MOCVD method, a PECVD method, and the like), an MBE method, a PLD method, an ALD method, or the like. In particular, it is preferable to use a CVD method, more preferably a plasma CVD method, because coverage can be further improved. It is preferable to use a thermal CVD method, an MOCVD method, or an ALD method in order to reduce plasma damage.

The semiconductor 663 and the insulating film 653 may be etched after the conductive film 673 is formed. The etching may be performed with a resist mask, for example. Alternatively, the insulating film 653 and the semiconductor 663 may be etched using the conductive film 673 as a mask.

After the semiconductor 663 is formed, oxygen may be introduced into the semiconductor 663. For example, oxygen (including at least any of oxygen radicals, oxygen atoms, and oxygen ions) is introduced into the semiconductor 663 which has been formed, whereby a region containing excess oxygen is formed. Oxygen can be introduced by an ion implantation method, an ion doping method, a plasma immersion ion implantation method, plasma treatment, or the like.

A gas containing oxygen can be used for oxygen introducing treatment. As the gas containing oxygen, oxygen, nitrous oxide, nitrogen dioxide, carbon dioxide, carbon monoxide, and the like can be used. Furthermore, a rare gas may be included in the gas containing oxygen for the oxygen introducing treatment. Moreover, hydrogen or the like may be included. For example, a mixed gas of carbon dioxide, hydrogen, and argon may be used.

The description of the semiconductor 663 in FIGS. 15A to 15D and FIGS. 16A and 16B can be referred to for a material that can be used for the semiconductor 663.

The insulating film 653 can be formed using an insulating film containing at least one of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. The insulating film 653 may be a stack including any of the above materials. The insulating film 653 may contain lanthanum (La), nitrogen, or zirconium (Zr) as an impurity.

An example of a layered structure of the insulating film 653 is described. The insulating film 653 contains oxygen, nitrogen, silicon, or hafnium, for example. Specifically, the insulating film 653 preferably includes hafnium oxide and silicon oxide or silicon oxynitride.

Hafnium oxide has a higher dielectric constant than silicon oxide and silicon oxynitride. Therefore, the thickness of the insulating film 653 can be made large as compared with the case where silicon oxide is used; as a result, a leakage current due to a tunnel current can be low. That is, it is possible to provide a transistor with a low off-state current.

Next, the insulating film 654 is formed. The insulating film 654 has a blocking effect against oxygen, hydrogen, water, alkali metal, alkaline earth metal, and the like. The insulating film 654 can be formed by a sputtering method, a CVD method (including a thermal CVD method, an MOCVD method, a PECVD method, and the like), an MBE method, an ALD method, a PLD method, or the like, for example. In particular, it is preferable that the insulating film be formed by a CVD method, more preferably a plasma CVD method, because coverage can be further improved. It is preferable to use a thermal CVD method, an MOCVD method, or an ALD method in order to reduce plasma damage.

The insulating film 654 preferably has a blocking effect against oxygen, hydrogen, water, alkali metal, alkaline earth metal, and the like. The insulating film 654 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like, may be provided. As the oxide insulating film, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

An aluminum oxide film is preferably used as the insulating film 654 because it is highly effective in preventing transmission of both oxygen and impurities such as hydrogen and moisture. In addition, oxygen contained in the aluminum oxide film can be diffused into the semiconductor 660.

After the insulating film 654 is formed, heat treatment is preferably performed. Through this heat treatment, oxygen can be supplied to the semiconductor 660 from the insulating film 652 or the like; thus, oxygen vacancies in the semiconductor 660 can be reduced. Because oxygen released from the insulating film 652 is blocked by the insulating film 656 and the insulating film 654 at this time, the oxygen can be effectively confined Thus, the amount of oxygen that is supplied to the semiconductor 660 can be increased, so that oxygen vacancies in the semiconductor 660 can be effectively reduced.

Next, the insulating film 655 is formed. The insulating film 655 can be formed by a sputtering method, a CVD method (including a thermal CVD method, an MOCVD method, a PECVD method, and the like), an MBE method, an ALD method, a PLD method, or the like. In particular, it is preferable that the insulating film be formed by a CVD method, more preferably a plasma CVD method, because coverage can be improved. It is preferable to use a thermal CVD method, an MOCVD method, or an ALD method in order to reduce plasma damage. In the case where the insulating film 655 is formed using an organic insulating material such as an organic resin, a coating method such as a spin coating method may be used. After the insulating film 655 is formed, the top surface thereof is preferably subjected to planarization treatment.

The insulating film 655 can be formed using an insulator containing at least one of aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, tantalum oxide, and the like. Alternatively, for the insulating film 655, an organic resin such as a polyimide resin, a polyamide resin, an acrylic resin, a siloxane resin, an epoxy resin, or a phenol resin can be used. The insulating film 655 may be a stack including any of the above materials.

<Structural Example 2 of Transistor>

Figure 19:
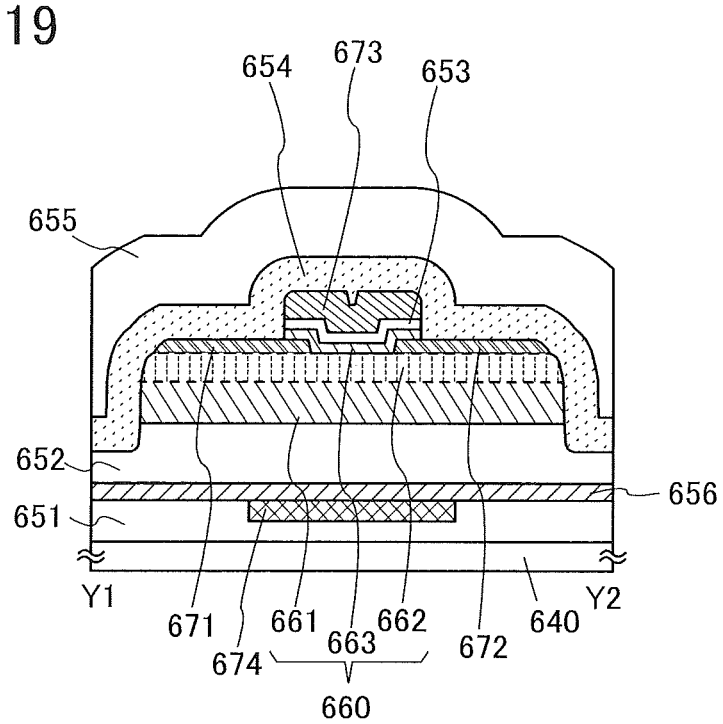
FIG. 19 is a cross-sectional view illustrating a structural example of a transistor.

In the transistor 600 illustrated in FIGS. 15A to 15D, the semiconductor 663 and the insulating film 653 may be etched at the same time when the conductive film 673 is formed by etching. FIG. 19 illustrates an example of such a case. FIG. 19 illustrates the case where the semiconductor 663 and the insulating film 653 in FIG. 15B are provided only under the conductive film 673.

<Structural Example 3 of Transistor>

Figure 20:
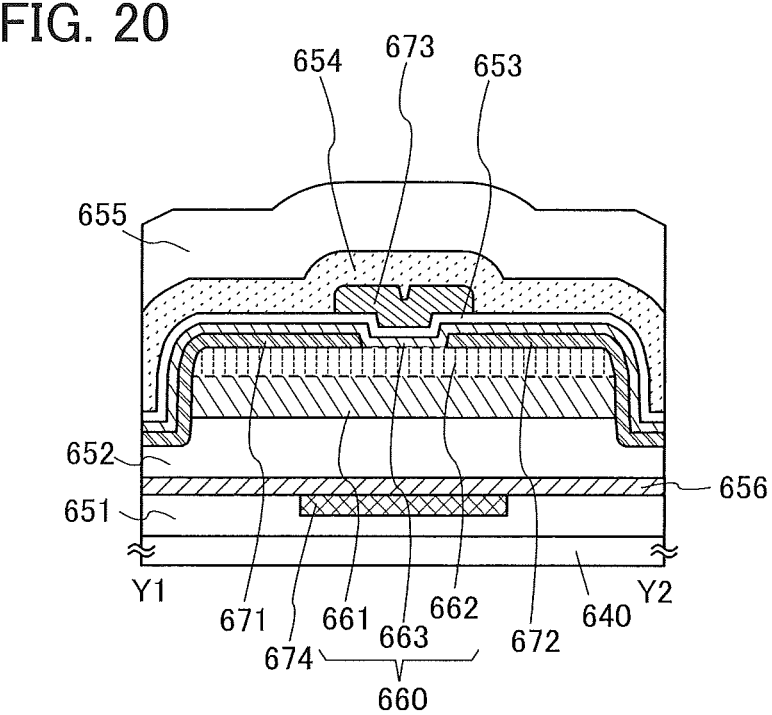
FIG. 20 is a cross-sectional view illustrating a structural example of a transistor.

In the transistor 600 illustrated in FIGS. 15A to 15D, the conductive films 671 and 672 may be in contact with side surfaces of the semiconductors 661 and 662. FIG. 20 illustrates an example of such a case.

FIG. 20 illustrates the case where the conductive films 671 and 672 in FIG. 15B are in contact with the side surfaces of the semiconductors 661 and 662.

<Structural Example 4 of Transistor>

Figure 21:
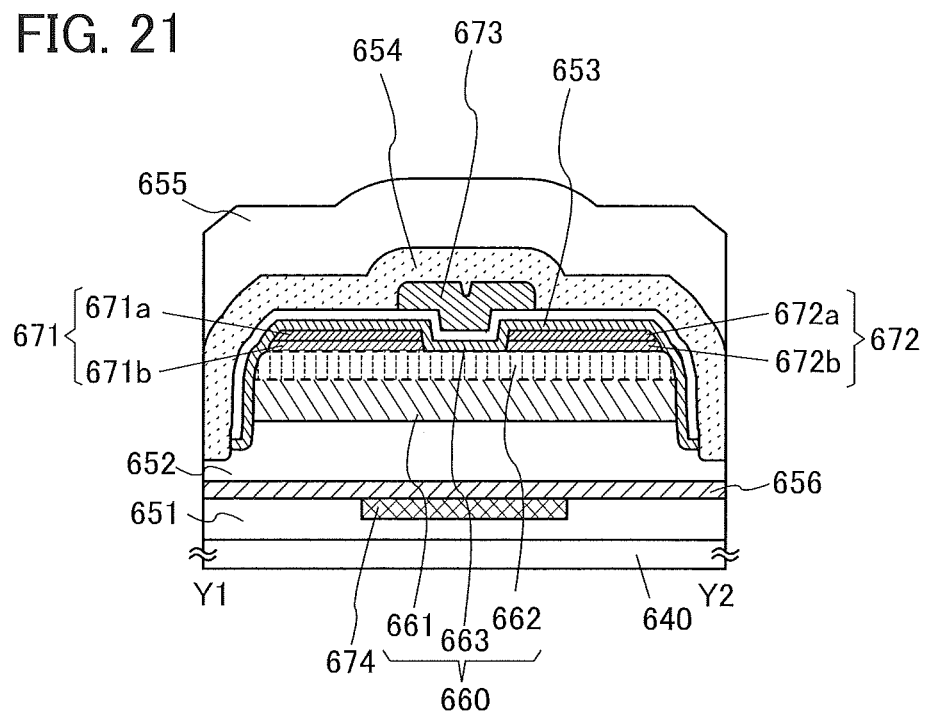
FIG. 21 is a cross-sectional view illustrating a structural example of a transistor.

In the transistor 600 illustrated in FIGS. 15A to 15D, the conductive film 671 may be a stack including a conductive film 671a and a conductive film 671b. Furthermore, the conductive film 672 may be a stack including a conductive film 672a and a conductive film 672b. FIG. 21 illustrates an example of such a case.

FIG. 21 illustrates the case where the conductive film 671 and the conductive film 672 in FIG. 15B are a stack including the conductive films 671a and 671b and a stack including the conductive films 672a and 672b, respectively.

The conductive films 671b and 672b may be formed using a transparent conductor, an oxide semiconductor, a nitride semiconductor, or an oxynitride semiconductor, for example. The conductive films 671b and 672b may be formed using, for example, a film containing indium, tin, and oxygen, a film containing indium and zinc, a film containing indium, tungsten, and zinc, a film containing tin and zinc, a film containing zinc and gallium, a film containing zinc and aluminum, a film containing zinc and fluorine, a film containing zinc and boron, a film containing tin and antimony, a film containing tin and fluorine, a film containing titanium and niobium, or the like. Alternatively, any of these films may contain hydrogen, carbon, nitrogen, silicon, germanium, or argon.

The conductive films 671b and 672b may have a property of transmitting visible light. Alternatively, the conductive films 671b and 672b may have a property of not transmitting visible light, ultraviolet light, infrared light, or X-rays by reflecting or absorbing it. In some cases, such a property can suppress a change in electrical characteristics of the transistor due to stray light.

The conductive films 671b and 672b may preferably be formed using a layer which does not form a Schottky barrier with the semiconductor 662. Accordingly, on-state characteristics of the transistor can be improved.

Each of the conductive films 671a and 672a may be formed to have, for example, a single-layer structure or a layered structure including a conductor containing one or more kinds of boron, nitrogen, oxygen, fluorine, silicon, phosphorus, aluminum, titanium, chromium, manganese, cobalt, nickel, copper, zinc, gallium, yttrium, zirconium, molybdenum, ruthenium, silver, indium, tin, tantalum, and tungsten. For example, an alloy film or a compound film may be used, and a conductor containing aluminum, a conductor containing copper and titanium, a conductor containing copper and manganese, a conductor containing indium, tin, and oxygen, a conductor containing titanium and nitrogen, or the like may be used.

Note that the conductive films 671b and 672b may preferably be formed using a film having a resistance higher than that of the conductive films 671a and 672a. The conductive films 671b and 672b may preferably be formed using a film having a resistance lower than that of the channel of the transistor. For example, the conductive films 671b and 672b may have a resistivity higher than or equal to 0.1 $\Omega$cm and lower than or equal to 100 $\Omega$cm, higher than or equal to 0.5 $\Omega$cm and lower than or equal to 50 $\Omega$cm, or higher than or equal to 1 $\Omega$cm and lower than or equal to 10 $\Omega$cm. The conductive films 671b and 672b having a resistivity within the above range can reduce electric field concentration in a boundary portion between the channel and the drain. Therefore, a change in electrical characteristics of the transistor can be suppressed. In addition, a punch-through current generated by an electric field from the drain can be reduced. Thus, a transistor with a small channel length can have favorable saturation characteristics. Note that in a circuit configuration where the source and the drain do not interchange, only one of the conductive films 671b and 672b (e.g., the film on the drain side) may preferably be provided.

<Structural Example 5 of Transistor>

Figure 22A:
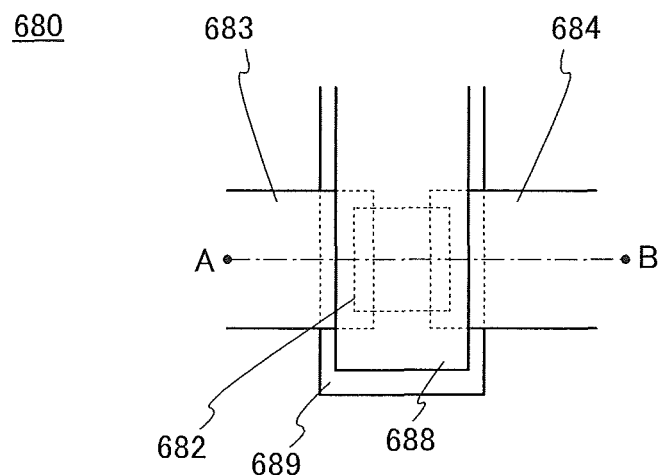
FIGS. 22A and 22B are a top view and a cross-sectional view illustrating a structural example of a transistor.
Figure 22B:
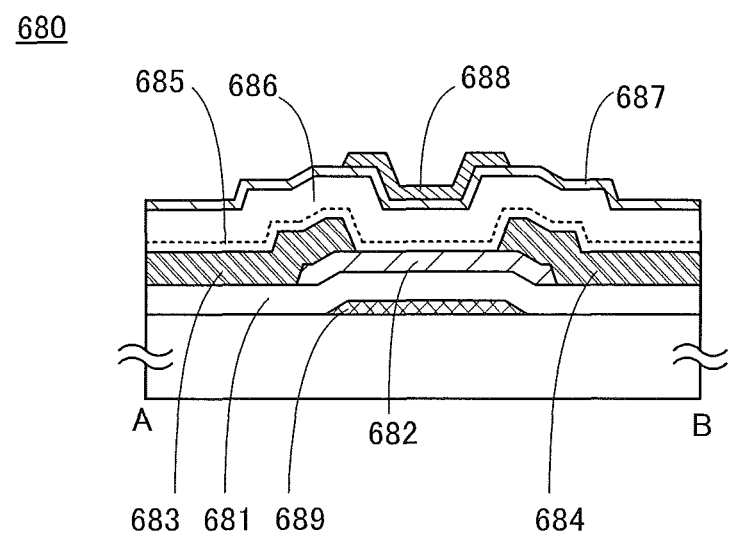

FIGS. 22A and 22B are a top view and a cross-sectional view of a transistor 680. FIG. 22A is the top view. FIG. 22B illustrates a cross section along dashed-dotted line A-B in FIG. 22A. In FIGS. 22A and 22B, some components are scaled up or down or omitted for easy understanding. The direction of the dashed-dotted line A-B may be referred to as a channel length direction.

The transistor 680 illustrated in FIG. 22B includes a conductive film 689 serving as a first gate, a conductive film 688 serving as a second gate, a semiconductor 682, a conductive film 683 and a conductive film 684 serving as a source and a drain, an insulating film 681, an insulating film 685, an insulating film 686, and an insulating film 687.

The conductive film 689 is on an insulating surface. The conductive film 689 overlaps with the semiconductor 682 with the insulating film 681 provided therebetween. The conductive film 688 overlaps with the semiconductor 682 with the insulating films 685, 686, and 687 provided therebetween. The conductive films 683 and 684 are connected to the semiconductor 682.

The description of the conductive films 673 and 674 in FIGS. 15A to 15D can be referred to for the details of the conductive films 689 and 688.

The conductive films 689 and 688 may be supplied with different potentials, or may be supplied with the same potential at the same time. The conductive film 688 serving as a second gate electrode in the transistor 680 leads to stabilization of threshold voltage. Note that the conductive film 688 is unnecessary in some cases.

The description of the semiconductor 662 in FIGS. 15A to 15D can be referred to for the details of the semiconductor 682. The semiconductor 682 may be a single layer or a stack including a plurality of semiconductor layers.

The description of the conductive films 671 and 672 in FIGS. 15A to 15D can be referred to for the details of the conductive films 683 and 684.

The description of the insulating film 653 in FIGS. 15A to 15D can be referred to for the details of the insulating film 681.

The insulating films 685 to 687 are sequentially stacked over the semiconductor 682 and the conductive films 683 and 684 in FIG. 22B; however, an insulating film provided over the semiconductor 682 and the conductive films 683 and 684 may be a single layer or a stack including a plurality of insulating films.

In the case of using an oxide semiconductor as the semiconductor 682, the insulating film 686 preferably contains oxygen at a proportion higher than or equal to that in the stoichiometric composition and has a function of supplying part of oxygen to the semiconductor 682 by heating. Note that in the case where the semiconductor 682 is damaged at the time of formation of the insulating film 686 when the insulating film 686 is directly formed on the semiconductor 682, the insulating film 685 is preferably provided between the semiconductor 682 and the insulating film 686, as illustrated in FIG. 22B. The insulating film 685 preferably allows oxygen to pass therethrough, and causes little damage to the semiconductor 682 when the insulating film 685 is formed compared with the case of the insulating film 686. If damage to the semiconductor 682 can be reduced and the insulating film 686 can be formed directly on the semiconductor 682, the insulating film 685 is not necessarily provided.

For the insulating films 686 and 685, a material containing silicon oxide or silicon oxynitride is preferably used, for example. Alternatively, a metal oxide such as aluminum oxide, aluminum oxynitride, gallium oxide, gallium oxynitride, yttrium oxide, yttrium oxynitride, hafnium oxide, or hafnium oxynitride can be used.

The insulating film 687 preferably has an effect of blocking diffusion of oxygen, hydrogen, and water. Alternatively, the insulating film 687 preferably has an effect of blocking diffusion of hydrogen and water.

As an insulating film has higher density and becomes denser or has a fewer dangling bonds and becomes more chemically stable, the insulating film has a more excellent blocking effect. An insulating film that has an effect of blocking diffusion of oxygen, hydrogen, and water can be formed using, for example, aluminum oxide, aluminum oxynitride, gallium oxide, gallium oxynitride, yttrium oxide, yttrium oxynitride, hafnium oxide, or hafnium oxynitride. An insulating film that has an effect of blocking diffusion of hydrogen and water can be formed using, for example, silicon nitride or silicon nitride oxide.

In the case where the insulating film 687 has an effect of blocking diffusion of water, hydrogen, and the like, impurities such as water and hydrogen that exist in a resin in a panel or exist outside the panel can be prevented from entering the semiconductor 682. Since an oxide semiconductor is used as the semiconductor 682, part of water or hydrogen that enters the oxide semiconductor serves as an electron donor (donor). Thus, the use of the insulating film 687 having the blocking effect can prevent a shift in the threshold voltage of the transistor 680 due to generation of donors.

In addition, since an oxide semiconductor is used as the semiconductor 682, when the insulating film 687 has an effect of blocking diffusion of oxygen, diffusion of oxygen from the oxide semiconductor to the outside can be prevented. Accordingly, oxygen vacancies in the oxide semiconductor that serve as donors are reduced, so that a shift in the threshold voltage of the transistor 680 due to generation of donors can be prevented.

<Structural Example of Chip>

Figure 23:
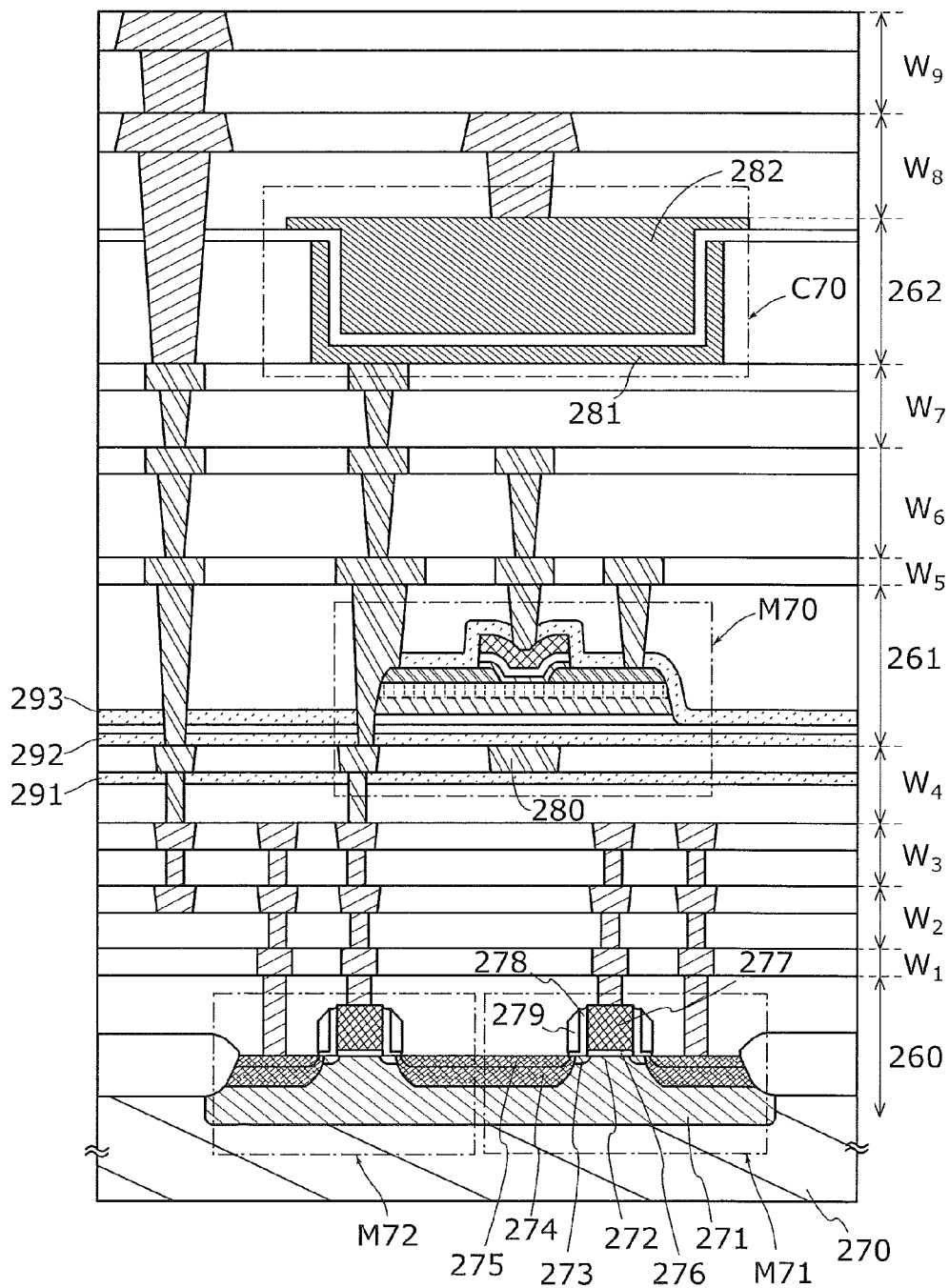
FIG. 23 is a cross-sectional view illustrating a structural example of a semiconductor device.

FIG. 23 specifically illustrates the structure of the memory cell 380 (FIG. 9). FIG. 23 illustrates an example in which the transistors M70, M71, and M72 and the capacitor C70 that are included in the memory cell 380 are constructed in one chip.

The chip is formed in and over a substrate 270. As the substrate 270, a single crystal semiconductor substrate or a polycrystalline semiconductor substrate of silicon or silicon carbide, a compound semiconductor substrate of silicon germanium, an SOI substrate, or the like can be used.

Examples of the substrate 270 are a glass substrate, a quartz substrate, a plastic substrate, a metal substrate, a stainless steel substrate, a substrate including stainless steel foil, a tungsten substrate, and a substrate including tungsten foil, a flexible substrate, an attachment film, paper including a fibrous material, and a base film. Examples of the glass substrate are a barium borosilicate glass substrate, an aluminoborosilicate glass substrate, and a soda lime glass substrate. Examples of the flexible substrate are flexible synthetic resin substrates such as substrates of plastics typified by polyethylene terephthalate (PET), polyethylene naphthalate (PEN), and polyether sulfone (PES) and an acrylic substrate. Examples of the attachment film are attachment films formed using polypropylene, polyester, polyvinyl fluoride, polyvinyl chloride, and the like. Examples of the base film are base films formed using polyester, polyamide, polyimide, aramid, epoxy, an inorganic vapor deposition film, and paper.

Alternatively, a semiconductor element may be formed using one substrate, and then, transferred to another substrate. Examples of a substrate to which a semiconductor element is transferred include, in addition to the above-described substrates, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), a leather substrate, and a rubber substrate. When such a substrate is used, a transistor with excellent properties or a transistor with low power consumption can be formed, a device with high durability, high heat resistance can be provided, or reduction in weight or thickness can be achieved.

In the example illustrated in FIG. 23, a single crystal silicon wafer is used as the substrate 270.

Semiconductor elements such as the transistors and the capacitor are provided in an FET layer 260. In FIG. 23, the transistors M71 and M72 are typically illustrated. Wiring layers $W_1$ to $W_4$ are stacked over the FET layer 260. An FET layer 261 is stacked over the wiring layer $W_4$.

The transistors M71 and M72 each include a channel formation region 272 formed in a well 271, low concentration impurity regions 273 and high concentration impurity regions 274 (also collectively referred to as an impurity region simply) provided so as to sandwich the channel formation region 272, conductive regions 275 provided in contact with the impurity regions, a gate insulating film 276 provided over the channel formation region 272, and a gate electrode 277 provided over the gate insulating film 276. Sidewall insulating, films 278 and 279 are provided on side surfaces of the gate electrode 277. Note that the conductive regions 275 can be formed using metal silicide or the like.

An FET layer 261 is a layer in which an OS transistor, that is, the transistor M70 is formed. Here, the structure of the transistor M70 is similar to that of the transistor 600 illustrated in FIG. 19. As a second gate (back gate) of the transistor M70, a conductive layer 280 is formed in the wiring layer $W_4$.

Wiring layers $W_5$, $W_6$, and $W_7$ are stacked over the FET layer 261, and a capacitor layer 262 is stacked over the wiring layer $W_7$, and wiring layers $W_8$ and $W_9$ are stacked over the capacitor layer 262. The capacitor C70 is formed in the capacitor layer 262. The capacitor C70 includes conductive layers 281 and 282. Stacking the capacitor layer 262 over the FET layer 261 facilitates increase of the capacitance of the capacitor C70. Alternatively, depending on the capacitance of the capacitor C70, the capacitor C70 can be provided in the FET layer 261. In that case, two electrodes of the capacitor C70 are formed using a conductive layer which is at the same level as the source electrode and the drain electrode of the transistor M70 and a conductive layer which is at the same level as the gate electrode of the transistor M70. Providing the capacitor C70 in the FET layer 261 can reduce the number of steps, leading to reduction in manufacturing cost.

Insulating layers 291 to 293 preferably include at least one layer that is formed using an insulator having a blocking effect against hydrogen, water, and the like. Water, hydrogen, and the like are factors that generate carriers in an oxide semiconductor; thus, providing such a blocking layer against hydrogen, water, and the like can improve reliability of the transistor M70. Examples of the insulator having a blocking effect against hydrogen, water, and the like include aluminum oxide, aluminum oxynitride, gallium oxide, gallium oxynitride, yttrium oxide, yttrium oxynitride, hafnium oxide, hafnium oxynitride, and yttria-stabilized zirconia (YSZ).

In FIG. 23, regions without reference numerals and hatch patterns represent regions formed of an insulator. As the insulator, an insulator containing at least one of aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, tantalum oxide, and the like can be used.

Alternatively, as the insulator, an organic resin such as a polyimide resin, a polyamide resin, an acrylic resin, a siloxane resin, an epoxy resin, or a phenol resin can be used. Note that in this specification, an oxynitride refers to a substance that contains more oxygen than nitrogen, and a nitride oxide refers to a substance that contains more nitrogen than oxygen.

Embodiment 4

In this embodiment, a wireless sensor formed using the semiconductor device 1 or 2 described in Embodiment 1 will be described with reference to FIGS. 24A and 24B and FIG. 25.

<Structural Example 1 of Wireless Sensor>

Figure 24A:
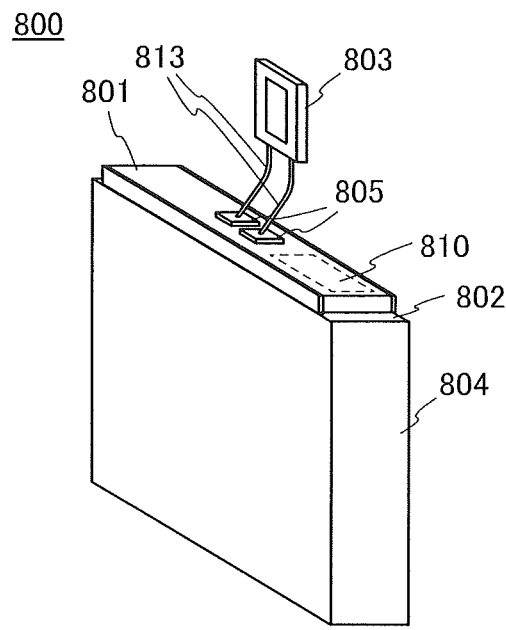
FIGS. 24A and 24B are perspective views illustrating a structural example of a wireless sensor.
Figure 24B:
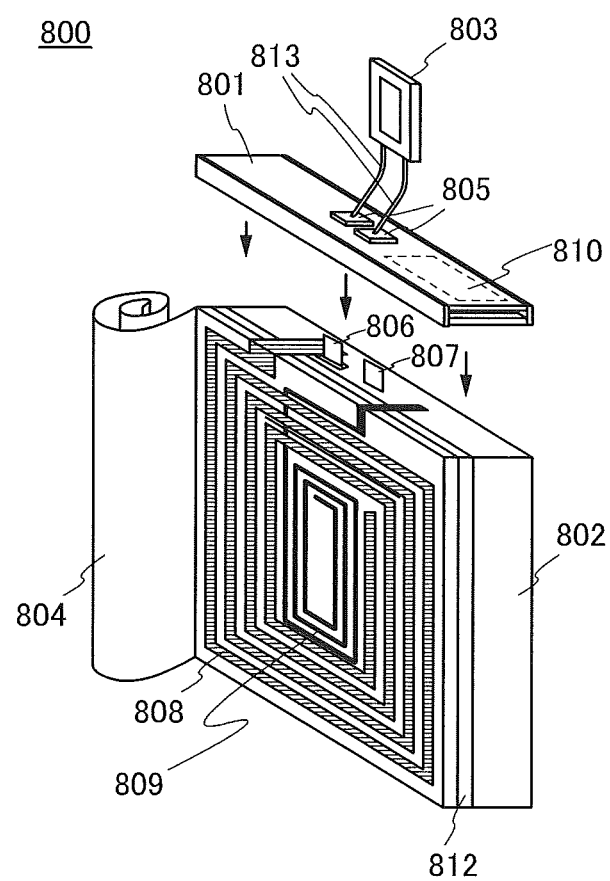

FIGS. 24A and 24B are external views illustrating a structural example of a wireless sensor 800 of one embodiment of the present invention. The wireless sensor 800 includes a circuit board 801, a battery 802, and a sensor 803. A label 804 is attached to the battery 802. Furthermore, as illustrated in FIG. 24B, the wireless sensor 800 includes a terminal 806, a terminal 807, an antenna 808, and an antenna 809.

The circuit board 801 is provided with terminals 805 and an integrated circuit 810. The terminals 805 are connected to the sensor 803 through wirings 813. Note that the number of the terminals 805 are not limited to two and determined depending on the case.

Furthermore, the circuit board 801 may be provided with a semiconductor element such as a transistor or a diode, a resistor, a wiring, or the like.

In the case where heat that is generated by the battery 802 or an electromagnetic field that is generated by the antennas 808 and 809 adversely affects the operation of the sensor 803, the length of the wiring 813 is extended so that the sensor 803 is apart from the battery 802 or the antennas 808 and 809. The length of the wiring 813 is, for example, longer than or equal to 1 cm and shorter than or equal to 1 m, preferably longer than or equal to 1 cm and shorter than or equal to 50 cm, more preferably longer than or equal to 1 cm and shorter than or equal to 30 cm.

Unless the heat or electromagnetic field affects the sensor 803, the sensor 803 can be provided directly on the circuit board 801 without providing the wiring 813.

The shape of each of the antennas 808 and 809 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 808 or 809 may be a flat-plate conductor. The flat-plate conductor can serve as one of conductors for electric field coupling. That is, the antenna 808 or 809 can serve as one of two conductors of a capacitor. Thus, power can be transmitted and received not only by an electromagnetic field or a magnetic field but also by an electric field.

The integrated circuit 810 includes a circuit formed using a Si transistor or an OS transistor.

The line width of the antenna 808 is preferably larger than that of the antenna 809. This makes it possible to increase the amount of power that is received by the antenna 808.

The sensor 803 is a circuit having a function of outputting various kinds of data such as thermal data, mechanical data, and electromagnetic data, as analog data.

The wireless sensor 800 includes a layer 812 between the battery 802 and the antennas 808 and 809. The layer 812 has, for example, a function of blocking an electromagnetic field that is generated by the battery 802. As the layer 812, for example, a magnetic body can be used.

<Structural Example 2 of Wireless Sensor>

Figure 25:
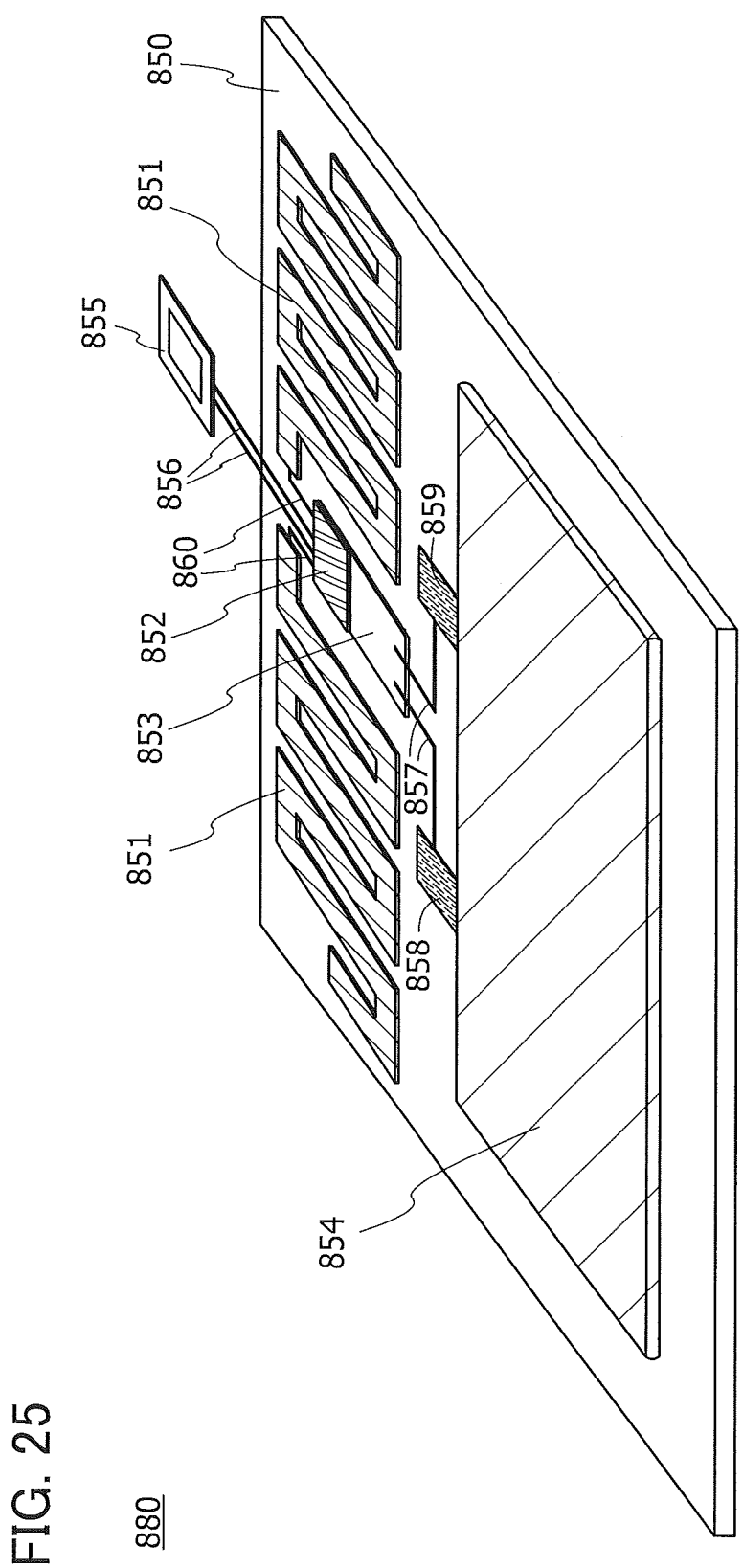
FIG. 25 is a perspective view illustrating a structural example of a wireless sensor.
Figure 26:
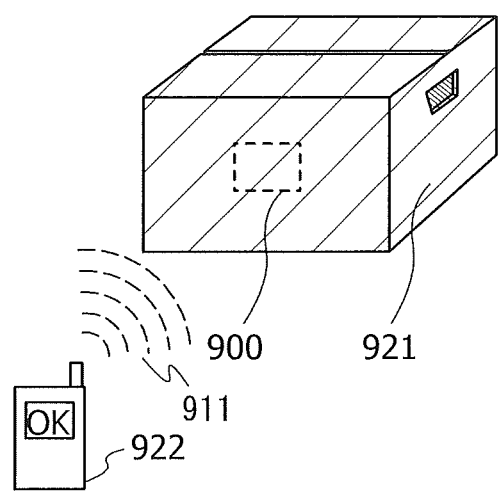
FIG. 26 is a schematic view illustrating an application example of a wireless sensor.

FIG. 25 is an external view illustrating a structural example of a wireless sensor 880 of one embodiment of the present invention. The wireless sensor 880 includes a support 850, an antenna 851, an integrated circuit 852, a circuit board 853, a sensor 855, and a battery 854.

The circuit board 853 is provided with the integrated circuit 852. Furthermore, the circuit board 853 may also be provided with a semiconductor element such as a transistor or a diode, a resistor, a wiring, or the like.

The integrated circuit 852 includes a circuit formed using a Si transistor or an OS transistor.

The antenna 851 is connected to the integrated circuit 852 through the wiring 860. For the details of the antenna 851, the description of the antenna 808 or 809 of the wireless sensor 800 can be referred to.

The sensor 855 is connected to the integrated circuit 852 through the wiring 856. Furthermore, the sensor 855 is formed either outside the support 850 or over the support 850.

The sensor 855 is a circuit having a function of outputting various kinds of data such as thermal data, mechanical data, and electromagnetic data, as analog data.

The battery 854 includes a terminal 858 having a function as one of a positive electrode and a negative electrode and a terminal 859 having a function as the other of the positive electrode and the negative electrode. The terminals are connected to the integrated circuit 852 through a wiring 857 and the circuit board 853.

The support 850 can be formed using glass, quartz, plastic, metal, stainless steel foil, tungsten foil, a flexible substrate, an attachment film, a base film, paper including a fibrous material, or wood, for example. Examples of the flexible substrate are flexible synthetic resin substrates such as substrates of plastics typified by polyethylene terephthalate (PET), polyethylene naphthalate (PEN), and polyether sulfone (PES) and an acrylic substrate. Examples of the attachment film are attachment films formed using polypropylene, polyester, polyvinyl fluoride, polyvinyl chloride, and the like. Examples of the base film are base films formed using polyester, polyamide, polyimide, aramid, epoxy, an inorganic vapor deposition film, and paper.

The wireless sensor 880 is preferably thin. In particular, the thickness of the wireless sensor 880 including the thicknesses of the battery 854 and the support 850 is preferably larger than or equal to 0.1 mm and smaller than or equal to 5 mm, more preferably larger than or equal to 0.1 mm and smaller than or equal to 3 mm, still more preferably larger than or equal to 0.1 mm and smaller than or equal to 1 mm. The wireless sensor 880 having the above thickness can be embedded in paper such as a poster or corrugated cardboard.

Furthermore, the wireless sensor 880 is preferably flexible. In particular, the support 850 and the battery 854 are preferably able to be changed in their forms with a curvature radius of 30 mm or more, preferably 10 nm or more. The wireless sensor 880 having the above structure can be worn on clothing or a human body.

In order to obtain the above structure, the battery 854 is preferably thin and flexible. As an exterior body of the battery 854, for example, a film having a three-layer structure of a first thin film, a second thin film, and a third thin film formed in this order may be used. Note that the third thin film has a function as the outer surface of the exterior body. Examples of a material for the first thin film include polyethylene, polypropylene, polycarbonate, ionomer, and polyamide. Examples of a material for the second thin film include a highly flexible thin metal film of aluminum, stainless steel, copper, nickel, or the like. Examples of a material for the third thin film include an insulating synthetic resin film of a polyamide-based resin, a polyester-based resin, or the like.

Embodiment 5

In this embodiment, application examples of the wireless sensor described in the above embodiment will be described with reference to FIG. 26, FIGS. 27A and 27B, and FIG. 28. As a wireless sensor 900 described in FIG. 26, FIGS. 27A and 27B, and FIG. 28, the wireless sensor 800 or the wireless sensor 880 described in Embodiment 4 can be used.

For example, the wireless sensor 900 is attached to, or incorporated in an article 921, and the radio signal 911 is sent from an external reader 922. The wireless sensor 900 having received the radio signal 911 can obtain data of a temperature or the like without touch but with the sensor, and send the data to the reader 922.

Figure 27A:
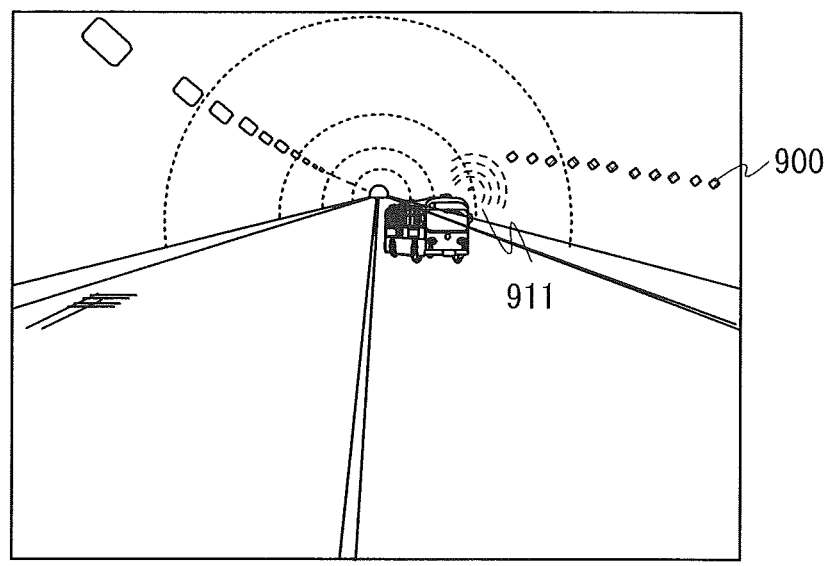
FIGS. 27A and 27B are schematic views each illustrating an application example of a wireless sensor.

Another application form of the wireless sensor can be described with a schematic diagram in FIG. 27A. For example, the wireless sensor 900 is embedded in a tunnel wall surface, and a radio signal 911 is sent externally. The wireless sensor 900 having received the radio signal 911 can obtain data on the tunnel wall surface by the sensor and send the data. The use of the semiconductor device 1 or 2 described in Embodiment 1 for the wireless sensor 900 enables efficient investigation of the disrepair of the tunnel wall surface.

Figure 27B:
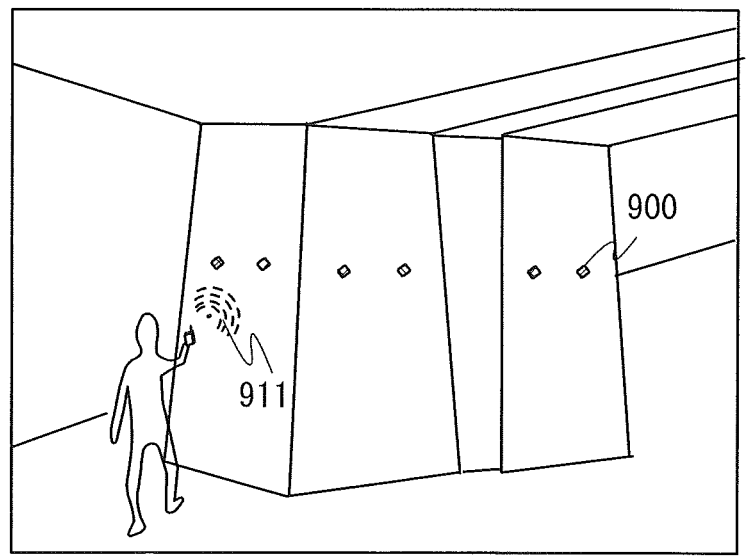

Another application form of the wireless sensor can be described with a schematic diagram in FIG. 27B. For example, the wireless sensor 900 is embedded in a wall surface of a pillar of a bridge, and the radio signal 911 is sent externally. The wireless sensor 900 having received the radio signal 911 can obtain data in the pillar of the bridge by the sensor and send the data. The use of the semiconductor device 1 or 2 described in Embodiment 1 for the wireless sensor 900 enables efficient investigation of the disrepair in the pillar of the bridge.

Figure 28:
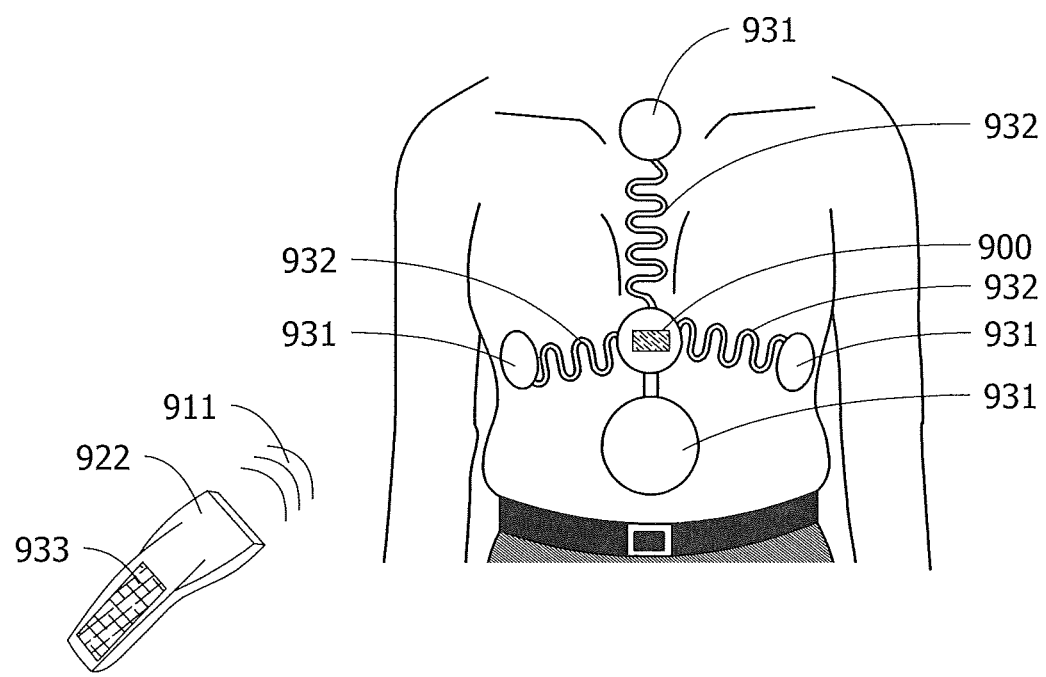
FIG. 28 is a schematic view illustrating an application example of a wireless sensor.

Another application form of the wireless sensor can be described with a schematic diagram in FIG. 28. For example, the wireless sensor 900 is attached to a human body with the use of a bond pad or the like, and the radio signal 911 is sent from the reader 922. The wireless sensor 900 having received the radio signal 911 can obtain data such as biological data by supplying a signal to an electrode 931 or the like attached to the human body through a wiring 932, and send the data. The obtained data can be checked on a display 933 of the reader 922. The use of the semiconductor device 1 or 2 described in Embodiment 1 for the wireless sensor 900 enables efficient acquisition of biological data of human bodies.

Embodiment 6

In this embodiment, electronic devices each including the semiconductor device described in the above embodiment will be described. Examples of the electronic devices include devices including wireless communication units, such as computers, various portable information terminals (including mobile phones, portable game machines, audio reproducing devices, and the like), electronic paper, and wireless keyboards. A refrigerator, an air conditioner, an automobile, a washing machine, a cooking device (e.g., a microwave oven) may be provided with a wireless communication unit including the signal processing device described in the above embodiment, so as to be remotely controlled by a computer or any of various portable information terminals.

Figure 29A:
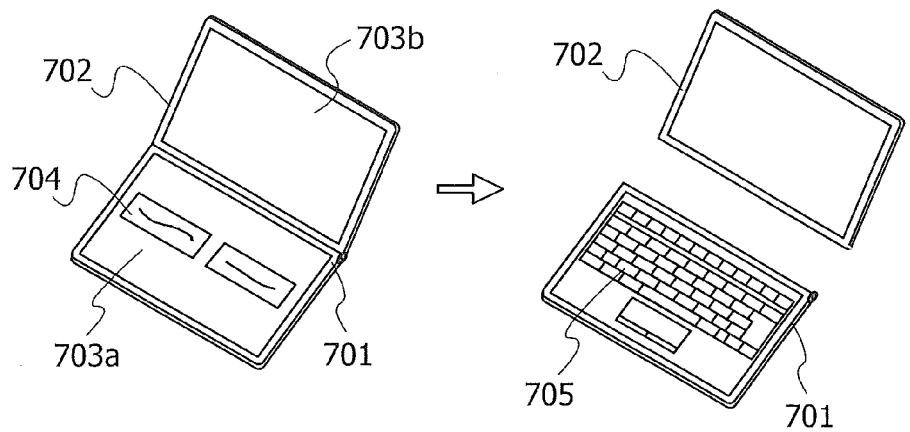
FIGS. 29A to 29D each illustrate an example of an electronic device.

FIG. 29A illustrates a portable information terminal that includes a housing 701, a housing 702, a first display portion 703a, a second display portion 703b, and the like. The semiconductor device described in the above embodiment is provided in at least one of the housing 701 and the housing 702. Thus, the portable information terminal can achieve low power consumption.

Note that the first display portion 703a is a touch panel, and for example, as illustrated in the left of FIG. 29A, which of "touch input" and "keyboard input" is performed can be selected by a selection button 704 displayed on the first display portion 703a. The selection button can be displayed in a variety of sizes; thus, the portable information terminal can be easily used by people of any generation. In the case where "keyboard input" is selected, for example, a keyboard 705 is displayed on the first display portion 703a as illustrated in the right of FIG. 29A. With such a structure, text can be input quickly by keyboard input as in the case of using a conventional information terminal, for example.

Furthermore, one of the first display portion 703a and the second display portion 703b can be detached from the portable information terminal as illustrated in the right in FIG. 29A. When the second display portion 703b is also a touch panel, the information terminal has a further reduced weight and thus is easy to carry, which is convenient because operation can be performed with one hand while the other hand supports the housing 702.

The portable information terminal illustrated in FIG. 29A can have a function of displaying various kinds of information (e.g., a still image, a moving image, and a text image); a function of displaying a calendar, the date, the time, and the like on the display portion; a function of operating or editing the information displayed on the display portion; a function of controlling processing by various kinds of software (programs); and the like. Furthermore, an external connection terminal (an earphone terminal, a USB terminal, or the like), a recording medium insertion portion, and the like may be provided on the back surface or a side surface of the housing.

With the portable information terminal illustrated in FIG. 29A, desired book data or the like can be purchased and downloaded from an electronic book server through wireless communication. Furthermore, the housing 702 illustrated in FIG. 29A may have an antenna, a microphone function, or a wireless communication function to be used as a mobile phone. Note that data communication between the housings 701 and 702 that are separated from each other can be performed through wireless communication.

Figure 29B:
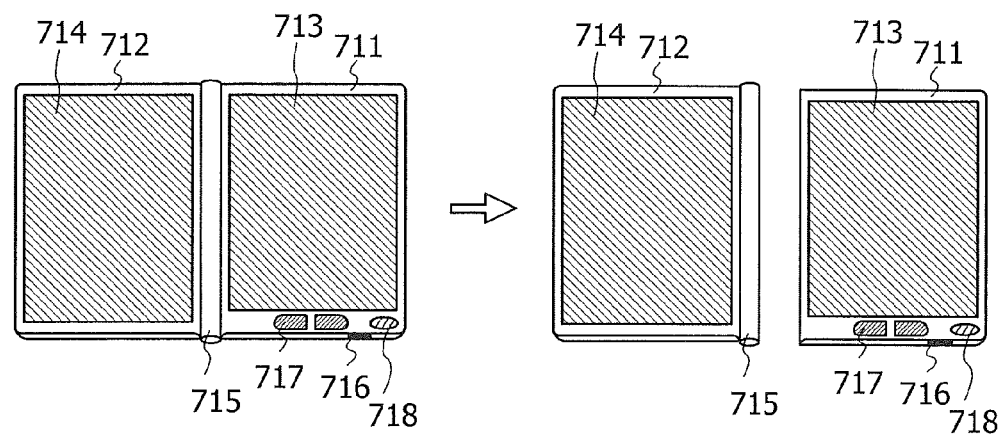

FIG. 29B illustrates an e-book reader incorporating electronic paper. The e-book reader includes two housings, a housing 711 and a housing 712. The housing 711 and the housing 712 include a display portion 713 and a display portion 714, respectively. For example, the display portion 714 may be formed using electronic paper and the display portion 713 may be formed using a display device that has a high response speed and is favorable for displaying a moving image, such as a liquid crystal display device or an organic light-emitting display device.

The housing 711 is connected to the housing 712 by a hinge 715, so that the e-book reader can be opened and closed using the hinge 715 as an axis. The housing 711 is provided with a power switch 716, operation keys 717, a speaker 718, and the like. At least one of the housings 711 and 712 is provided with the semiconductor device described in the above embodiment. Thus, the e-book reader can achieve low power consumption.

The housings 711 and 712 may each be provided with a secondary battery so as to be separately driven as in the right of FIG. 29B, for example. For example, the housing 712 may be provided with a communication device that can be connected to a mobile phone line and a device that complies with a short-distance wireless communication standard (e.g., wireless LAN or Bluetooth (registered trademark)), and the housing 711 may be provided with a short-distance wireless communication device. In that case, data received by the housing 712 through the mobile phone line is transferred to the housing 711 using a short-distance wireless communication standard. Data input to the housing 711 is sent to the housing 712 using a short-distance wireless communication standard and then is sent to the mobile phone line. That is, the housing 712 functions as a wireless modem.

The housings 711 and 712 can be configured to sound an alarm or the housing 713 can be configured to display a message in the case where communication is (or might be) unintentionally interrupted because the distance between the housings 711 and 712 increases. In that case, a risk of losing the housings can be reduced.

In the case of such usage, for example, the housing 712 is usually put in a bag, and the housing 711 is held with a hand or placed at a position from which the housing 711 can be easily taken out (e.g., in a pocket of clothes), whereby simple operation can be performed by the housing 711. For example, part or all of data can be stored in the housing 712 and transmitted to the housing 711 using a short-distance wireless communication standard to be read or viewed on the housing 711 as needed.

Figure 29C:
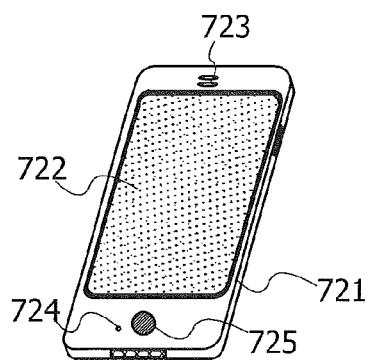

FIG. 29C is a smartphone. A housing 721 of the smartphone is provided with a display portion 722, a speaker 723, a microphone 724, an operation button 725, and the like. The semiconductor device described in the above embodiment is provided in the housing 721. Thus, the smartphone can achieve low power consumption.

Figure 29D:
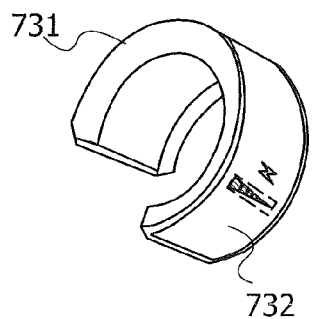

FIG. 29D is a wristband type display device including a housing 731, a display portion 732, and the like. In the housing 731, the semiconductor device described in the above embodiment is provided. Thus, the wristband type display device can achieve low power consumption.

Embodiment 7

In this embodiment, the structure of an oxide semiconductor film that can be used for the OS transistor described in Embodiment 3 will be described.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

In this specification, trigonal and rhombohedral crystal systems are included in a hexagonal crystal system.

An oxide semiconductor film is classified into a single crystal oxide semiconductor film and a non-single-crystal oxide semiconductor film. Alternatively, an oxide semiconductor is classified into a crystalline oxide semiconductor and an amorphous oxide semiconductor, for example.

Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor. Examples of the crystalline oxide semiconductor include a single crystal oxide semiconductor, a CAAC-OS, a polycrystalline oxide semiconductor, and a microcrystalline oxide semiconductor.

First, a CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-OS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an InGaZnO$_4$ crystal is analyzed by an out-of-plane method using an X-ray diffraction (XRD) apparatus, a peak may appear at a diffraction angle (2θ) of around 31°. This peak is derived from the (009) plane of the InGaZnO$_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released and might behave like fixed electric charge. Thus, the transistor including the oxide semiconductor film having high impurity concentration and a high density of defect states has unstable electrical characteristics in some cases.

Note that in this specification and the like, the carrier density of a substantially intrinsic oxide semiconductor film is higher than or equal to $1\times10^{-9}/cm^3$ and lower than $8\times10^{11}/cm^3$, preferably lower than $1\times10^{11}/cm^3$, more preferably lower than $1\times10^{10}/cm^3$. With a highly purified intrinsic oxide semiconductor film, the transistor can have stable electric characteristics.

With the use of the CAAC-OS film in a transistor, variation in the electrical characteristics of the transistor due to irradiation with visible light or ultraviolet light is small.

Next, a microcrystalline oxide semiconductor will be described.

A microcrystalline oxide semiconductor film has a region in which a crystal part is observed and a region in which a crystal part is not clearly observed in a high-resolution TEM image. In most cases, the size of a crystal part included in the microcrystalline oxide semiconductor film is greater than or equal to 1 nm and less than or equal to 100 nm, or greater than or equal to 1 nm and less than or equal to 10 nm. An oxide semiconductor film including a nanocrystal that is a microcrystal with a size greater than or equal to 1 nm and less than or equal to 10 nm, or a size greater than or equal to 1 nm and less than or equal to 3 nm is specifically referred to as a nanocrystalline oxide semiconductor (nc-OS) film. In a high-resolution TEM image of the nc-OS film, for example, a grain boundary is not clearly observed in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different crystal parts in the nc-OS film. Thus, the orientation of the whole film is not ordered. Accordingly, the nc-OS film cannot be distinguished from an amorphous oxide semiconductor film, depending on an analysis method. For example, when the nc-OS film is subjected to structural analysis by an out-of-plane method with an XRD apparatus using an X-ray having a diameter larger than the size of a crystal part, a peak which shows a crystal plane does not appear. Furthermore, a diffraction pattern like a halo pattern is observed when the nc-OS film is subjected to electron diffraction using an electron beam with a probe diameter (e.g., 50 nm or larger) that is larger than the size of a crystal part (the electron diffraction is also referred to as selected-area electron diffraction). Meanwhile, spots appear in a nanobeam electron diffraction pattern of the nc-OS film when an electron beam having a probe diameter close to or smaller than the size of a crystal part is applied. Moreover, in a nanobeam electron diffraction pattern of the nc-OS film, regions with high luminance in a circular (ring) pattern are shown in some cases. Also in a nanobeam electron diffraction pattern of the nc-OS film, a plurality of spots is shown in a ring-like region in some cases.

The nc-OS film is an oxide semiconductor film that has high regularity as compared with an amorphous oxide semiconductor film. Therefore, the nc-OS film is likely to have a lower density of defect states than an amorphous oxide semiconductor film Note that there is no regularity of crystal orientation between different crystal parts in the nc-OS film. Therefore, the nc-OS film has a higher density of defect states than the CAAC-OS film.

Next, an amorphous oxide semiconductor film will be described.

The amorphous oxide semiconductor film is an oxide semiconductor film having disordered atomic arrangement and no crystal part and exemplified by an oxide semiconductor film that exists in an amorphous state, such as quartz.

In a high-resolution TEM image of the amorphous oxide semiconductor film, crystal parts cannot be found.

When the amorphous oxide semiconductor film is subjected to structural analysis by an out-of-plane method with an XRD apparatus, a peak that shows a crystal plane does not appear. A halo pattern is observed when the amorphous oxide semiconductor film is subjected to electron diffraction. Furthermore, a spot is not observed and a halo pattern appears when the amorphous oxide semiconductor film is subjected to nanobeam electron diffraction.

Note that an oxide semiconductor film may have a structure having physical properties between the nc-OS film and the amorphous oxide semiconductor film. The oxide semiconductor film having such a structure is specifically referred to as an amorphous-like oxide semiconductor (a-like OS) film.

In a high-resolution TEM image of the a-like OS film, a void may be observed. Furthermore, in the high-resolution TEM image, there are a region where a crystal part is clearly observed and a region where a crystal part is not observed. The growth of the crystal part occurs due to the crystallization of the a-like OS film, which is induced by a slight amount of electron beam employed in the TEM observation. In contrast, in the nc-OS film that have good quality, crystallization hardly occurs by a slight amount of electron beam used for TEM observation.

Note that the crystal part size in the a-like OS film and the nc-OS film can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers including three In—O layers and six Ga—Zn—O layers are stacked in the c-axis direction. Accordingly, the distance between the adjacent layers is equivalent to the lattice spacing on the (009) plane (also referred to as d value). The value is calculated to be 0.29 nm from crystal structural analysis. Thus, focusing on lattice fringes in the high-resolution TEM image, each of lattice fringes in which the lattice spacing therebetween is greater than or equal to 0.28 nm and less than or equal to 0.30 nm corresponds to the a-b plane of the $InGaZnO_4$ crystal.

Furthermore, the density of an oxide semiconductor film depends on the structure in some cases. For example, when the composition of an oxide semiconductor film is determined, the structure of the oxide semiconductor film can be expected by comparing the density of the oxide semiconductor film with the density of a single crystal oxide semiconductor film having the same composition as the oxide semiconductor film. For example, the density of the a-like OS film is higher than or equal to 78.6% and lower than 92.3% of the density of the single crystal oxide semiconductor film having the same composition. For example, the density of each of the nc-OS film and the CAAC-OS film is higher than or equal to 92.3% and lower than 100% of the density of the single crystal oxide semiconductor film having the same composition. Note that it is difficult to deposit an oxide semiconductor film having a density of lower than 78% of the density of the single crystal oxide semiconductor film.

Specific examples of the above description will be given. For example, in the case of an oxide semiconductor film having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor film having an atomic ratio of In:Ga:Zn=1:1:1, the density of the a-like OS film is higher than or equal to 5.0 $g/cm^3$ and lower than 5.9 $g/cm^3$. For example, in the case of the oxide semiconductor film having an atomic ratio of In:Ga:Zn=1:1:1, the density of each of the nc-OS film and the CAAC-OS film is higher than or equal to 5.9 $g/cm^3$ and lower than 6.3 $g/cm^3$.

Note that there is a possibility that an oxide semiconductor film having a certain composition cannot exist in a single crystal structure. In that case, single crystal oxide semiconductor films with different compositions are combined at an adequate ratio, which makes it possible to calculate density equivalent to that of a single crystal oxide semiconductor film with the desired composition. The density of a single crystal oxide semiconductor film having the desired composition can be calculated using a weighted average according to the combination ratio of the single crystal oxide semiconductor films with different compositions. Note that it is preferable to use as few kinds of single crystal oxide semiconductor films as possible to calculate the density.

Note that an oxide semiconductor film may be a stack including two or more of an amorphous oxide semiconductor film, an a-like OS film, a microcrystalline oxide semiconductor film, and a CAAC-OS film, for example.

Embodiment 8

In this embodiment, a semiconductor device with a display portion of one embodiment of the present invention will be described with reference to FIGS. 30A and 30B and FIG. 31.

By being combined with the semiconductor device 1 or 2 described in Embodiment 1, a semiconductor device 5 described in this embodiment has a function of displaying data acquired by a sensor on a display portion.

Figure 30A:
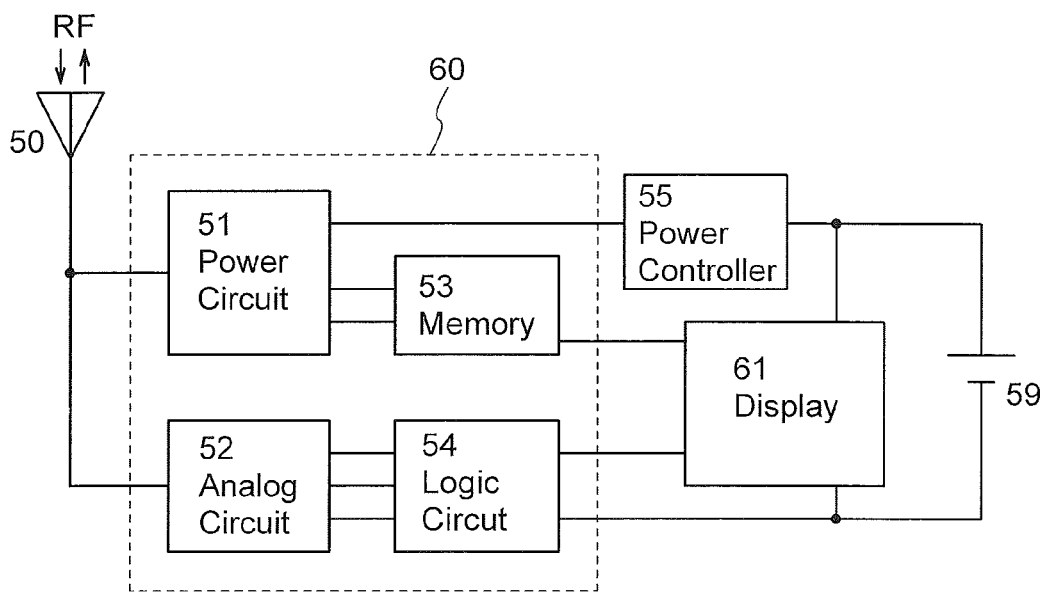
FIGS. 30A and 30B are block diagrams each illustrating a configuration example of a semiconductor device.
Figure 30B:
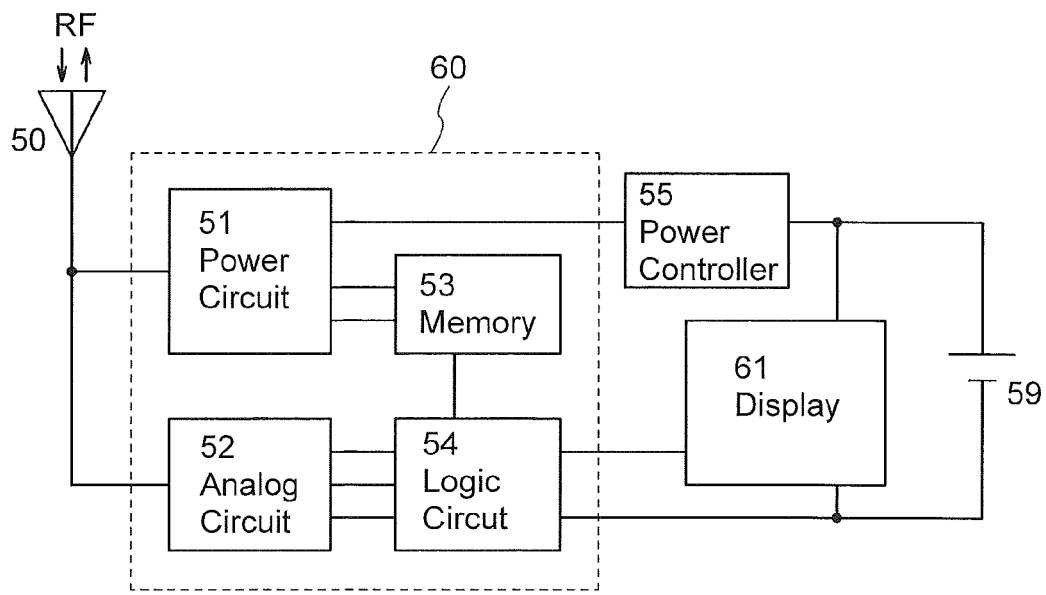

FIG. 30A is a circuit block diagram of the semiconductor device 5 of one embodiment of the present invention.

The semiconductor device 5 includes an antenna 50, an RF device 60, a power control circuit 55, a display portion 61, and a battery 59. The RF device 60 includes a power circuit 51, an analog circuit 52, a memory 53, and a logic circuit 54.

The antenna 50 has a function of converting the radio signal RF into an electric signal or converting an electric signal into the radio signal RF and transmitting/receiving the signal to/from an external device such as a reader. A plurality of antennas 50 may be provided depending on the frequency band of the radio signal RF. Note that the radio signal RF is a modulated carrier wave. Modulation methods include analog modulation and digital modulation, for example, and any of amplitude modulation, phase modulation, frequency modulation, and spread spectrum may be used.

The frequency band of the radio signal RF is appropriately selected according to the laws and the like. For example, a long wave band of a 135 kHz band, a short wave band of a 13.56 MHz band, an UHF band of a 900 MHz band, a microwave band of a 2.45 GHz band, or the like can be used. Depending on the frequency band of the radio signal RF, the structure of an antenna 50 can be determined.

The power circuit 51 is a circuit having a function of generating a voltage on the basis of the radio signal RF. A voltage generated by the power circuit 51 is supplied to the circuits included in the semiconductor device 5. Note that one or more voltages may be generated by the power circuit 51.

The analog circuit 52 has a function of modulating or demodulating the radio signal RF.

The logic circuit 54 has a function of executing a command contained in the radio signal RF. The logic circuit 54 has, for example, a function of controlling the emission state of the display portion 61 in accordance with the command.

For the display portion 61, any of the following various kinds of display devices can be used, for example: an EL element (e.g., an EL element including organic and inorganic materials, an organic EL element, or an inorganic EL element), an LED (e.g., a white LED, a red LED, a green LED, or a blue LED), a transistor (a transistor that emits light depending on a current), an electron emitter, a liquid crystal element, electronic ink, an electrophoretic element, a display element using MEMS, DMD, DMS, MIRASOL (registered trademark), an IMOD element, a MEMS shutter display element, an optical-interference-type MEMS display element, an electrowetting element, a piezoelectric ceramic display, a display element including a carbon nanotube, and the like.

The memory 53 has a function of storing data to be displayed on the display portion 61. Note that as illustrated in FIG. 30B, a wiring may be provided between the memory 53 and the logic circuit 54 so that data stored in the memory 53 can be supplied to the display portion 61 through the logic circuit 54.

A nonvolatile memory is preferably used as the memory 53 to prevent data loss when power supply is intermittently performed. In particular, the nonvolatile memory using an oxide semiconductor that is described in Embodiment 2 is preferably used as the memory 53. The use of the nonvolatile memory using an oxide semiconductor permits the memory 53 to hold data at high temperatures. Furthermore, the use of the nonvolatile memory using an oxide semiconductor allows the memory 53 to write data at a low voltage.

Moreover, the use of the nonvolatile memory using an oxide semiconductor enables the memory 53 to store analog data as well as digital data.

When the memory 53 is configured to store only digital data, a flash memory, a ferroelectric random access memory (FeRAM), a magnetoresistive random access memory (MRAM), a phase change random access memory (PRAM), a resistance random access memory (ReRAM), or the like can be used as the memory 53, for example.

The battery 59 may be a secondary battery or an electric double layer capacitor, which can be repeatedly charged and discharged. It is particularly preferred that the battery 59 store power of the radio signal RF.

The power control circuit 55 has a function of controlling power supply. The power control circuit 55 has, for example, a function of charging the battery 59 when the intensity of the radio signal RF is high and a function of discharging the battery 59 and compensating for the shortage of power of the RF device 60 when the intensity of the radio signal RF is low.

Note that the battery 59 may be a primary battery that is only discharged. In that case, the power control circuit 55 has a function of stopping discharge of the battery 59 when the intensity of the radio signal RF is high and a function of discharging the battery 59 and compensating for the shortage of power of the RF device 60 when the intensity of the radio signal RF is low.

The semiconductor device 5 having the above structure is capable of driving a circuit that cannot be driven only with power of the radio signal RF, such as the display portion 61.

Furthermore, the semiconductor device 5 having the above structure is capable of operating even in a period when the radio signal RF is not supplied. In addition, the semiconductor device 5 is capable of displaying data on the display portion 61 even in a period when the radio signal RF is not supplied. Moreover, the semiconductor device 5 is capable of efficiently charging and discharging the battery 59, enabling long-time operation.

Next, an example of a display device including the semiconductor device 5 will be described with reference to FIG. 31.

Figure 31:
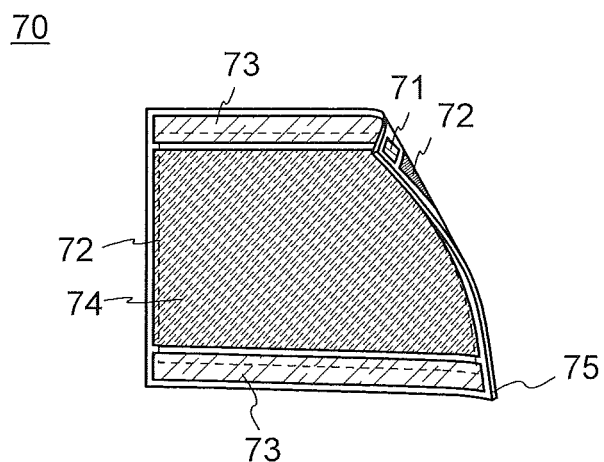
FIG. 31 is an external view illustrating a structural example of a display device.

FIG. 31 is an external view of a display device 70. The display device 70 includes a circuit board 71, a battery 72, a solar cell 73, a display portion 74, and a support 75.

The circuit board 71 is provided with the antenna 50, the RF device 60, and the power control circuit 55.

The solar cell 73 has a function of charging the battery 72. Even when a radio signal is not supplied to the display device 70, the solar cell 73 can charge the battery 72.

The support 75 is preferably formed using a flexible thin material. The support 75 that is flexible allows, for example, the display device 70 to be attached to a wall or the like or to be hung from a ceiling or the like.

The support 75 can be formed using plastic, stainless steel foil, tungsten foil, a flexible substrate, an attachment film, a base film, paper including a fibrous material, or wood, for example. Examples of the flexible substrate are flexible synthetic resin substrates such as substrates of plastics typified by polyethylene terephthalate (PET), polyethylene naphthalate (PEN), and polyether sulfone (PES) and an acrylic substrate. Examples of the attachment film are attachment films formed using polypropylene, polyester, polyvinyl fluoride, polyvinyl chloride, and the like. Examples of the base film are base films formed using polyester, polyamide, polyimide, aramid, epoxy, an inorganic vapor deposition film, and paper.

The display device 70 has a function of displaying image data externally supplied with a radio signal on the display portion 74. Thus, the display device 70 is capable of easily updating image data.

For example, when the display device 70 is used as a poster on the street, the display device 70 has a function of receiving a radio signal generated from a mobile terminal carried by a passenger, such as a smartphone, and displaying an advertisement that suits his/her taste on the display portion 74.

Example 1

In this example, the semiconductor device 5 illustrated in FIG. 30A was fabricated as a prototype, and the operation thereof was checked.

Figure 32:
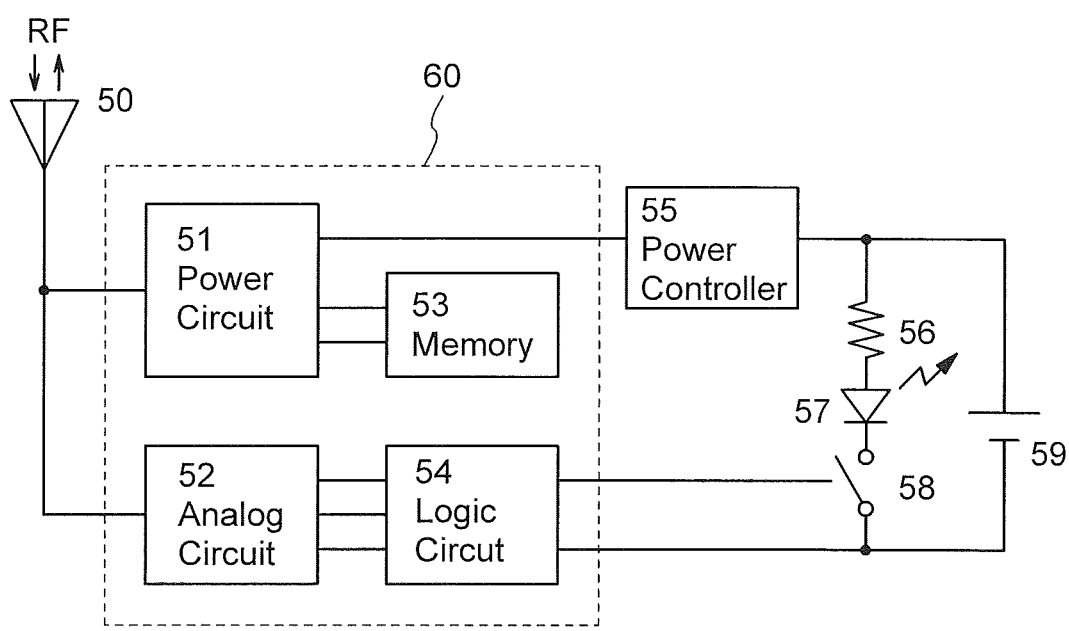
FIG. 32 is a block diagram illustrating a configuration example of a semiconductor device fabricated as a prototype.

FIG. 32 is a circuit block diagram of a semiconductor device fabricated in this example. A resistor 56, a light-emitting diode 57, and a switch 58 in FIG. 32 correspond to the display portion 61 in FIG. 30A.

The switch 58 has a function of controlling a current that flows through the light-emitting diode 57 and controlling the emission state of the light-emitting diode 57. In addition, the on/off of the switch 58 is controlled by the logic circuit 54.

Figure 33:
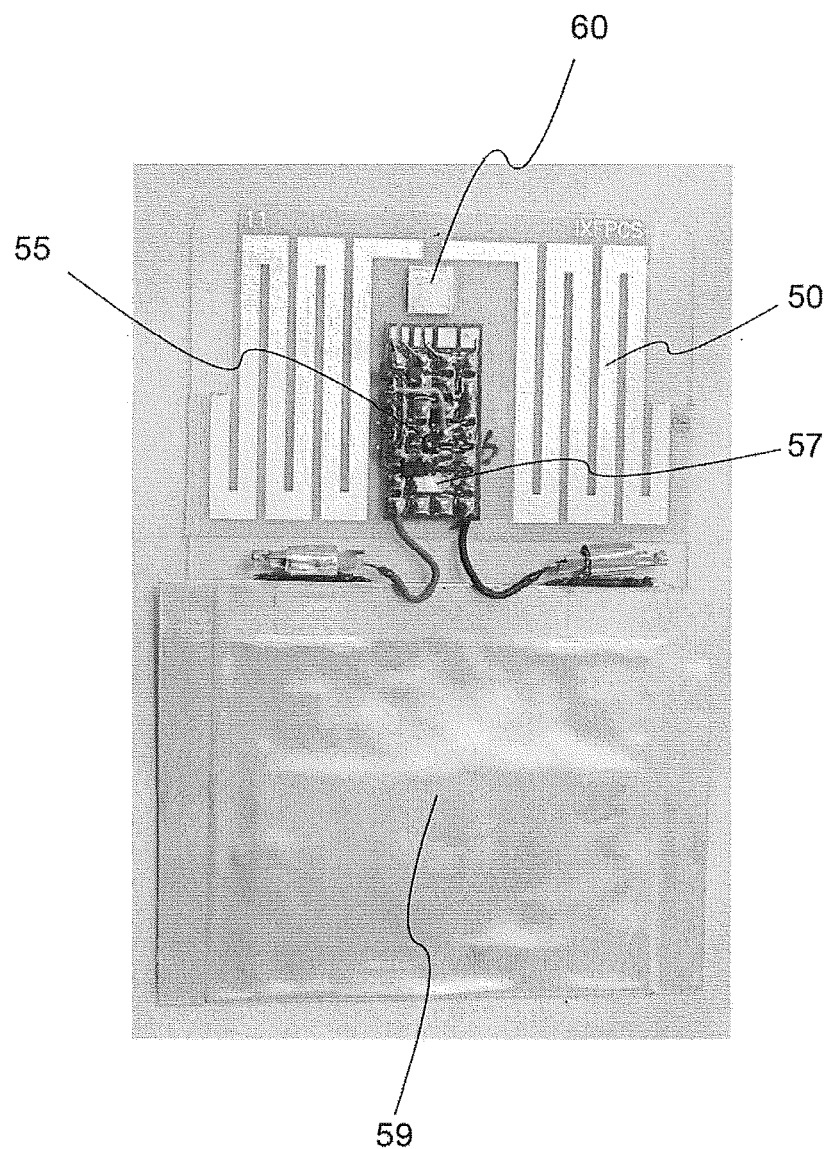
FIG. 33 is a photograph showing the appearance of a semiconductor device fabricated as a prototype.

FIG. 33 is a photograph showing the appearance of the fabricated semiconductor device 5. Although it is difficult for the light-emitting diode 57 to emit light only with power of a radio signal, the semiconductor device 5 that includes the battery 59 successfully allowed the light-emitting diode 57 to emit light.

As the battery 59, a lithium-ion secondary battery containing an ionic liquid electrolyte with a flash point of 300° C. or higher was used.

Such a lithium-ion secondary battery containing an ionic liquid electrolyte is capable of operating at higher temperatures than a lithium-ion secondary battery using a conventional electrolyte (with a flash point of approximately 35° C.). For example, the lithium-ion secondary battery containing an ionic liquid electrolyte can be safely used even at 100° C. or higher.

Figure 34:
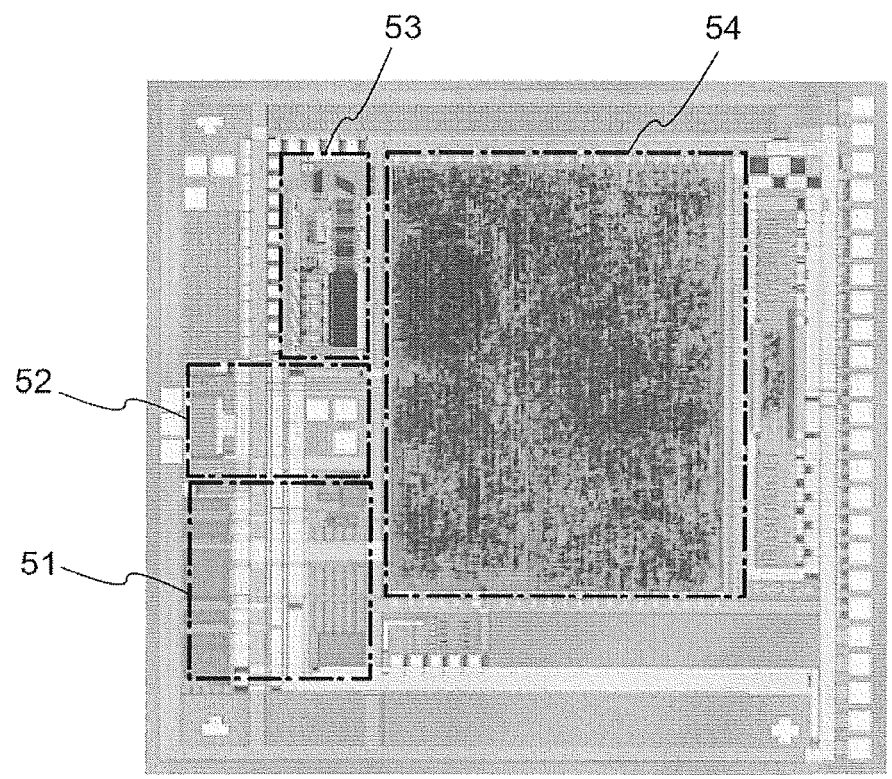
FIG. 34 is a micrograph showing a semiconductor device fabricated as a prototype.

FIG. 34 is an optical micrograph showing the RF device 60.

For the memory 53, the memory cell array 370 (FIG. 9) including OS transistors was used. Note that an In—Ga—Zn oxide (IGZO) including a CAAC-OS was used as an oxide semiconductor of the OS transistor.

Table 3 lists the main specifications of the RF device 60 and the memory 53. The carrier frequency is 920 MHz (UHF band), and the communication protocol is ISO/IEC18000-6 Type C. The die size is 5.0×5.0 mm$^2$.

TABLE 3

| 60 RF device | | Carrier frequency | 920 MHz |
|---|---|---|---|
| | | Protocol | ISO/IEC 18000-6 TypeC |
| | | Die size | 5.0 × 5.0 mm$^2$ |
| | Technology | CAAC-OS transistor | 0.8 μm |
| | | Si transistor | 0.35 μm |
| 53 Memory | | Module Area | 1.1 × 0.5 mm$^2$ |
| | | Number of bits | 1024 bit |

Figure 35:
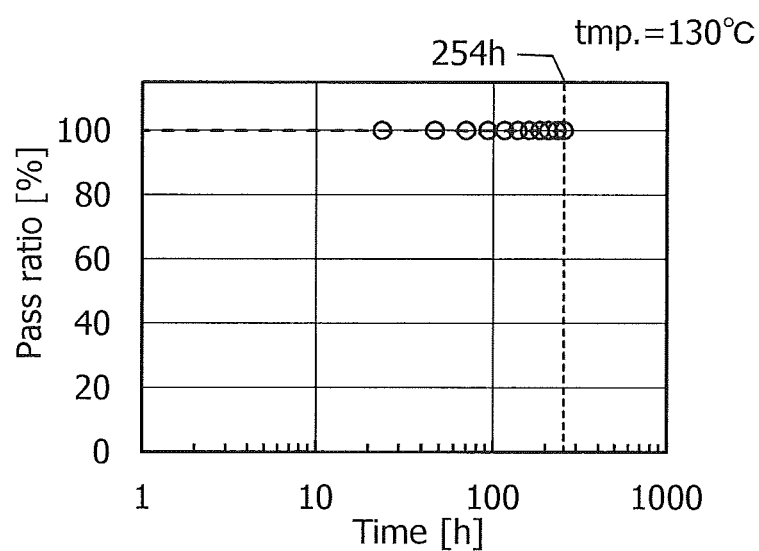
FIG. 35 shows results of a hold test on a semiconductor device fabricated as a prototype.

FIG. 35 shows results of a retention test of the RF device 60 at 130° C. "Pass ratio" represented by the vertical axis in FIG. 35 indicates the proportion of written data in the memory 53 that remains over time. As shown in FIG. 35, the RF device 60 retained written data after 254 hours at 130° C.

It is found that the memory 53 is capable of writing data at a low voltage (3 V).

Thus, it is found that the semiconductor device 5 fabricated in this example was capable of holding data even at high temperatures, particularly at 130° C. for 254 hours. A temperature of 130° C. and an operating time of 254 hours corresponds to a condition of sterilizing treatment performed 508 times at 130° C. using an autoclave in a medical setting. Thus, the semiconductor device 5 can be used for high-temperature medical sterilizing treatment.

Furthermore, an individual identification and management system for objects left at high temperatures can be built using the semiconductor device 5. Examples of such objects include objects that are subjected to high-temperature sterilizing treatment (e.g., surgical instrument, dishes, cooking tools, experimental instrument, and clothing).

For example, the semiconductor device 5 is attached to surgical instruments (e.g., steel items such as a scalpel, tweezers, and forceps). Individual identification information on the kind of the instrument, usage history information, information on cleaning and sterilization, or the like is written to the semiconductor device 5 by a reader/writer. The semiconductor device 5 does not lose its data through the sterilizing treatment by steam under high pressure for the surgical instrument. Thus, with the individual identification and management system using the semiconductor device 5, surgical instruments can be efficiently and appropriately managed and can be properly disposed of.

This application is based on Japanese Patent Application serial no. 2014-217284 filed with Japan Patent Office on Oct. 24, 2014, and Japanese Patent Application serial no. 2014-219299 filed with Japan Patent Office on Oct. 28, 2014, the entire contents of which are hereby incorporated by reference.

What is claimed is:

1. A semiconductor device comprising:
   an antenna;
   a battery;
   a sensor;
   a first nonvolatile memory;
   a first circuit; and
   a second circuit,
   wherein power supplied from the antenna is converted into first power via the first circuit,
   wherein the battery is configured to store the first power and supply second power,
   wherein the first nonvolatile memory is configured to store analog data acquired by the sensor,
   wherein the first nonvolatile memory is configured to store the analog data with the use of the second power, and
   wherein the second circuit is configured to convert the analog data into digital data with the use of the first power.

2. The semiconductor device according to claim 1,
   wherein the sensor acquires the analog data with the use of the second power.

3. The semiconductor device according to claim 1,
   wherein the first nonvolatile memory includes a transistor whose channel includes an oxide semiconductor.

4. The semiconductor device according to claim 1, further comprising a second nonvolatile memory,
   wherein the second nonvolatile memory is configured to store a time at which the analog data is acquired by the sensor, and
   wherein the second nonvolatile memory is configured to store the time with the use of the second power.

5. The semiconductor device according to claim 1,
   wherein the battery is a lithium-ion secondary battery containing an ionic liquid electrolyte.

6. A display device comprising the semiconductor device according to claim 1, the display device further comprising:
   a solar cell; and
   a flexible support.

7. A semiconductor device comprising:
   an antenna;
   a battery;
   a sensor;
   a first nonvolatile memory; and
   first to fourth circuits,
   wherein power supplied from the antenna is converted into first power via the first circuit,
   wherein the battery is configured to store the first power and supply second power,
   wherein the second circuit is configured to generate a first clock signal,
   wherein the third circuit is configured to generate a second clock signal,
   wherein the first clock signal has a higher frequency than the second clock signal,
   wherein the first nonvolatile memory is configured to store analog data acquired by the sensor,
   wherein the first nonvolatile memory is configured to store the analog data with the use of the second power and the second clock signal, and
   wherein the fourth circuit is configured to convert the analog data into digital data with the use of the first power and the first clock signal.

8. The semiconductor device according to claim 7,
   wherein the sensor acquires the analog data with the use of the second power.

9. The semiconductor device according to claim 7,
   wherein the first nonvolatile memory includes a transistor whose channel includes an oxide semiconductor.

10. The semiconductor device according to claim 7, further comprising a second nonvolatile memory,
    wherein the second nonvolatile memory is configured to store a time at which the analog data is acquired by the sensor, and
    wherein the second nonvolatile memory is configured to store the time with the use of the second power.

11. The semiconductor device according to claim 7,
    wherein the battery is a lithium-ion secondary battery containing an ionic liquid electrolyte.

12. A display device comprising the semiconductor device according to claim 7, the display device further comprising:
    a solar cell; and
    a flexible support.

13. A semiconductor device comprising:
    an antenna;
    a battery;
    a power supply circuit;
    an analog circuit;
    a logic circuit;
    a nonvolatile memory;
    a power control circuit; and
    a display portion,
    wherein the power control circuit is configured to control charge and discharge of the battery in accordance with intensity of a radio signal received by the antenna, and
    wherein the nonvolatile memory is configured to store an image signal for displaying an image on the display portion.

14. The semiconductor device according to claim 13, wherein the battery is a lithium-ion secondary battery containing an ionic liquid electrolyte.

15. The semiconductor device according to claim 13, wherein the nonvolatile memory includes a transistor whose channel includes an oxide semiconductor.

16. The semiconductor device according to claim 13, wherein the display portion includes a light-emitting diode.

17. A display device comprising the semiconductor device according to claim 13, the display device further comprising:

a solar cell; and
a flexible support.

* * * * *